(12) United States Patent
Oehrle et al.

(10) Patent No.: US 12,655,800 B2
(45) Date of Patent: \*Jun. 16, 2026

(54) GAS TURBINE ENGINE

(71) Applicant: General Electric Company, Evendale, OH (US)

(72) Inventors: Daniel John Oehrle, West Chester, OH (US); Randy M. Vondrell, Newport, KY (US); John Paul Glessner, Kings Mills, OH (US); Stephen G. Matava, Andover, MA (US)

(73) Assignee: General Electric Company, Evendale, OH (US)

(\*) Notice: Subject to any disclaimer, the term of this patent is extended or adjusted under 35 U.S.C. 154(b) by 0 days.

This patent is subject to a terminal disclaimer.

(21) Appl. No.: 19/077,821

(22) Filed: Mar. 12, 2025

(65) Prior Publication Data

US 2025/0243813 A1      Jul. 31, 2025

Related U.S. Application Data

(63) Continuation-in-part of application No. 18/824,100, filed on Sep. 4, 2024, which is a continuation of
(Continued)

(51) Int. Cl.
*F02C 7/32* (2006.01)
*B64D 27/12* (2006.01)

(52) U.S. Cl.
CPC ................ *F02C 7/32* (2013.01); *B64D 27/12* (2013.01)

(58) Field of Classification Search
None
See application file for complete search history.

(56) References Cited

U.S. PATENT DOCUMENTS 2,951,395 A      9/1960   Smith et al.
2,978,209 A      4/1961   Kerry
(Continued)

FOREIGN PATENT DOCUMENTS

EP      3273032 A2   1/2018
FR      2994585 A1   2/2014
GB      839961 A     6/1960

OTHER PUBLICATIONS

Air transportation safety investigation A14Q0068, Bombardier Inc., Transportation Safety Board of Canada, May 29, 2014, 54 Pages.
(Continued)

*Primary Examiner* — David P. Olynick
(74) *Attorney, Agent, or Firm* — Dority & Manning, P.A.

(57) ABSTRACT

A gas turbine engine includes an unducted primary fan and an engine core having a combustor casing that defines an outer surface. A core cowl surrounds the core engine where an accessory gearbox is at least partially located within the core cowl. In a radial direction, an outer surface of the core cowl defines a peak cowl diameter (D), and the outer surface of the combustor casing defines a maximum combustor casing diameter (d). A core cowl diameter ratio (CDR) is the peak cowl diameter (D) divided by the maximum combustor casing diameter (d) and is between 2.7 and 3.5. In an axial direction, the core engine defines an overall core axial length (L) and an under-core cowl axial length (L1). A core cowl length ratio (CLR) is the under-core cowl axial length (L1) divided by the overall core axial length (L) and is between 0.25 and 0.50.

20 Claims, 26 Drawing Sheets

Related U.S. Application Data application No. 17/972,720, filed on Oct. 25, 2022, now Pat. No. 12,104,539.

(56) References Cited

U.S. PATENT DOCUMENTS

| | | | |
|---|---|---|---|
| 3,543,588 | A | 12/1970 | Richardson |
| 3,638,421 | A | 2/1972 | Chilman |
| 3,714,779 | A | 2/1973 | Stein et al. |
| 5,694,765 | A | 12/1997 | Hield et al. |
| 6,943,699 | B2 | 9/2005 | Ziarno |
| 7,010,906 | B2 | 3/2006 | Cazenave et al. |
| 8,074,455 | B2 | 12/2011 | Pierrot et al. |
| 8,607,578 | B2 | 12/2013 | Fert |
| 8,961,114 | B2 | 2/2015 | Ruthemeyer |
| 9,121,351 | B2 | 9/2015 | Ress, Jr. et al. |
| 9,259,808 | B2 | 2/2016 | Broughton et al. |
| 9,297,314 | B2 | 3/2016 | Cloft et al. |
| 9,562,828 | B2 | 2/2017 | Broughton |
| 9,611,047 | B2 | 4/2017 | Kohn et al. |
| 9,677,501 | B2 | 6/2017 | Pierluissi et al. |
| 9,689,314 | B2 | 6/2017 | Lemarchand et al. |
| 9,788,447 | B2 | 10/2017 | Dalton |
| 9,845,768 | B2 | 12/2017 | Pesyna et al. |
| 9,863,366 | B2 | 1/2018 | Froemming et al. |
| 10,167,814 | B2 | 1/2019 | Ferrier et al. |
| 10,190,506 | B2 | 1/2019 | Ruberte Sanchez |
| 10,264,688 | B2 | 4/2019 | Richardson et al. |
| 10,731,566 | B2 | 8/2020 | Alstad et al. |
| 10,787,996 | B2 | 9/2020 | Kupratis et al. |
| 11,066,179 | B2 | 7/2021 | Ramlaoui et al. |
| 11,326,523 | B2 | 5/2022 | Desjardins |
| 11,572,838 | B2 | 2/2023 | Miller et al. |
| 11,591,967 | B2 | 2/2023 | Foutch et al. |
| 12,173,658 | B2 | 12/2024 | Miller et al. |
| 2004/0065091 | A1 | 4/2004 | Anderson |
| 2006/0101804 | A1 | 5/2006 | Stretton |
| 2006/0248900 | A1 | 11/2006 | Suciu et al. |
| 2006/0277920 | A1 | 12/2006 | Bart et al. |
| 2009/0188334 | A1 | 7/2009 | Merry et al. |
| 2010/0107650 | A1 | 5/2010 | Ress, Jr. et al. |
| 2011/0154827 | A1 | 6/2011 | Ress, Jr. et al. |
| 2011/0284328 | A1 | 11/2011 | Brandt et al. |
| 2013/0239576 | A1 | 9/2013 | Kupratis et al. |
| 2014/0090386 | A1 | 4/2014 | Cloft et al. |
| 2015/0233300 | A1 | 8/2015 | Cloft et al. |
| 2016/0146111 | A1 | 5/2016 | Prunera-Usach et al. |
| 2016/0186598 | A1 | 6/2016 | Cloft et al. |
| 2016/0245183 | A1 | 8/2016 | Viel et al. |
| 2016/0281605 | A1 | 9/2016 | Fert et al. |
| 2016/0333792 | A1 | 11/2016 | Viel et al. |
| 2017/0122122 | A1 | 5/2017 | Lepretre |
| 2019/0048801 | A1 | 2/2019 | Guillemont et al. |
| 2019/0218978 | A1 | 7/2019 | Edwards et al. |
| 2020/0025033 | A1 | 1/2020 | White et al. |
| 2020/0157966 | A1 | 5/2020 | Huang et al. |
| 2021/0087971 | A1 | 3/2021 | Emmanouil et al. |
| 2021/0301827 | A1 | 9/2021 | Stretton et al. |
| 2021/0310417 | A1 | 10/2021 | Hrubec et al. |
| 2021/0404386 | A1 | 12/2021 | Venter et al. |
| 2021/0404387 | A1 | 12/2021 | Venter et al. |
| 2022/0049911 | A1 | 2/2022 | Djelassi et al. |
| 2022/0055760 | A1 | 2/2022 | Schmitter et al. |
| 2023/0119477 | A1 | 4/2023 | Miller et al. |
| 2025/0075662 | A1 | 3/2025 | Glessner et al. |

OTHER PUBLICATIONS

Analysis: the PW1100 GTF Engine and the Airbus A320NEO, Sahifa, Bangalore Aviation, Jan. 20, 2017, 9 Pages. Retrieved from: https://www.bangaloreaviation.com/2017/01/analysis-pw1100-gtf-engine-airbus-a320neo.html.

Atsushi et al., Development of PW1100G-JM Turbofan Engine, IHI Engineering Review, vol. 47, No. 1, 2014, 6 Pages.

Aviation Investigation—4 Docket Items—ENG19IA029, NTSB National Transportation Safety Board, Jan. 13, 2021, 85 Pages. Retrieved from: https://data.ntsb.gov/Docket/?NTSBNumber=ENG19IA029#.

Dorsey et al., Design Space Exploration of Future Open Rotor Configurations, AIAA 2020-3680, Cycle Performance and MDAO, 2020. (Abstract Only) Retrieved from: https://arc.aiaa.org/doi/10.2514/6.2020-3680.

"E00063EN", General Electric Company, U.S. Department of Transportation, Federal Aviation Administration Type Certification Data Sheet, Revision 8, Nov. 22, 2016, 12 Pages.

"E00070EN", General Electric Company, U.S. Department of Transportation, Federal Aviation Administration Type Certification Data Sheet, Revision 13, Jul. 14, 2021, 10 Pages.

"E00076EN", General Electric Company, U.S. Department of Transportation, Federal Aviation Administration Type Certification Data Sheet, Revision 21, Aug. 19, 2021, 22 Pages.

"E00087EN", General Electric Company, U.S. Department of Transportation, Federal Aviation Administration Type Certification Data Sheet, Revision 6, May 6, 2019, 9 Pages.

"E00088EN", General Electric Company, U.S. Department of Transportation, Federal Aviation Administration Type Certification Data Sheet, Revision 5, Nov. 4, 20191, 11 Pages.

"E00089EN", General Electric Company, U.S. Department of Transportation, Federal Aviation Administration Type Certification Data Sheet, Revision 7, Feb. 7, 2019, 17 Pages.

"E00090EN", General Electric Company, U.S. Department of Transportation, Federal Aviation Administration Type Certification Data Sheet, Revision 10, Jun. 2, 2022, 8 Pages.

"E00091EN", General Electric Company, U.S. Department of Transportation, Federal Aviation Administration Type Certification Data Sheet, Revision 2, Mar. 18, 2019, 9 Pages.

"E00095EN", General Electric Company, U.S. Department of Transportation, Federal Aviation Administration Type Certification Data Sheet, Revision 2, Apr. 2, 2021, 9 Pages.

Gliebe et al., Ultra-High Bypass Engine Aeroacoustic Study, NASA/CR-2003-212525, NASA, 2003, 109 pages.

Halliwell et al., Fuel Burn Benefits of a Variable-Pitch Geared Fan Engine, AIAA 2012-3912, 48th AIAA/ASME/SAE/ASEE Joint Propulsion Conference & Exhibit, Atlanta, GA. (Abstract Only) Retrieved from: https://arc.aiaa.org/doi/10.2514/6.2012-3912.

Jackson, Optimisation of Aero and Industrial Gas Turbine Design for the Environment, Thesis Cranfield University, 2009. (Abstract Only) Retrieved from http://hdl.handle.net/1826/4316.

Pratt and Whitney, PW1100G Geared Turbofan Engine, The Flying Engineer, Technically and Operationally Commercial Aviation, Nov. 26, 2013, 24 Pages. Retrieved from: https://theflyingengineer.com/flightdeck/pw1100g-gtf/.

GAS TURBINE ENGINE

CROSS-REFERENCE TO RELATED APPLICATIONS

This application is a continuation-in-part application of U.S. application Ser. No. 18/824,100, filed Sep. 4, 2024, which is a continuation of U.S. application Ser. No. 17/972, 720, filed Oct. 25, 2022, which issued as U.S. Pat. No. 12,104,539 on Oct. 1, 2024, all of which are hereby incorporated by reference in their entirety.

FIELD

The present disclosure relates to a gas turbine engine, such as an aeronautical gas turbine engine.

BACKGROUND

A gas turbine engine generally includes a turbomachine. The turbomachine includes several engine accessories such as controllers, pumps, heat exchangers and the like that are necessary for operation. These engine accessories and engine systems may be mounted to the turbomachine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
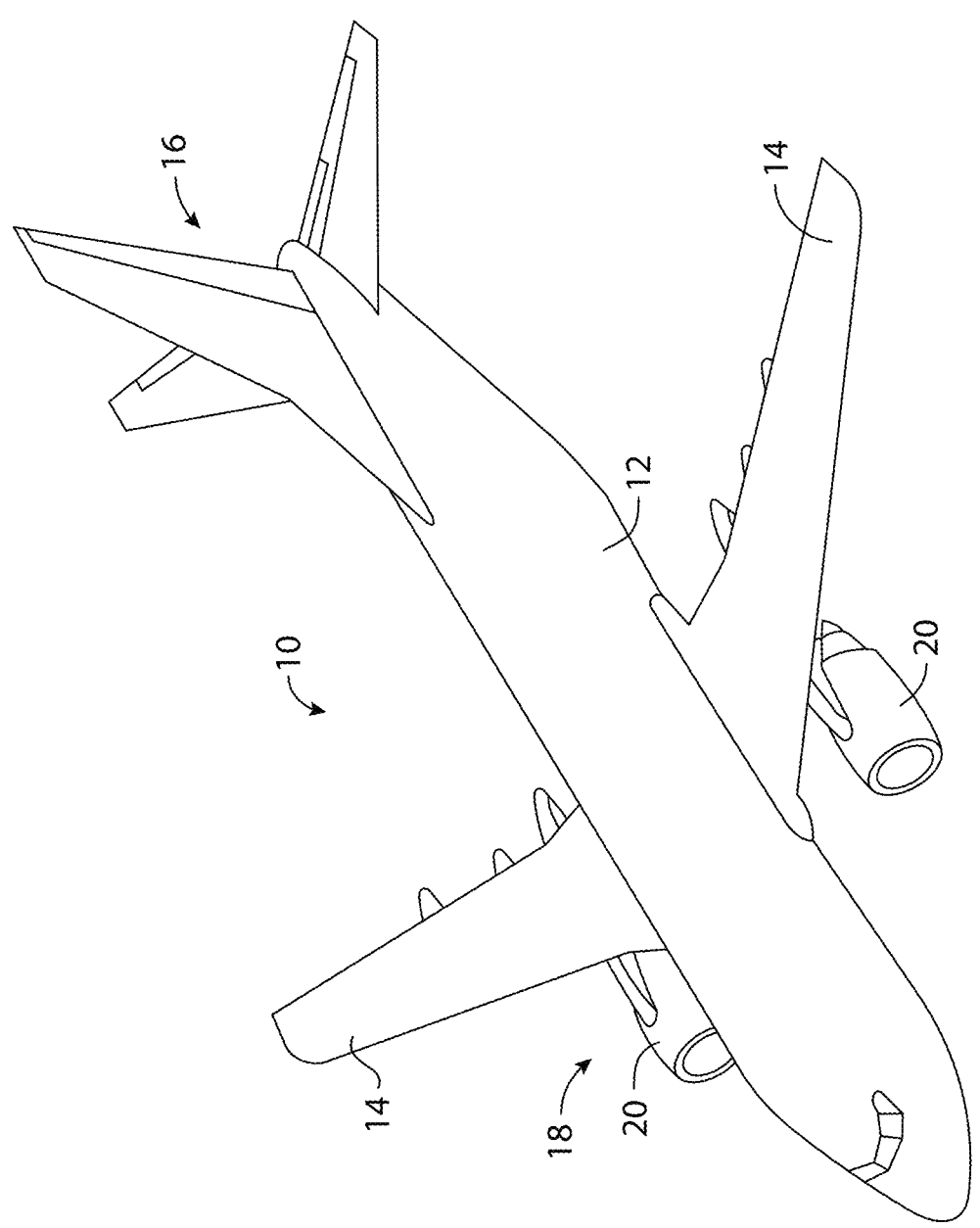
FIG. 1 is perspective view of an exemplary aircraft in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or aircraft and refer to the normal operational attitude of the gas turbine engine or aircraft. For example, with regards to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "cowl" includes a housing, casing, or other structure that at least partially encases or surrounds a portion of a turbomachine or gas turbine engine.

The phrases "from X to Y" and "between X and Y" each refers to a range of values inclusive of the endpoints (i.e., refers to a range of values that includes both X and Y).

The term "propulsive efficiency" refers to an efficiency with which the energy contained in an engine's fuel is converted into kinetic energy for the vehicle incorporating the engine, to accelerate it, or to replace losses due to aerodynamic drag or gravity.

As used herein, the term "rated speed" with reference to a gas turbine engine refers to a maximum rotational speed that the gas turbine engine may achieve while operating properly. For example, the gas turbine engine may be operating at the rated speed during maximum load operations, such as during takeoff operations.

The term "standard day operating condition" refers to ambient conditions of sea level altitude, 59 degrees Fahrenheit, and 60 percent relative humidity.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, at a static flight speed, and/or at 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

Conventional turbofan engine design practice has been to provide an outer nacelle surrounding the fan to provide relatively efficient thrust for the turbofan engine at high fan speeds (compared with an unducted fan). Such a configuration may generally limit a permissible size of the fan (i.e., a diameter of the fan). Generally, a turbofan engine includes a fan to provide a desired amount of thrust without overloading the fan blades (i.e., without increasing a disk loading of the fan blades of the fan beyond a certain threshold), and therefore to maintain a desired overall propulsive efficiency for the turbofan engine. The inventors of the present disclosure seek to drive the fan diameter higher, thereby to reduce fan pressure ratio while maintaining the same level of thrust to improve fuel efficiency. By increasing the fan diameter, however, an installation of the turbofan engine becomes more difficult. In addition, if an outer nacelle is maintained, the outer nacelle may become weight prohibitive with some larger diameter fans.

The inventors of the present disclosure found that for a three-stream gas turbine engine having an unducted primary fan (the outer nacelle removed) and a ducted secondary fan, with the secondary fan providing an airflow to a third stream of the gas turbine engine, an overall propulsive efficiency of the gas turbine engine that results from providing a high diameter fan may be maintained at a high level, while reducing the size of the primary fan. Such a configuration may maintain a desired overall propulsive efficiently for the gas turbine engine, or unexpectedly, may in fact increase the overall propulsive efficiency of the gas turbine engine. Further, by including a third stream, an axial length of the core engine may be reduced relative to the overall engine axial length by allowing for a portion of the airflow through the engine to flow through the third stream. This reduces an overall weight of the engine. However, the core engine must maintain a sufficient size to produce enough power to drive the primary fan and the ducted secondary fan.

Further, removing the outer nacelle and reducing the overall axial length of the core engine significantly reduces engine accessory storage space. A diameter of a core cowl may be increased to make room for the accessories between an engine casing and an inner surface of the core cowl, however, the core cowl diameter cannot be too large due to potential performance penalties such as excessive drag and installation difficulties.

The inventors proceeded in the manner of designing a gas turbine engine with a given core cowl diameter, core diameter, core axial length, and overall engine axial length; checking the propulsive efficiency of the designed gas turbine engine; redesigning the gas turbine engine with varying core cowl diameters, core diameters, core axial lengths, and overall engine axial lengths; rechecking the propulsive efficiency of the redesigned gas turbine engine; and then making accommodations when, for example, it was found that subsystem sizes increased due to certification requirements and/or power requirements, or servicing needs impacted where to locate things during the design of several different types of gas turbine engines, including the gas turbine engine described below with reference to, e.g., FIGS. 4 through 8.

During the course of this practice of studying and evaluating various cowl diameters, core diameters, core length, and engine length considered feasible for best satisfying mission requirements, it was discovered that certain relationships exist between a core cowl diameter ratio (which is equal to a peak cowl diameter divided by a maximum combustor casing diameter) and a core cowl length ratio (which is equal to an under-core cowl axial length divided by an overall core axial length). In particular, the inventors of the present disclosure have found that these ratios can be thought of as an indicator of the ability of a gas turbine engine to provide sufficient packaging space between the core engine combustor casing and the core cowl for packaging/mounting various accessories and/or engine systems, while also having a core engine capable of producing sufficient power to drive primary and secondary fans, particularly in more complex engine designs. In some embodiments, the inventors found that selectively coupling one or more engine components such as an engine accessory or system component to one of the core cowl or to the engine improves accessibility for inspection, repair, and maintenance and improves weigh loads on the core engine.

Referring now to the drawings, FIG. 1 is a perspective view of an exemplary aircraft 10 that may incorporate at least one exemplary embodiment of the present disclosure. As shown in FIG. 1, the aircraft 10 has a fuselage 12, wings 14 attached to the fuselage 12, and an empennage 16. The aircraft 10 further includes a propulsion system 18 that produces a propulsive thrust to propel the aircraft 10 in flight, during taxiing operations, etc. Although the propulsion system 18 is shown attached to the wing(s) 14, in other embodiments it may additionally or alternatively include one or more aspects coupled to other parts of the aircraft 10, such as, for example, the empennage 16, the fuselage 12, or both. The propulsion system 18 includes at least one engine. In the exemplary embodiment shown, the aircraft 10 includes a pair of gas turbine engines 20. Each gas turbine engine 20 is mounted to the aircraft 10 in an under-wing configuration. Each gas turbine engine 20 is capable of selectively generating a propulsive thrust for the aircraft 10. The gas turbine engines 20 may be configured to burn various forms of fuel including, but not limited to unless otherwise provided, jet fuel/aviation turbine fuel, and hydrogen fuel.

Figure 2:
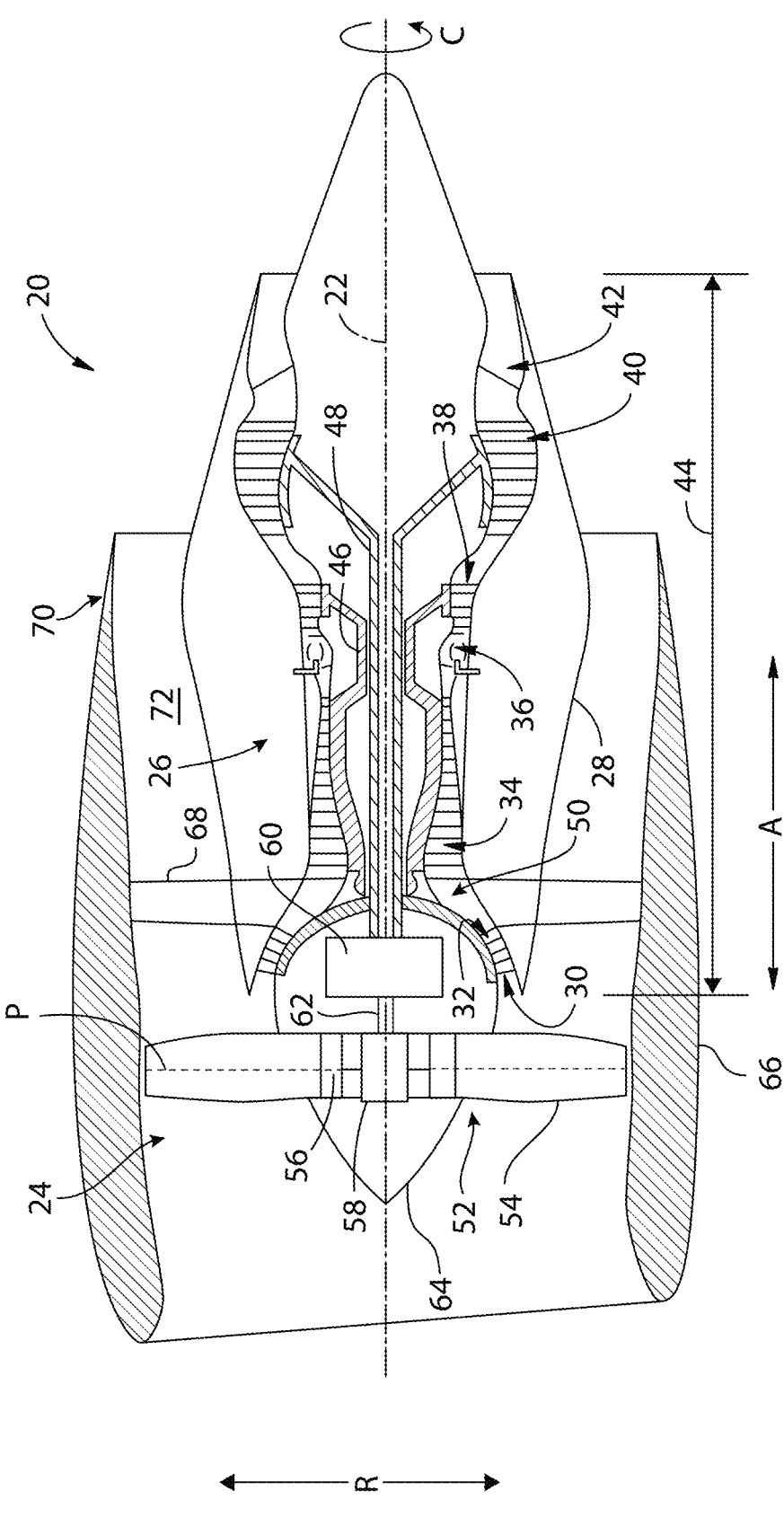
FIG. 2 is a schematic cross-sectional view of a ducted turbofan gas turbine engine in accordance with an exemplary embodiment of the present disclosure.

FIG. 2 is a cross-sectional side view of a gas turbine engine 20 in accordance with an exemplary embodiment of the present disclosure. More particularly, for the embodiment of FIG. 2, the gas turbine engine 20 is a multi-spool, high-bypass turbofan jet engine, sometimes also referred to as a "turbofan engine." As shown in FIG. 2, the gas turbine engine 20 defines an axial direction A (extending parallel to a longitudinal centerline 22 provided for reference), a radial direction R, and a circumferential direction C extending about the longitudinal centerline 22. In general, the gas turbine engine 20 includes a fan section 24 and a turbomachine 26 disposed downstream from the fan section 24.

The exemplary turbomachine 26 depicted generally includes an engine housing, casing, or core cowl 28 that defines an annular core inlet 30. The core cowl 28 at least partially encases, in serial flow relationship, a compressor section including a booster or low-pressure compressor 32 and a high-pressure compressor 34, a combustion section 36, a turbine section including a high-pressure turbine 38 and a low-pressure turbine 40, and at least a portion of a jet exhaust nozzle 42. Together, these components or sections make up a core engine 44 of the turbomachine 26.

A high-pressure shaft 46 drivingly connects the high-pressure turbine 38 to the high-pressure compressor 34. A low-pressure shaft 48 drivingly connects the low-pressure turbine 40 to the low-pressure compressor 32. The compressor section, combustion section 36, turbine section, and jet exhaust nozzle 42 together define a working gas flow path 50 through the gas turbine engine 20.

For the embodiment depicted, the fan section 24 includes a fan 52 having a plurality of fan blades 54 coupled to a disk 56 in a spaced apart manner. As depicted, the fan blades 54 extend outwardly from disk 56 generally along the radial direction R. Each fan blade 54 is rotatable with the disk 56 about a pitch axis P by virtue of the fan blades 54 being operatively coupled to a suitable pitch change mechanism 58 configured to collectively vary the pitch of the fan blades 54, e.g., in unison. The fan blades 54, disk 56, and pitch change mechanism 58 are together rotatable about the longitudinal centerline 22 by the low-pressure shaft 48.

In an exemplary embodiment, as shown in FIG. 2, the gas turbine engine 20 further includes a power gearbox or gearbox 60. The gearbox 60 includes a plurality of gears for adjusting a rotational speed of the fan 52 relative to a rotational speed of the low-pressure shaft 48, such that the fan 52 and the low-pressure shaft 48 may rotate at more efficient relative speeds. The gearbox 60 may be any type of gearbox suitable to facilitate coupling the low-pressure shaft 48 to the fan 52 while allowing each of the low-pressure turbine 40 and the fan 52 to operate at a desired speed. For example, in some embodiments, the gearbox 60 may be a reduction gearbox. Utilizing a reduction gearbox may enable the comparatively higher speed operation of the low-pressure turbine 40 while maintaining fan speeds sufficient to provide for increased air bypass ratios, thereby allowing for efficient operation of the gas turbine engine 20. Moreover, utilizing a reduction gearbox may allow for a reduction in turbine stages that would otherwise be present (e.g., in direct drive engine configurations), thereby providing a reduction in weight and complexity of the engine.

Referring still to the exemplary embodiment of FIG. 2, the disk 56 is connected to the gearbox 60 via a fan shaft 62. The disk 56 is covered by a rotatable front hub 64 of the fan section 24 (sometimes also referred to as a "spinner"). The front hub 64 is aerodynamically contoured to promote an airflow through the plurality of fan blades 54. Additionally, the exemplary fan section 24 includes an annular fan casing or outer nacelle 66 that circumferentially surrounds the fan 52 and/or at least a portion of the turbomachine 26. The nacelle 66 is supported relative to the turbomachine 26 by a plurality of circumferentially spaced struts or outlet guide vanes 68 in the embodiment depicted. Moreover, a downstream section 70 of the nacelle 66 extends over an outer portion of the turbomachine 26 to define a bypass airflow passage 72 therebetween.

Figure 3:
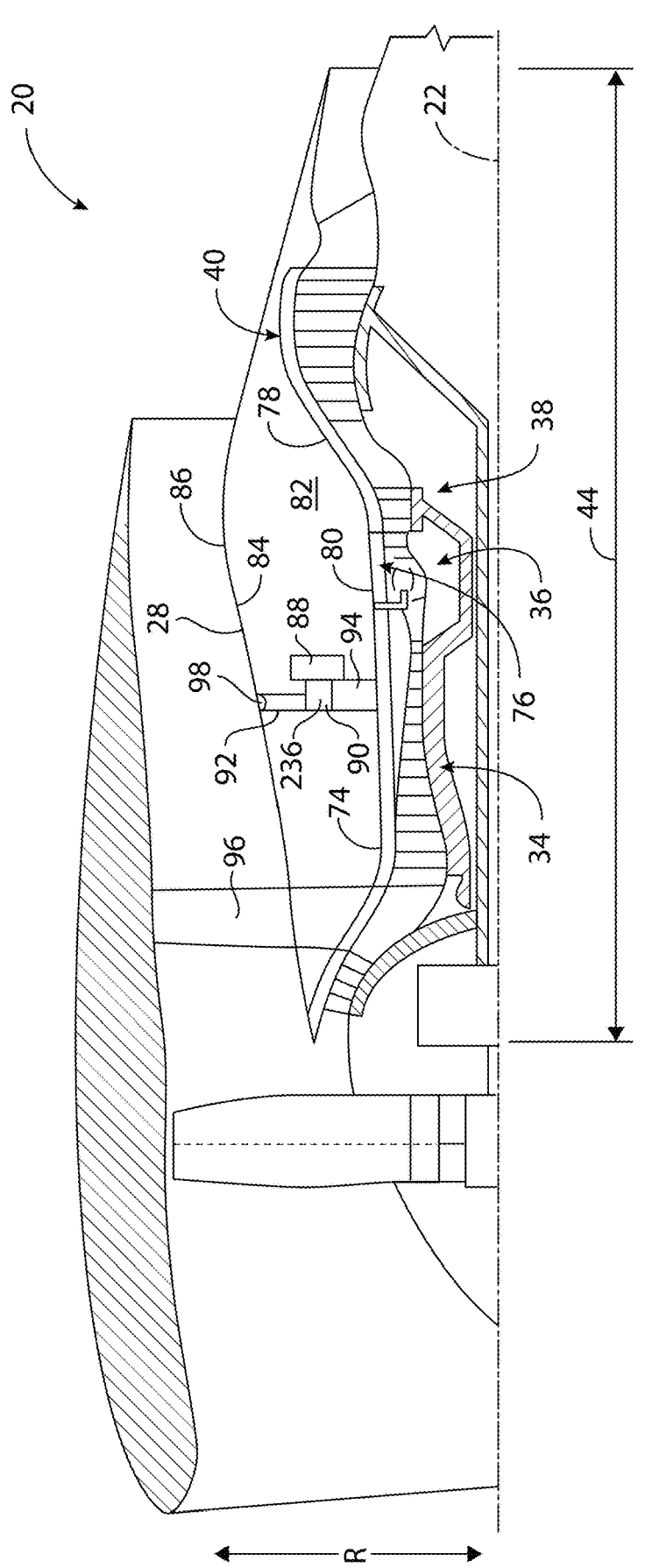
FIG. 3 is a schematic cross-sectional view of a portion of the ducted turbofan gas turbine engine shown in FIG. 2, in accordance with an exemplary embodiment of the present disclosure.

FIG. 3 is a schematic cross-sectional view of a portion of the core engine 44 of the gas turbine engine 20 as shown in FIG. 2, according to an exemplary embodiment of the present disclosure. As shown in FIG. 3, the high-pressure compressor 34 is encased within a compressor casing 74. The combustion section 36 is encased within a combustor casing 76. The high-pressure turbine 38 and the low-pressure turbine 40 are encased within one or more turbine casing(s) 78. The combustor casing 76 defines an outer surface 80. A void or space 82 is defined between an inner surface 84 of the core cowl 28 and the outer surface 80 of the combustor casing 76. The core cowl 28 further includes an outer surface 86 radially spaced from the inner surface 84 with respect to radial direction R. In exemplary embodiments, at least one engine component 88 is coupled to the core cowl 28 inner surface 84. The at least one engine component 88 may include but is not limited to valves, electronics including engine and system controllers, fire and overheat detection system components, fire extinguisher components, heat exchangers, pumps, generator, etc.

In exemplary embodiments, engine component 88 is selectively coupled to the core engine 44 or the core cowl 28. When the engine component 88 is coupled to the core cowl 28, the engine component 88 travels with the core cowl 28 when pivoted away from the core engine 44. When the engine component 88 is coupled to the core engine 44, the engine component 88 stays coupled to the core engine 44 when the core cowl 28 is pivoted away from the core engine 44. In exemplary embodiments and as previously presented, the engine component 88 is one of a heat exchanger, a sensor, a controller, a pump, a duct, a valve, fire and overheat detection system components, fire extinguisher components, or a generator. It should be appreciated that this list is not all inclusive of possible engine components that may be selectively coupled to the core cowl 28 or the core engine 44.

In exemplary embodiments, the engine component 88 is selectively coupled to the core engine 44 or the core cowl 28 via a fastener 90. As shown in FIG. 3, the fastener 90 may be disposed between a core cowl structure 92 such as a strut or bracket, and a core engine structure 94 such as a strut, a casing or bracket. The core cowl structure 92 may be fixedly coupled to the core cowl 28, such that the core cowl structure 92 moves with the core cowl 28, as described below. By contrast, the core engine structure 94 is not moveable with the core cowl 28 and instead may be fixedly coupled to a stationary and structural component of the core engine 44, such as the compressor casing 74 (as in the embodiment depicted), or one or more of the combustor casing 76, turbine casing 78, or a support frame such as a compressor frame 96, a mid-frame, or a rear support frame or turbine frame, etc.

The fastener 90 may be fixedly connected to the engine component 88. The fastener 90 may comprise a cam lock type fitting, bayonet fitting, quarter-turn fastener or other mechanical or electromechanical fastener or device that allows selectively coupling the engine component 88 to the core cowl 28 or the core engine 44. In particular embodiments, the core cowl 28 defines or includes an access opening or hatch 98 wherein the fastener 90 is accessible from the access opening 98.

Figure 4:
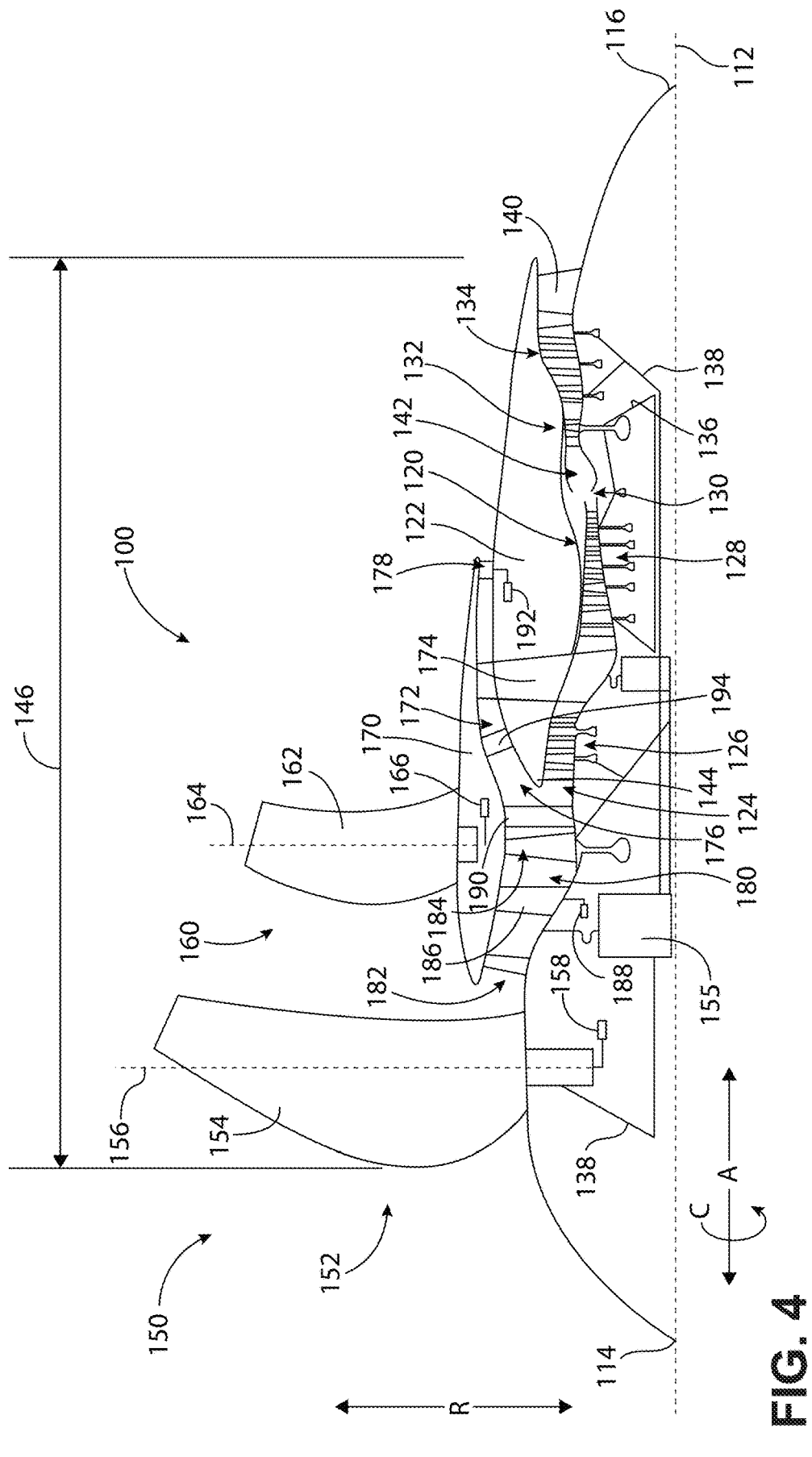
FIG. 4 is a schematic cross-sectional view of a three-stream engine in accordance with an exemplary embodiment of the present disclosure.

It should be appreciated, however, that the exemplary gas turbine engine 20 depicted in FIGS. 2 and 3 is provided by way of example only, and that in other exemplary embodiments, the gas turbine engine 20 may have other configurations. For example, FIG. 4 is a schematic cross-sectional view of a gas turbine engine 100 according to another example embodiment of the present disclosure. Particularly, FIG. 4 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the gas turbine engine 100 of FIG. 4 includes a third stream extending from the compressor section to a rotor assembly flowpath over the turbomachine, as will be explained in more detail below.

For reference, the gas turbine engine 100 defines an axial direction A, a radial direction R, and a circumferential direction C. Moreover, the gas turbine engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The gas turbine engine 100 extends between a forward end 114 and an aft end 116, e.g., along the axial direction A.

As shown in FIG. 4 the gas turbine engine 100 includes a turbomachine 120 having a fan section 150 that is positioned upstream thereof. Generally, the turbomachine 120 includes, in serial flow order, a compressor section, a combustion section, a turbine section, and an exhaust section. Particularly, as shown in FIG. 4, the turbomachine 120 includes a housing or core cowl 122 that defines an annular core inlet 124. The core cowl 122 further encloses at least in part a low-pressure system and a high-pressure system. For example, the core cowl 122 depicted encloses and supports at least in part a booster or low-pressure ("LP") compressor 126 for pressurizing the air that enters the turbomachine 120 through core inlet 124. A high-pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low-pressure" are used with respect to the high-pressure/high speed system and low-pressure/low speed system interchangeably. Further, it will be appreciated that the terms "high" and "low" are used in this same context to distinguish the two systems and are not meant to imply any absolute speed and/or pressure values.

The high energy combustion products flow from the combustor 130 downstream to a high-pressure turbine 132. The high-pressure turbine 132 drives the high-pressure compressor 128 through a high-pressure shaft 136. In this regard, the high-pressure turbine 132 is drivingly coupled with the high-pressure compressor 128. The high energy combustion products then flow to a low-pressure turbine 134. The low-pressure turbine 134 drives the low-pressure compressor 126 and components of the fan section 150 through a low-pressure shaft 138. In this regard, the low-pressure turbine 134 is drivingly coupled with the low-pressure compressor 126 and components of the fan section 150. The low-pressure shaft 138 is coaxial with the high-pressure shaft 136 in this example embodiment. After driving each of the high-pressure turbine 132 and the low-pressure turbine 134, the combustion products exit the turbomachine 120 through a rear support frame or turbomachine exhaust nozzle 140. A core engine 146 of the gas turbine engine 100 is defined as the part of the gas turbine engine 100 that extends from the fan section 150 to the rear support frame or turbomachine exhaust nozzle 140.

Accordingly, the turbomachine 120 defines a working gas flowpath or core duct 142 that extends between the core inlet 124 and the rear support frame or turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream. The fan section 150 includes a fan 152, which is the primary fan in this example embodiment. For the depicted embodiment of FIG. 4, the fan 152 is an open rotor or unducted fan 152. In such a manner, the gas turbine engine 100 may be referred to as an open rotor engine. Moreover, it will be appreciated that the fan section 150 includes a single fan 152, and the fan 152 is the only unducted fan of the gas turbine engine 100 depicted.

As depicted, the fan 152 includes a plurality or an array of fan blades 154 (only one shown in FIG. 4). The fan blades 154 are rotatable, e.g., about the longitudinal axis 112. As noted above, the fan 152 is drivingly coupled with the low-pressure turbine 134 via the low-pressure shaft 138. For the embodiments shown in FIG. 1, the fan 152 is coupled with the low-pressure shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 4) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 4 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan housing or fan cowl 170.

As shown in FIG. 4, in addition to the fan 152, which is unducted, a ducted fan 184 is included aft of the fan 152, such that the gas turbine engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low-pressure turbine 134 (e.g., coupled to the low-pressure shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 4) arranged in a single stage, such that the ducted fan 184 may be referred to as a single stage fan. The fan blades of the ducted fan 184 can be arranged in equal circumferential spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the gas turbine engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially extending and circumferentially spaced stationary struts 174 (only one shown in FIG. 4).

The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The exemplary engine 100 shown in FIG. 4 also defines or includes an inlet duct 180. The inlet duct 180 extends between the engine inlet 182 and the core inlet 124 and fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or the leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the gas turbine engine 100 includes one or more features to increase an efficiency of a third-stream thrust, Fn3S (e.g., a thrust generated by an airflow through the fan duct 172 exiting through the fan exhaust nozzle 178, generated at least in part by the ducted fan 184). In particular, the gas turbine engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112.

Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the gas turbine engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the gas turbine engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third-stream thrust, Fn3S, during one or more engine operating conditions. Further, by introducing a variability in the geometry of the inlet guide vanes 186 and the fan exhaust nozzle 178, the gas turbine engine 100 may be capable of generating more efficient third-stream thrust, Fn3S, across a relatively wide array of engine operating conditions, including takeoff and climb (where a maximum total engine thrust FnTotal, is generally needed) as well as cruise (where a lesser amount of total engine thrust, FnTotal, is generally needed).

Moreover, referring still to FIG. 4, in exemplary embodiments, air passing through the fan duct 172 may be relatively cooler (e.g., lower temperature) than one or more fluids utilized in the turbomachine 120. In this way, one or more heat exchangers 194 may be positioned in thermal communication with the fan duct 172. For example, one or more heat exchangers 194 may be disposed within the fan duct 172 and utilized to cool one or more fluids from the core engine 146 with the air passing through the fan duct 172, as a resource for removing heat from a fluid, e.g., compressor bleed air, oil or fuel.

Although not depicted in detail, the heat exchanger 194 may be an annular heat exchanger extending substantially 360 degrees in the fan duct 172 (e.g., at least 300 degrees, such as at least 330 degrees). In such a manner, the heat exchanger 194 may effectively utilize the air passing through the fan duct 172 to cool one or more systems of the gas turbine engine 100 (e.g., lubrication oil systems, compressor bleed air, electrical components, etc.). The heat exchanger 194 uses the air passing through duct 172 as a heat sink and correspondingly increases the temperature of the air downstream of the heat exchanger 194 and exiting the fan exhaust nozzle 178.

Figure 5:
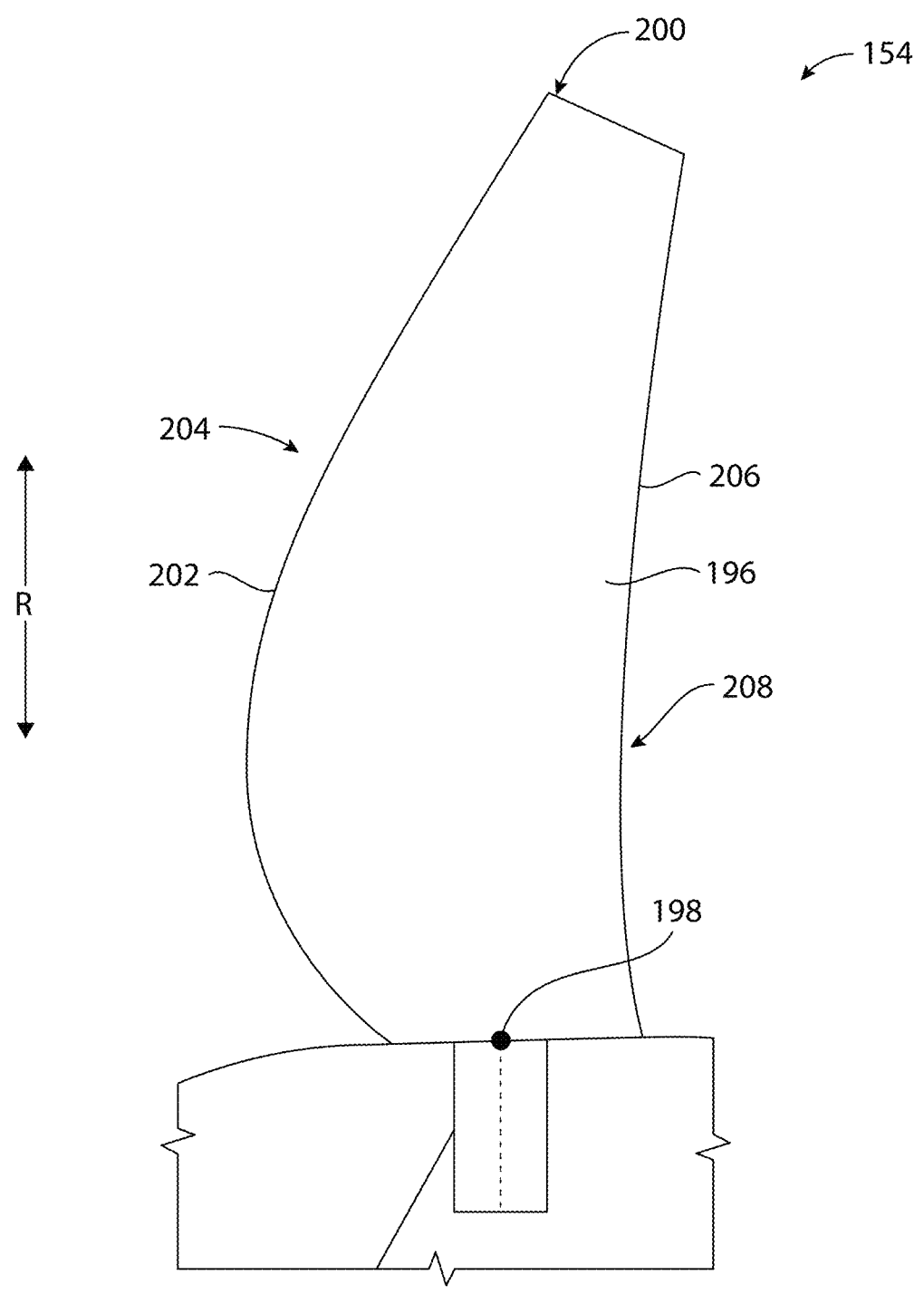
FIG. 5 is an enlarged view of an exemplary fan blade according to exemplary embodiments of the present disclosure.

FIG. 5 is an enlarged view of an exemplary fan blade 154 of the plurality or array of fan blades 154 as shown in FIG. 4, according to exemplary embodiments of the present disclosure. As previously presented, each fan blade 154 has an airfoil or blade body 196. The blade body 196 spans in the radial direction R between a root 198 and a tip 200 of the blade body 196. The blade body 196 includes a leading edge 202 that extends along the span between the root 198 and the tip 200 along an upstream or forward portion 204 of the fan blade 154. The blade body 196 further includes a trailing edge 206 that extends along the span between the root 198 and the tip 200 along a downstream or aft portion 208 of the fan blade 154.

Figure 6:
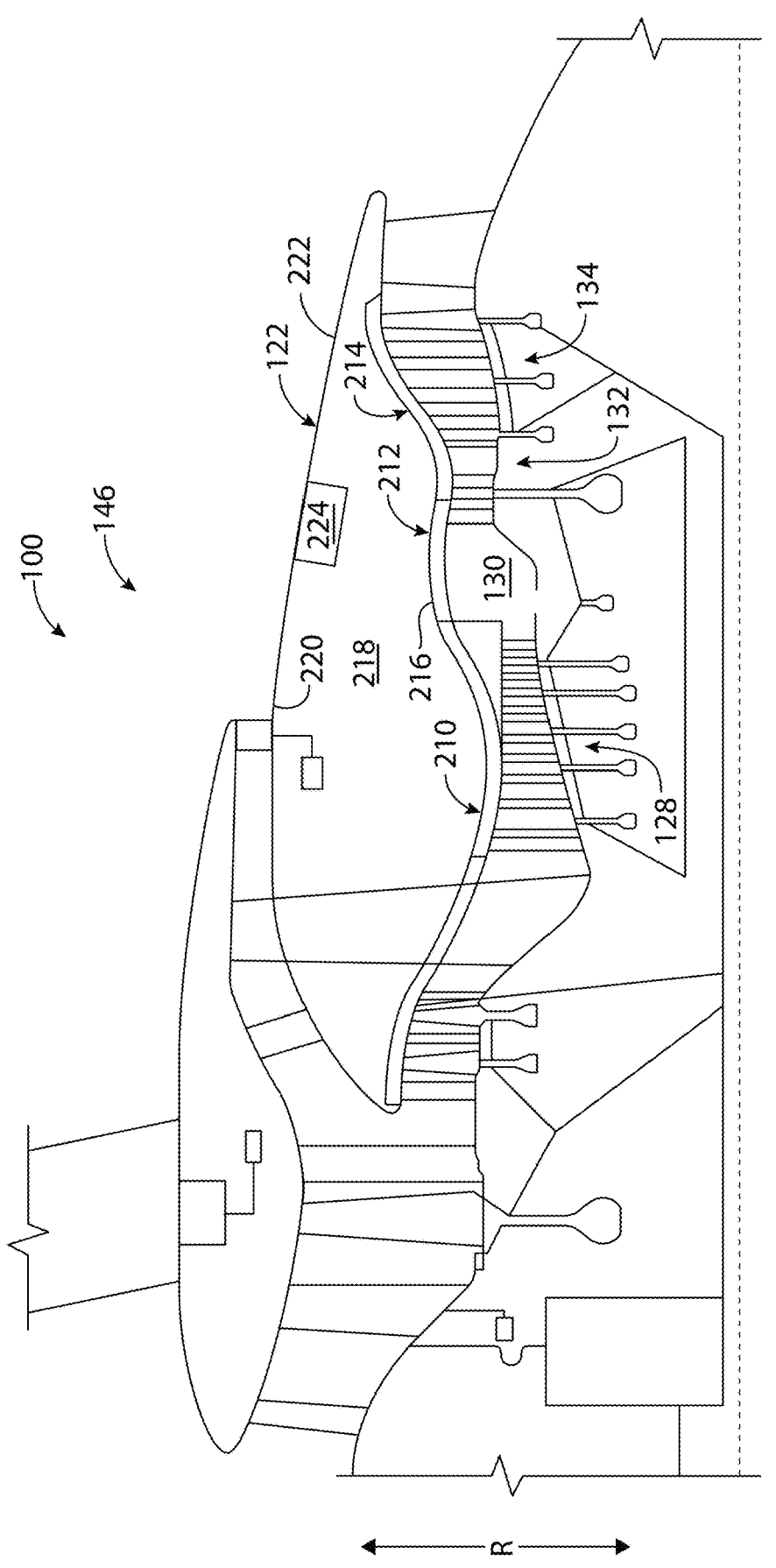
FIG. 6 is a schematic cross-sectional view of a portion of a core engine of the gas turbine engine as shown in FIG. 4, according to an exemplary embodiment of the present disclosure.

FIG. 6 is a schematic cross-sectional view of a portion of the core engine 146 of the gas turbine engine 100 as shown in FIG. 4, according to an exemplary embodiment of the present disclosure. As shown in FIG. 6, the high-pressure compressor 128 is encased within a compressor casing 210. The combustor 130 is encased within a combustor casing 212. The high-pressure turbine 132 and the low-pressure turbine 134 are encased within one or more turbine casing(s) 214. The combustor casing 212 defines an outer surface 216. A void or space 218 is defined between an inner surface 220 of the core cowl 122 and the outer surface 216 of the combustor casing 212. The core cowl 122 further includes an outer surface 222 radially spaced from the inner surface 220 with respect to radial direction R. In exemplary embodiments, at least one engine component 224 is attached to the core cowl 122 inner surface 220. The at least one engine component 224 may include but is not limited to valves, electronics including engine and system controllers, fire and overheat detection system components, fire extinguisher components, heat exchangers, pumps, generator, etc.

Figure 7:
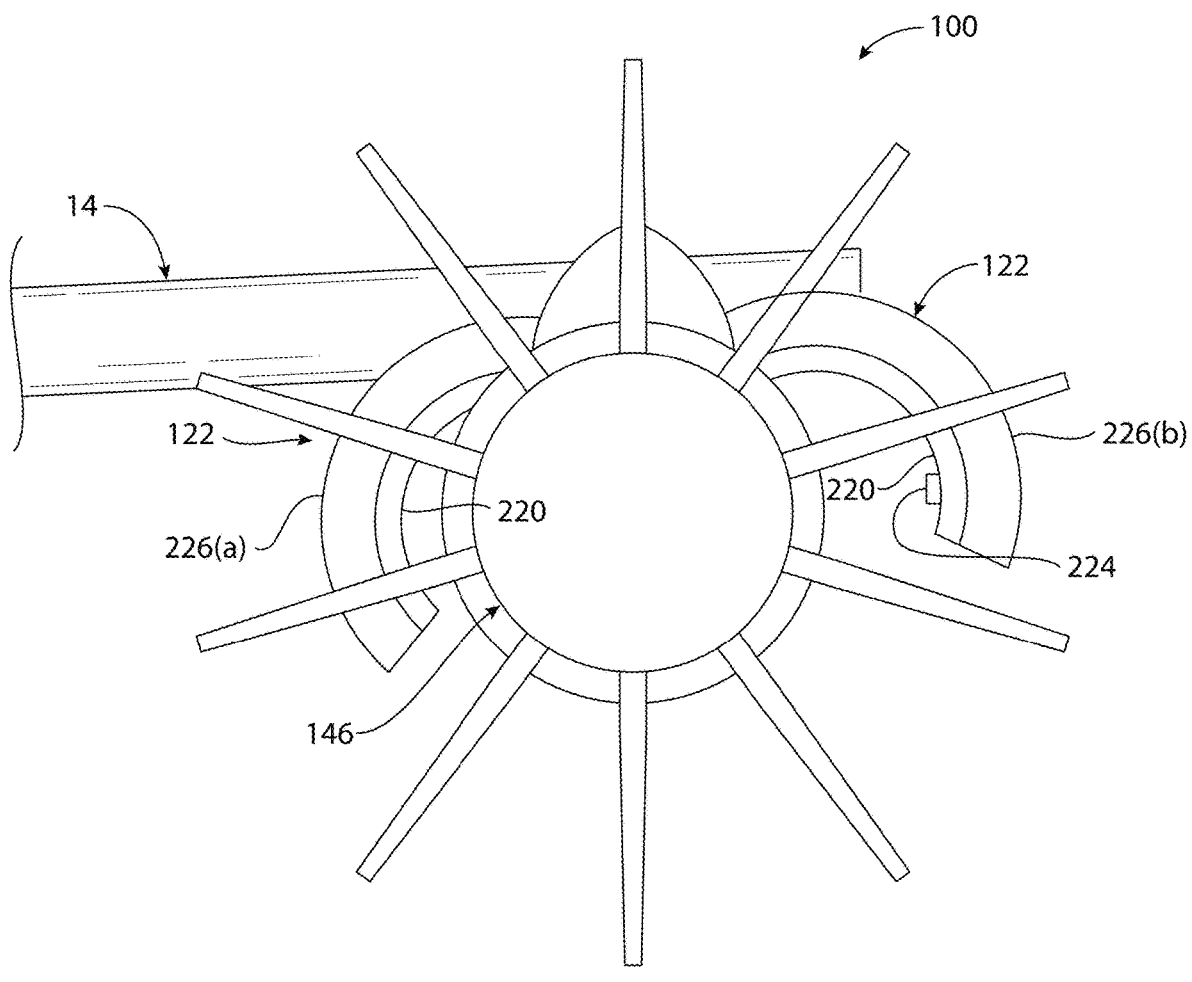
FIG. 7 is a front view of a portion of the gas turbine engine as shown in FIGS. 4 and 6, mounted to a portion of an exemplary wing according to exemplary embodiments of the present disclosure.

FIG. 7 is a front view of a portion of the gas turbine engine 100 as shown in FIGS. 4 and 6, mounted to a portion of an exemplary wing 14 according to exemplary embodiments of the present disclosure. It should be noted that fan section 150 (shown in FIG. 4) is not shown in FIG. 7 for clarity. As shown in FIG. 7, the core cowl 122 is formed from at least two shells 226(a), 226(b). It should be appreciated that the core cowl 122 shown in FIG. 7 may also be representative of the core cowl 28 shown in FIGS. 2 and 3. The shells 226(a), 226(b) are pivotally mounted to the gas turbine engine 100 to allow the shells 226(a), 226(b) to swing upward and away from the core engine 146, thereby exposing several engine accessories and systems of the core engine 146 such as engine component 224 or engine component 88 from FIG. 3, for inspection, repair, and maintenance. The shells 226(a), 226(b) are shown in FIG. 7 in an at least partially open state. When coupled to the inner surface 220 of the core cowl 122, the one or more engine accessories or engine systems will move with the core cowl 122 when the shells 226(*a*) and 226(*b*) are moved between open and closed positions.

Figure 8:
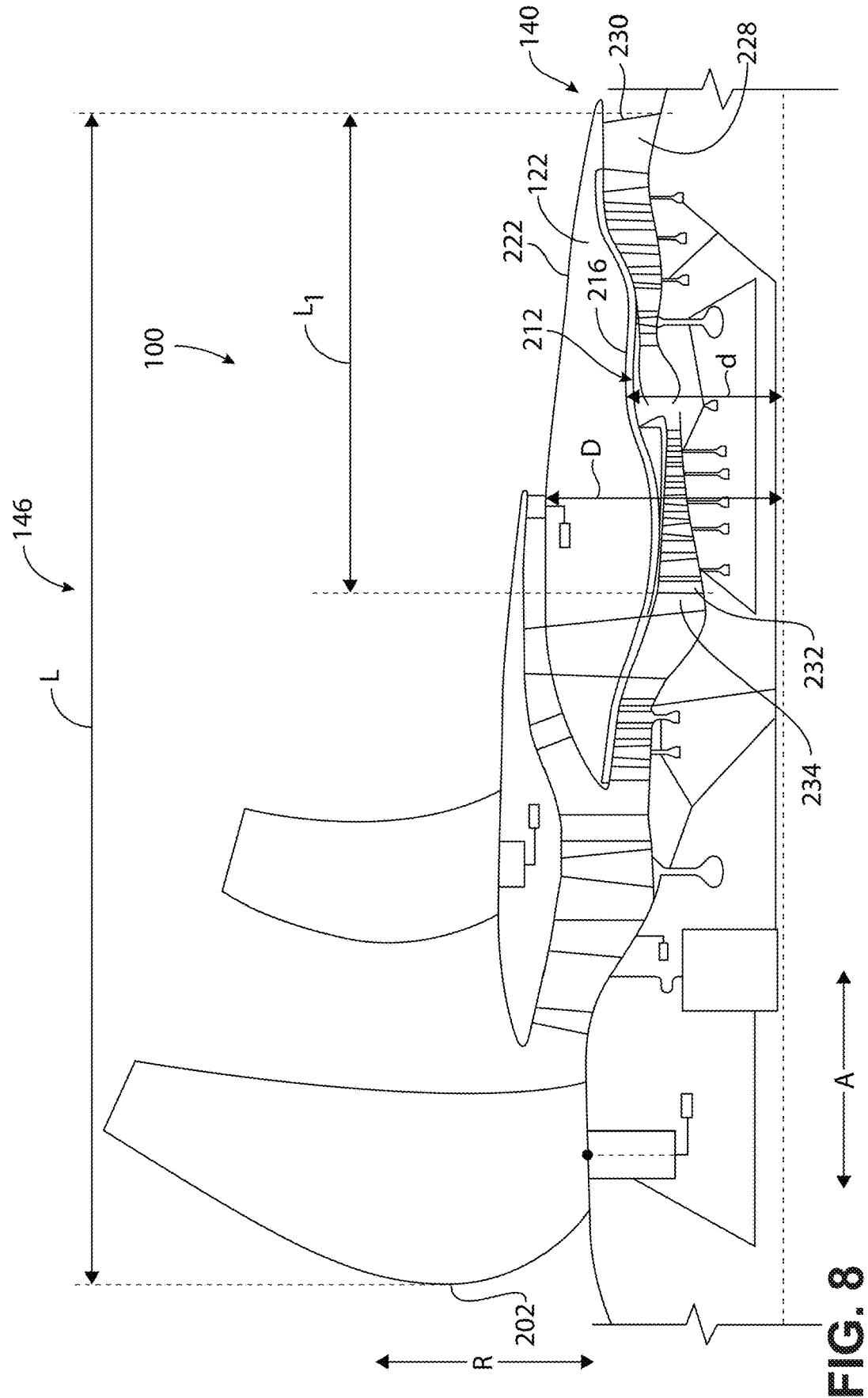
FIG. 8 is a schematic cross-sectional view of the gas turbine engine as shown in FIG. 4, according to an exemplary embodiment of the present disclosure.

FIG. 8 is a schematic cross-sectional view of the gas turbine engine 100 as shown in FIG. 4, according to an exemplary embodiment of the present disclosure. As shown in FIG. 8 the outer surface 222 of the core cowl 122 defines a peak cowl diameter (D) in the radial direction R with respect to axial centerline 112. The outer surface 216 of the combustor casing 212 defines a maximum combustor casing diameter (d) along the radial direction R with respect to axial centerline 112. The core engine 146 defines an overall core axial length (L) along the axial direction A with respect to axial centerline 112. An under-core cowl axial length (L1) is defined along the axial direction A with respect to axial centerline 112.

In exemplary embodiments, as shown in FIG. 8, the turbomachine rear support frame or exhaust nozzle 140 includes a strut 228 having a trailing edge 230 within a working gas flowpath of the gas turbine engine 100. The overall core axial length (L) is measured from a forward-most portion of the leading edge 202 of a respective primary fan blade 154 to an aft-most portion of the trailing edge 230 of the strut 228. The gas turbine engine 100 further includes a high-pressure compressor inlet guide vane 232 having a leading edge 234 where the under-core cowl axial length (L1) along the axial direction is measured from the leading edge 234 of the high-pressure compressor inlet guide vane 232 to the trailing edge of the strut 228.

Figure 9:
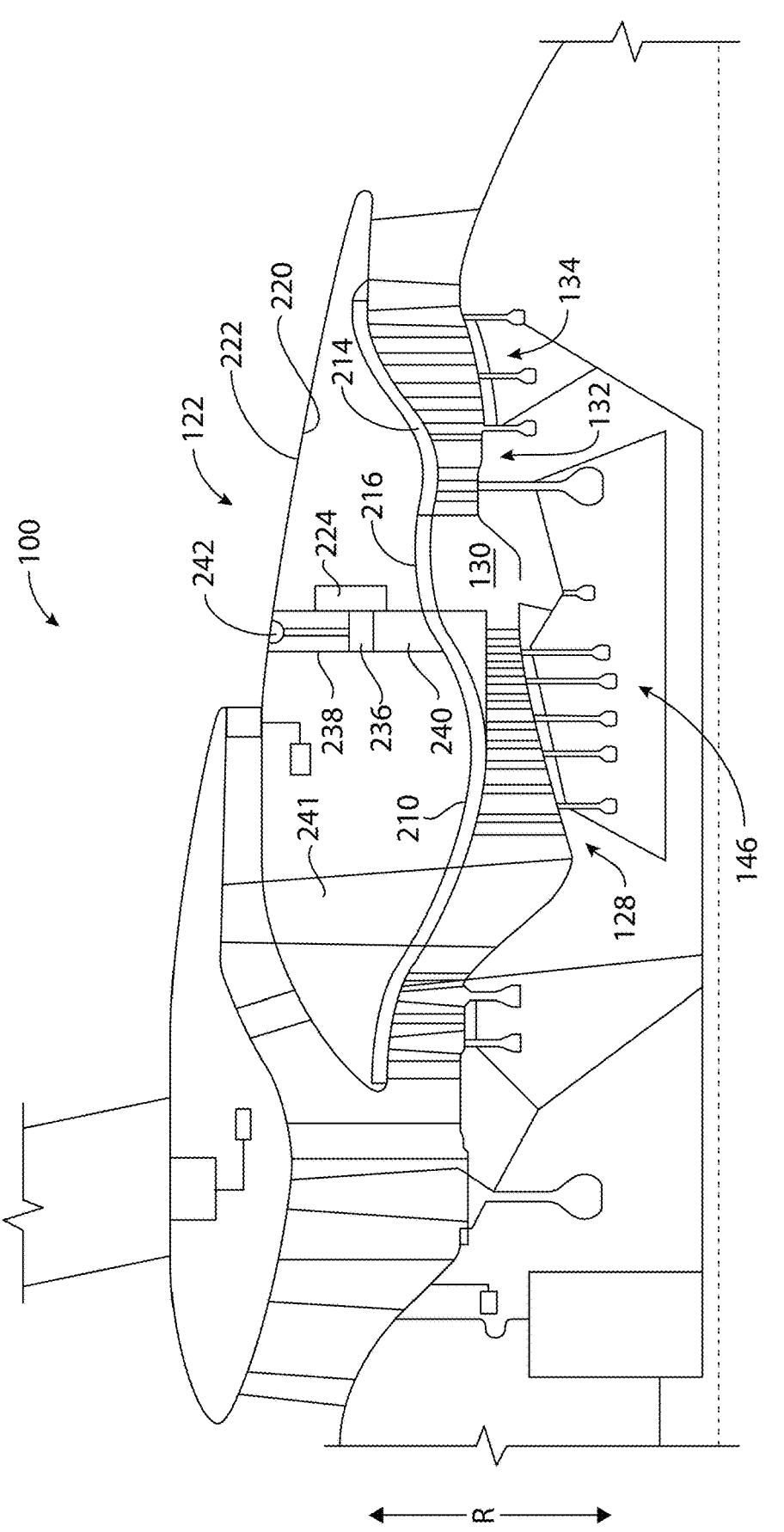
FIG. 9 is a schematic cross-sectional view of the gas turbine engine as shown in FIG. 4, according to an exemplary embodiment of the present disclosure.

FIG. 9 is a schematic cross-sectional view of the gas turbine engine 100 as shown in FIG. 4, according to an exemplary embodiment of the present disclosure. In exemplary embodiments, engine component 224 is selectively coupled to the core engine 146 or the core cowl 122. When the engine component 224 is coupled to the core cowl 122, the engine component 224 travels with the core cowl 122 when pivoted away from the core engine 146. When the engine component 224 is coupled to the core engine 146, the engine component 224 stays coupled to the core engine 146 when the core cowl 122 is pivoted away from the core engine 146. In exemplary embodiments and as previously presented, the engine component 224 is one of a heat exchanger, a sensor, a controller, a pump, a duct, a valve, fire and overheat detection system components, fire extinguisher components, or a generator. It should be appreciated that this list is not all inclusive of possible engine components that may be selectively coupled to the core cowl 122 or the core engine 146.

In particular, it will be appreciated that in at least certain exemplary embodiments, the engine component 224 may be the controller, such as an engine controller, such as a full authority digital engine control ("FADEC") controller. As will be appreciated, the gas turbine engine 100 depicted includes an unducted fan (see, e.g., unducted fan 152 in FIG. 4). In such a manner, the gas turbine engine 100 does not include a nacelle surrounding the fan (see, e.g., nacelle 66 surrounding fan 52 in FIG. 2). Without the nacelle, the engine controller may need to be located within the core cowl 122 of the gas turbine engine 100. As will further be appreciated, however, the environment within the core cowl 122 may be much hotter than within a nacelle, particularly closer to the turbomachinery components (e.g., the HP compressor, combustor, and HP turbine). Accordingly, positioning the engine controller outwardly along the radial direction R from the turbomachinery components and, e.g., selectively coupled to the core cowl 122 may reduce a temperature of the engine controller during operation of the gas turbine engine 100 to maintain a temperature of the engine controller below a maximum threshold for the electronics of the engine controller (e.g., below 200 degrees Fahrenheit), and allow for positioning of the engine controller within the core cowl 122. Briefly, a ratio of the peak cowl diameter (D) in the radial direction R and maximum combustor casing diameter (d) along the radial direction R may further facilitate such a positioning of the engine controller.

It should be appreciated, however, that in other embodiments, the engine component 224 may additionally or alternatively be any other suitable component traditionally found within a nacelle of a ducted gas turbine engine, such as a lubrication oil tank, a lubrication oil pump, power electronics (e.g., inverters), electric machines, etc. Moreover, although the engine controller is described as being positioned within the core cowl 122 above, in other embodiments, the engine controller and/or one or more other suitable components traditionally found within a nacelle of a ducted gas turbine engine may be positioned within a pylon used to mount the gas turbine engine to an aircraft (such as to a wing or fuselage of the aircraft).

In exemplary embodiments, the engine component 224 is selectively coupled to the core engine 146 or the core cowl 122 via a fastener 236. As shown in FIG. 9, the fastener 236 may be disposed between a core cowl structure 238 such as a strut or bracket, and a core engine structure 240 such as a strut, a casing or bracket. The core cowl structure 238 may be fixedly coupled to the core cowl 122, such that the core cowl structure 238 moves with the core cowl 122, as described below. By contrast, the core engine structure 240 is not moveable with the core cowl 122 and instead may be fixedly coupled to a stationary and structural component of the core engine 146, such as the compressor casing 210 (as in the embodiment depicted), or one or more of the combustor casing 212, turbine casing 214, or a support frame such as a compressor frame 241, a mid-frame, or rear support frame (not shown) or turbomachine exhaust nozzle 140 (FIG. 2), etc.

The fastener 236 may be fixedly connected to the engine component 224. The fastener 236 may comprise a cam lock type fitting, bayonet fitting, quarter-turn fastener or other mechanical or electromechanical fastener or device that allows selectively coupling the engine component 224 to the core cowl 122 or the core engine 146. In particular embodiments, the core cowl 122 defines or includes an access opening or hatch 242 wherein the fastener 236 is accessible from the access opening 242.

Figures 10, 11:
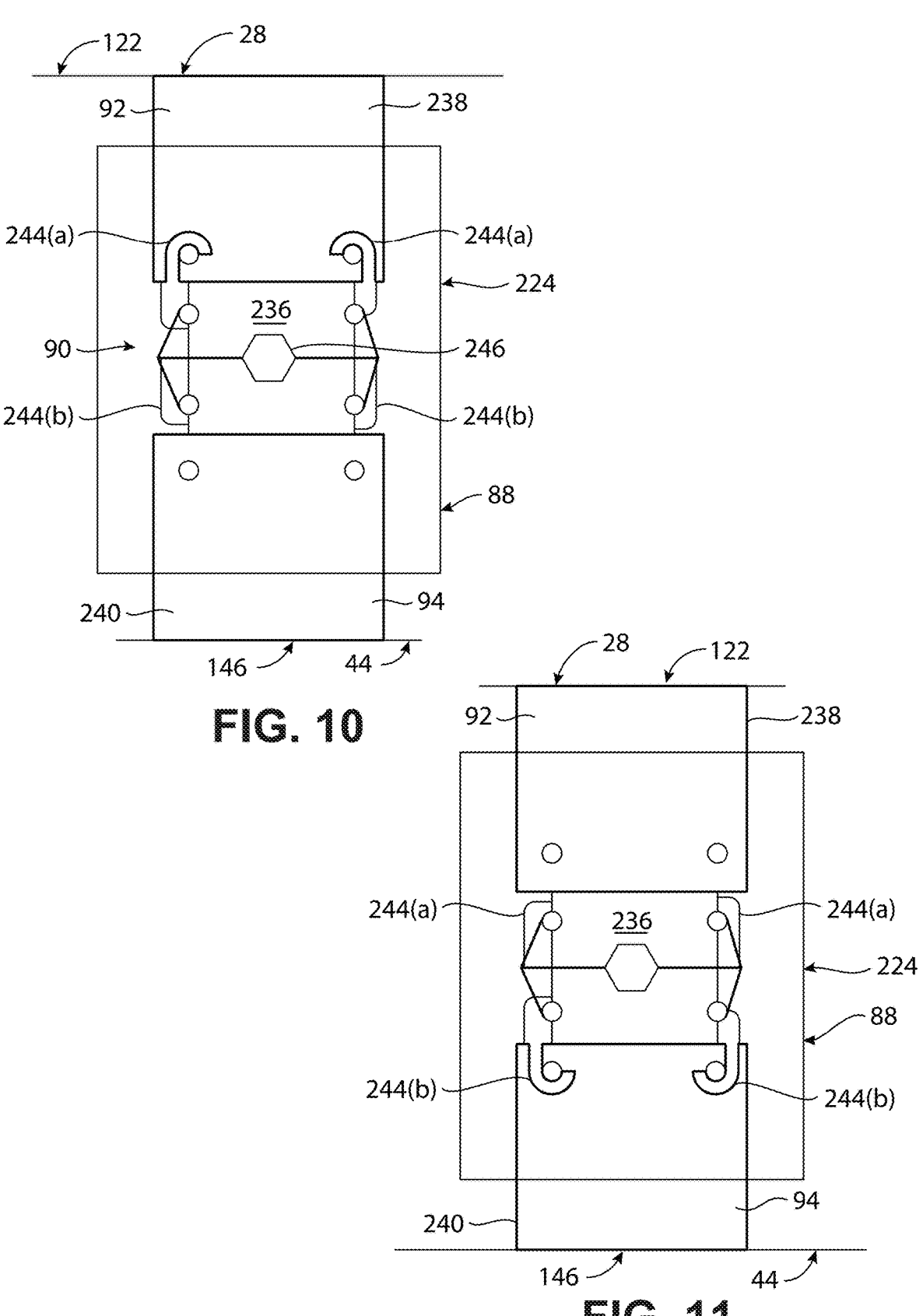
FIG. 10 is a schematic illustration including an engine component, a portion of a core cowl structure, an exemplary fastener and a portion of a core engine structure according to exemplary embodiments of the present disclosure.
FIG. 11 is a schematic illustration including an engine component, a portion of a core cowl structure, an exemplary fastener and a portion of a core engine structure according to exemplary embodiments of the present disclosure.

FIGS. 10 and 11 are schematic illustrations including engine component 224 or engine component 88, a portion of core cowl structure 238 or core cowl structure 92, an exemplary fastener 236 or fastener 90, and a portion of the core engine structure 240 or core engine structure 94 according to the present disclosure. In at least one embodiment, as shown in FIG. 10, the fastener 236, 90 includes a first plurality of articulating tabs 244(*a*) and a second plurality of articulating tabs 244(*b*). The tabs 244(*a*), 244(*b*) may be articulated about a pivot point 246 via a key or tool (not shown). The key or tool may inserted through the access opening 242, 98 shown in FIGS. 9 and 3.

In an exemplary embodiment, as show in FIG. 10, when in a first position the first plurality of tabs 244(*a*) engages with the core cowl structure 238, 92 and the second plurality of tabs 244(*b*) disengage from the core engine structure 240, 94, thereby coupling the engine component 224, 88 to the core cowl 122, 28 and decoupling the engine component 224, 88 from the core engine 146, 44. In this configuration, the engine component 224, 88 will travel with the core cowl 122, 28 when it is opened and rotated outward from the core engine 146, 44. In addition, in this configuration, the core cowl 122, 28 may carry the weight load of the engine component 224, 88 during operation of the gas turbine engine 100.

As shown in FIG. 11, when in a second position the first plurality of tabs 244(*a*) are disengaged from the core cowl structure 238, 92 and the second plurality of tabs 244(*b*) are engaged with the core engine structure 240, 94 thereby coupling the engine component 224, 88 to the core engine 146, 44, and decoupling the engine component 224, 88 from the core cowl 122, 28. In this configuration, the engine component 224, 88 will be rigidly coupled to the core engine 146, 44 whether the core cowl 122, 28 is opened or closed.

Figure 12:
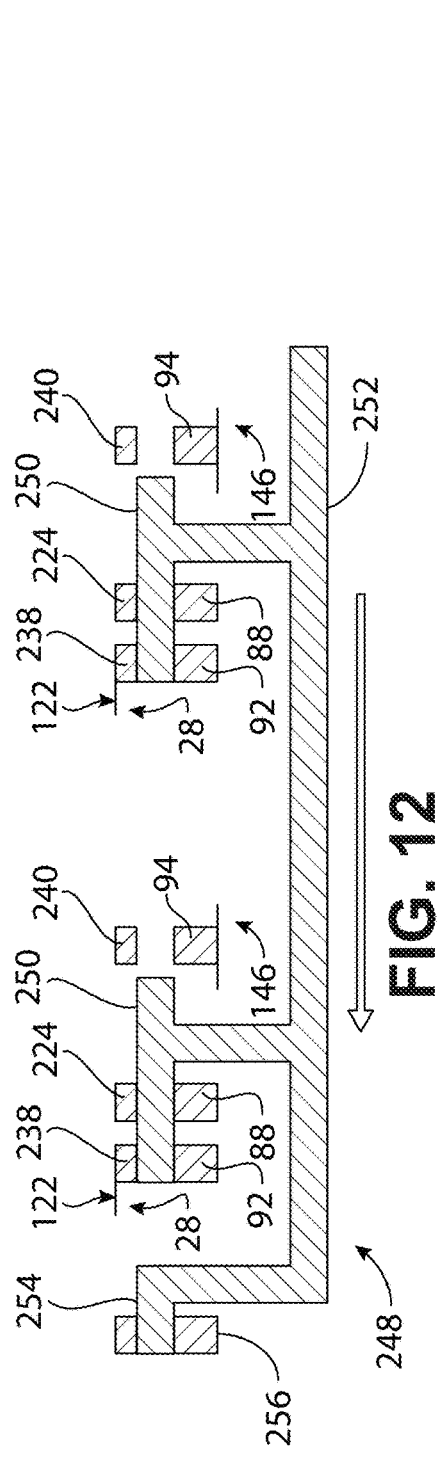
FIG. 12 is a schematic illustration including an engine component, a portion of a core cowl structure, a push-pull mechanism, and a portion of a core engine structure according to exemplary embodiments of the present disclosure.
Figure 13:
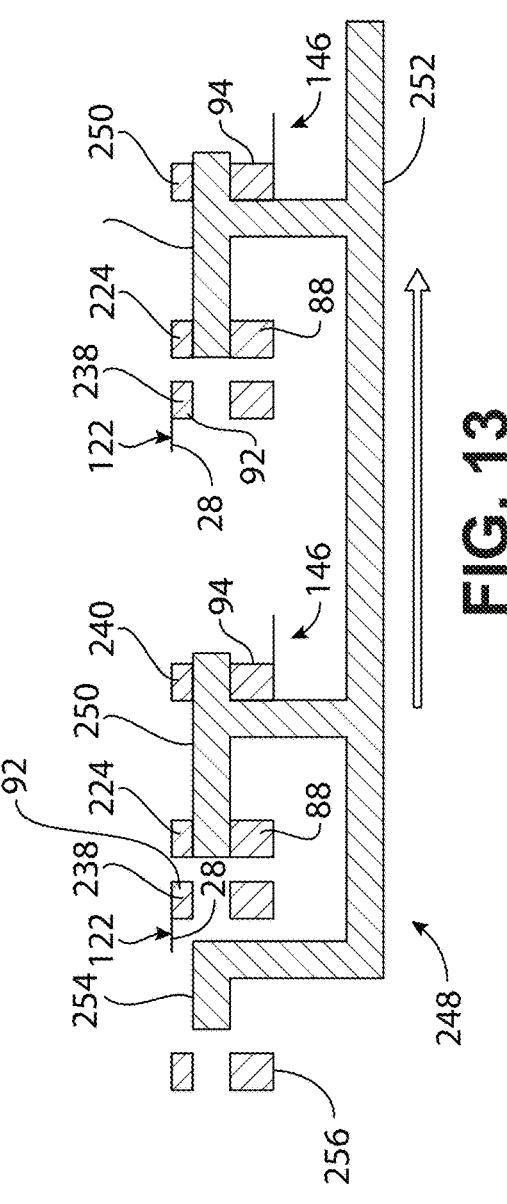
FIG. 13 is a schematic illustration including an engine component, a portion of a core cowl structure, a push-pull mechanism, and a portion of a core engine structure according to exemplary embodiments of the present disclosure.

FIGS. 12 and 13 are schematic illustrations including engine component 224, 88, a portion of core cowl structure 238, 92, a push-pull mechanism 248, and a portion of the core engine structure 240, 94 according to exemplary embodiments of the present disclosure. In various embodiments, as shown in FIGS. 12 and 13, the engine component 224, 88 is selectively coupled to the core cowl 122, 28 (FIG. 12) or the core engine 146 (FIG. 13) via push-pull mechanism 248. The push-pull mechanism 248 includes at least one protrusion or pin 250 fixed to a slidable rod 252. In a first position, as shown in FIG. 12, the pin(s) 250 engage(s) with the engine component 224, 88 and the core cowl 122, 28 via the core cowl structure 238, 92 and are disengaged from the core engine 146. In a second position, as shown in FIG. 13, the pin(s) 250 engage(s) with the with the engine component 224, 88 and the core engine 146, 44 via the core engine structure 240, 94 and are disengaged or decoupled from the core cowl 122, 28. In exemplary embodiments, the slidable rod 252 may be manipulated between the first position and the second position by a technician manually. In other embodiments, the slidable rod 252 may be manipulated between the first position and the second position hydraulically or electrically. The slidable rod 252 will be movable while the core cowl 122, 28 is in a closed or at least partially closed state.

In exemplary embodiments as shown in FIGS. 12 and 13, the push-pull mechanism includes a second pin 254. As shown in FIG. 12 the second pin 254 engages with a door counterbalance mechanism or system 256 when the first pin(s) 250 is/are engaged with the core cowl 122, 28 and the engine component 224, 88. In exemplary embodiments, the door counterbalance mechanism 256 includes either a spring, or pressurized gas strut to counterbalance the weight of the core cowl 122, 28 as it is manipulated between open and closed states.

As alluded to earlier, the inventors discovered, unexpectedly during the course of gas turbine engine design—i.e., designing gas turbine engines having a variety of different primary fan and secondary fan characteristics—and evaluating an overall propulsive efficiency, significant relationships exist in a ratio of a core cowl diameter ratio (CDR), equal to the peak cowl diameter (D) divided by the maximum combustor casing diameter (d), and a core cowl length ratio (CLR), equal to the under-core cowl axial length (L1) divided by the overall core axial length (L). These relationships can be thought of as an indicator of the ability of a gas turbine engine to provide sufficient packaging space between the core engine combustor casing and the core cowl for packaging/mounting various accessories and/or engine systems, while also having a core engine capable of producing sufficient power to drive primary and secondary fans, particularly in more complex engine designs.

As engines become more complex (e.g., hybrid electric/load sharing between shafts, closed-loop thermal management systems, hot fuel, unducted, etc.), a reduction in core cowl size is concomitantly desired for greater overall engine performance. This, along with, in the case of an open rotor design (FIG. 4), the elimination of an outer nacelle enclosing a primary fan of the engine, has posed a significant challenge with engine accessory and engine support system packaging design that was not previously present in earlier engine designs. It will also be appreciated that a reduction in overall core engine axial length results in a reduction in space for packaging various engine accessories and support system components which are typically coupled to the outer nacelle, the core engine casings, or to various support frames of the gas turbine engine, generally beneath the core cowl.

It will be appreciated that a larger core cowl diameter is preferred to accommodate the packaging needs of a particular gas turbine engine design. However, if the core cowl diameter is too large various issues such as excess drag and weight may affect overall engine performance or propulsion efficiency. In addition, or in the alternative, if the core cowl is too large for a particular gas turbine engine design, issues with mounting and installing the engine occur. It will also be appreciated that a smaller core length for a given engine design provides various benefits, including but not limited to, reduced overall engine weight. This particular design is enabled at least in part by the three-stream engine design described above which provides less flow through the engine core for a given thrust output. However, it is to be appreciated that the engine length cannot be too small because of the power required to drive primary and mid-fans of the three-stream engine.

It will moreover be appreciated that elements that previously were previously mounted to nacelle and that are temperature sensitive, i.e., electronics, FADEC, have more limited/restricted areas where they can reside within the engine. For example, it was found that for the 3-stream engine embodiment that the FADEC is preferably located in the space located between third stream and outer nacelle, or forward of the compressor.

It will moreover be appreciated that inventors considered placement alternatively within the aircraft pylon supporting the engine (not shown in drawings). The discovery, below (Expression (1) and (2)) may be equally insightful and define the packaging size in those cases where some of the engine components normally housed in nacelle are moved to pylon, and where those components are located within the core cowl.

Notably, however, an engine having a core cowl diameter ratio (CDR) within the ranges described herein, particularly when also having a core engine length ratio (CLR) within the ranges described herein, may be particularly suited for mounting one or more of the components traditionally found within a nacelle of a ducted gas turbine engine within the core cowl of the gas turbine engine. For example, an engine having a core cowl diameter ratio (CDR) within the ranges described herein, particularly when also having a core engine length ratio (CLR) within the ranges described herein, may have a sufficient amount of room for these components, and further may have a sufficient amount of separation from hot turbomachinery during operation to allow positioning of one or more of these components within the core cowl, for example, power electronics and a Full Authority Digital Engine Control (FADEC), temperature-sensitive sensors, power cables.

As noted above, the inventors of the present disclosure discovered bounding the relationships defined by the core cowl diameter ratio (CDR) to the core engine length ratio (CLR) can result in a gas turbine engine maintaining or even improving upon a desired propulsive efficiency, while also taking into account the gas turbine engine's packaging concerns, weight concerns, and power requirements. The relationship discovered, infra, can identify an improved engine configuration suited for a particular mission requirement, one that takes into account installation, packaging and loading, power requirements, and other factors influencing the optimal choice for an engine configuration.

In addition to yielding an improved gas turbine engine, as explained in detail above, utilizing this relationship, the inventors found that the number of suitable or feasible gas turbine engine designs incorporating a primary fan and a secondary fan, and defining a third stream, capable of meeting both the propulsive efficiency requirements and packaging, weight could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationships providing for the improved gas turbine engine, discovered by the inventors, are expressed as:

$$CDR = D/d \tag{1}$$

$$CLR = L1/L \tag{2}$$

where CDR is maximum core cowl diameter D to maximum combustor casing diameter ratio d, and CLR is under-core cowl axial length L1 divided by overall core axial length L.

Values for various parameters of the influencing characteristics of an engine defined by Expressions (1) and (2) are set forth below in TABLE 1:

TABLE 1

| Symbol | Description | Ranges appropriate for using Expression (1) |
|---|---|---|
| D/d | Core Cowl Diameter Ratio (CDR) | 2.7 to 3.5, such as 2.8 to 3.3, such as 2.9 to 3.1 |
| L1/L | Core Cowl Length Ratio (CLR) | 0.25 to 0.50, such as 0.3 to 0.45, such as 0.35 to 0.45, such as .40 to .45 |

Figure 14:
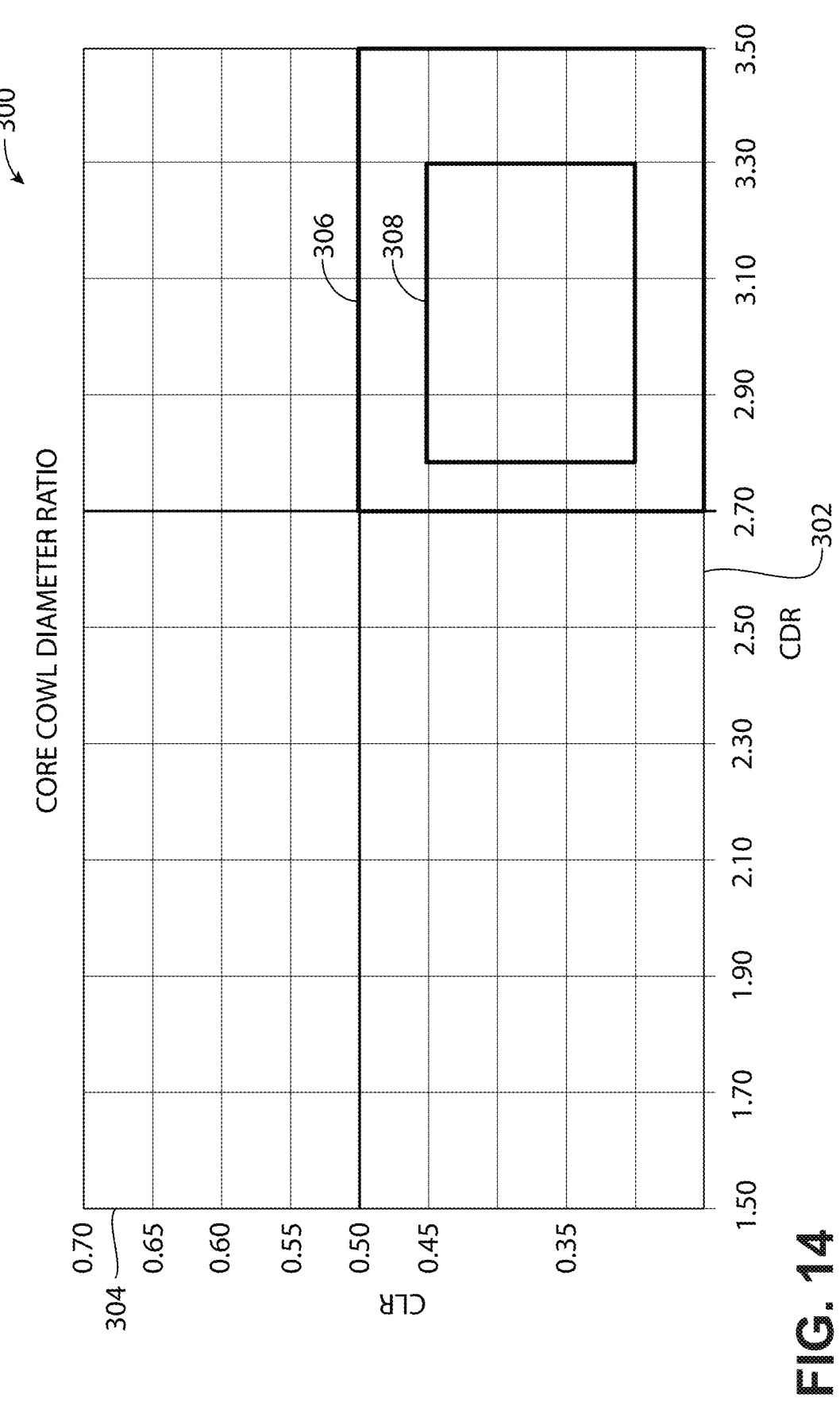
FIG. 14 is a graphical representation illustrating a relationship between CDR and CLR and showing relationships between the various parameters of Expressions (1) and (2) according to exemplary embodiments of the present disclosure.

FIG. 14 is a plot 300 illustrating the relationship between CDR and CLR and showing the relationships between the various parameters of Expressions (1) and (2). The plot 300 includes CDR values on an X-axis 302 and CLR values on a Y-axis 304. The plot 300 depicts an area 306 of CDR and CLR values where a gas turbine engine would provide sufficient packaging space between a core engine combustor casing and a core cowl for packaging/mounting various accessories and/or engine systems, while also having a core engine capable of producing sufficient power to drive primary and secondary fans. The plot 300 further depicts an area 308 of CDR and CLR values where a gas turbine engine may provide more desired packaging space between the core engine combustor casing and the core cowl for packaging/ mounting various accessories and/or engine systems, while also having the core engine capable of producing sufficient power to drive primary and secondary fans. The exemplary gas turbine engine of FIG. 4 defines a CDR and a CLR within the area 308.

It will be appreciated that although the discussion above is generally relating to the open rotor engine 100 described above with reference to, e.g., FIG. 8, in various embodiments of the present disclosure, the relationships outlined above with respect to, e.g., Expressions (1) and (2) may be applied to any other suitable engine architecture.

Figure 15:
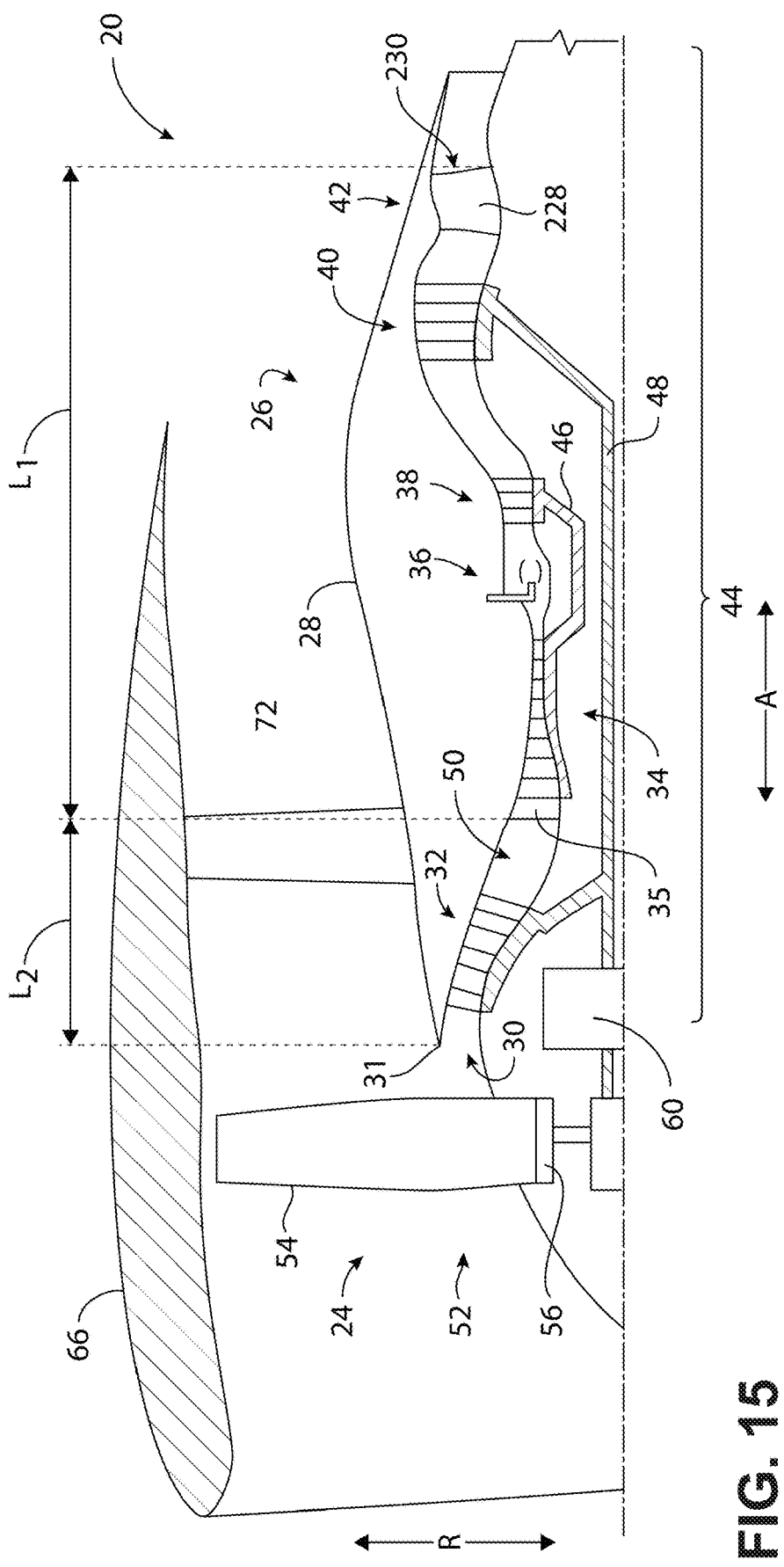
FIG. 15 is a schematic cross-sectional view of a ducted turbofan engine in accordance with an exemplary embodiment of the present disclosure.

Referring now to FIG. 15, a gas turbine engine 20 in accordance with another exemplary aspect of the present disclosure is provided. The exemplary gas turbine engine of FIG. 15 is configured in a similar manner as the exemplary gas turbine engine 20 described above with reference to FIGS. 2 and 3. Accordingly, the exemplary gas turbine engine 20 of FIG. 15 is configured as a ducted gas turbine engine (i.e., includes a fan 52 with a nacelle 66 enclosing the fan 52). The same or similar numbers may refer to the same or similar parts.

For example, the gas turbine engine 20 generally includes a includes a fan section 24 and a turbomachine 26 disposed downstream from the fan section 24. The exemplary turbomachine 26 depicted generally includes an engine casing or core cowl 28 that defines an annular core inlet 30. The core cowl 28 at least partially encases, in serial flow relationship, a compressor section including a booster or low-pressure compressor 32 and a high-pressure compressor 34, a combustion section 36, a turbine section including a high-pressure turbine 38 and a low-pressure turbine 40, and at least a portion of a jet exhaust nozzle 42. Together, these components or sections make up a core engine 44 of the turbomachine 26.

A high-pressure shaft 46 drivingly connects the high-pressure turbine 38 to the high-pressure compressor 34. A low-pressure shaft 48 drivingly connects the low-pressure turbine 40 to the low-pressure compressor 32. The compressor section, combustion section 36, turbine section, and jet exhaust nozzle 42 together define a working gas flow path 50 through the gas turbine engine 20.

For the embodiment depicted, the fan section 24 includes a fan 52 having a plurality of fan blades 54 coupled to a disk 56 in a spaced apart manner. As depicted, the fan blades 54 extend outwardly from disk 56 generally along the radial direction R. The fan blades 54 are rotatable about the longitudinal centerline 22 by the low-pressure shaft 48.

In an exemplary embodiment, as shown in FIG. 15, the gas turbine engine 20 further includes a gearbox 60. The gearbox 60 includes a plurality of gears for adjusting a rotational speed of the fan 52 relative to a rotational speed of the low-pressure shaft 48, such that the fan 52 and the low-pressure shaft 48 may rotate at more efficient relative speeds. The gearbox 60 may be any type of gearbox suitable to facilitate coupling the low-pressure shaft 48 to the fan 52 while allowing each of the low-pressure turbine 40 and the fan 52 to operate at a desired speed. For example, in some embodiments, the gearbox 60 may be a reduction gearbox.

More specifically, in some embodiments, the gearbox 60 may define a gear ratio of the input rotational speed (e.g., the low-pressure shaft 48) to the output rotational speed greater than 3 and less than 14. For example, in certain exemplary embodiments, the gearbox 60 may define a gear ratio greater than 4, such as greater than 5, such as greater than 6 and less than 12, such as less than 11. Inclusion of the gearbox 60 with a relatively high gear ratio may allow for a relatively high diameter fan 52 in combination with a relatively high speed low-pressure turbine 40.

As will also be appreciated, the gas turbine engine 20 defines an under-core cowl axial length (L1) along an axial direction A. More specifically, the gas turbine engine 20 includes a high-pressure compressor inlet guide vane 35 having a leading edge (not labeled), where the under-core cowl axial length (L1) is measured along the axial direction A from the leading edge of the high-pressure compressor inlet guide vane 35 to a trailing edge 230 of a strut 228 extending through the exhaust nozzle 42 (which may be a strut of a turbine rear frame). The under-core cowl axial length (L1) is therefore generally a measure along the axial direction A from the high-pressure compressor 34 to the exhaust of the gas turbine engine 20.

Further, the gas turbine engine 20 defines an initial compression axial length (L2) along the axial direction A. The initial compression axial length (L2) is measured along the axial direction A from a splitter 31 positioned at the inlet 30 of the turbomachine 26 to the leading edge of the high-pressure compressor inlet guide vane 35. In the embodiment depicted, the low-pressure compressor 32 is located downstream of the splitter 31 and upstream of the leading edge of the high-pressure compressor inlet guide vane 35 (and is the only compressor within this axial location).

It will be appreciated, however, that in other exemplary embodiments, the compressor section may have one or more intermediate stages of compression (e.g., an intermediate-pressure compressor in addition to the low-pressure compressor 32).

Further, it will be appreciated that the exemplary gas turbine engine 20 depicted in FIG. 15 may be configured as a narrow-body engine (i.e., an engine configured to provide thrust to a narrow-body aircraft). In such a manner, the gas turbine engine 20 may be configured to generate at least 18,000 pounds of thrust and less than 80,000 pounds of thrust during operation at a rated speed during standard day operating conditions, such as between 25,000 and 60,000 pounds of thrust during operation at a rated speed during standard day operating conditions, such as between 25,000 and 50,000 pounds of thrust during operation at a rated speed during standard day operating conditions.

It will be appreciated that although the description of the under-core cowl axial length (L1) and the initial compression axial length (L2) is described above with reference to the gas turbine engine 20 of FIG. 15 (which includes a speed reduction device, i.e., reduction gearbox 60, for transmitting shaft power to the main or primary fan, a nacelle 66 enclosing fan 52; and is a two stream engine, i.e., includes a bypass airflow passage 72 and a working gas flowpath 50, but not a third stream), in other embodiments, aspects of the present disclosure may be applied to other suitable gas turbine engines. For example, in other embodiments, the aspects described herein with respect to the under-core cowl axial length (L1) and the initial compression axial length (L2) (and the ICLR, as defined below), may apply to an unducted gas turbine engine (i.e., does not include a nacelle surrounding the primary fan; see, e.g., FIG. 4), a three-stream gas turbine engine (i.e., includes a third stream; see, e.g., FIG. 4), etc. Notably, when applied to a three-stream gas turbine engine, the initial compression axial length (L2) may be defined from a splitter at an upstream-most inlet to a ducted portion of the engine, downstream of the primary fan (e.g., the splitter at the engine inlet 182 in FIG. 4) to the leading edge of the high-pressure compressor inlet guide vane 35.

As will be appreciated from the description herein, the inventors further discovered, unexpectedly, during the course of designing high bypass gas turbine engines (i.e., bypass ratio above 12) having a variety of turbomachine characteristics, a significant relationship exist in a ratio of the initial compression axial length (L2) to the under-core cowl axial length (L1). This ratio, referred to herein as an initial compression length ratio (ICLR), reflects a space available for packaging, including the portion of the under-cowl space available for locating more temperature-sensitive components for engines, and accounting for the less space available because the fan duct size and space typically chosen for storing accessories and power or communications equipment is limited or no longer available (as bypass ratio increases, the weight and drag associated with the fan duct correspondingly increases in size so as to becomes too prohibitive unless the fan duct storage volume is reduced in size, thereby mitigating the drag and weight associated with the higher bypass area).

In some embodiments, when combined with the CDR, it was unexpectedly found that an undercowl space was discovered that best balanced the need for accommodating a high-pressure compressor having 9, 10 or 11 stages; or a high-pressure compressor having less than 8 stages combined with a low-pressure compressor (or booster) having 4, 5 or 6 stages, while meeting a need for reducing a drag profile or skin friction of the engine casing as much as possible. In other embodiments, it was unexpectedly found that an undercowl space was discovered that best balanced the need for accommodating a low-pressure turbine having 4, 5 or 6 stages while balancing the need for reducing a drag profile or skin friction of the engine casing as much as possible. Importantly, in each of these examples the CDR and ICLR values also account for the packaging needed in the casing for components that may no longer be stored in the fan nacelle or when the fan nacelle is no longer present (e.g., as discussed earlier in connection with the open fan).

Compared to more traditional turbofan engines that have a relatively low diameter fan that rotate relatively quickly as a result of being driven directly from a low-pressure turbine of the turbofan engine (i.e., without a reduction gearbox), the inventors have found that by using a higher diameter fan driven through a reduction gearbox, the under-core cowl length (L1) may be reduced. In particular, such allows the primary fan to rotate at a lower angular rate relative to the low-pressure turbine, which efficiency can increase by rotating at a higher rate while maintaining a desired tip speed of the fan. Higher speeds of the low-pressure turbine may allow for less stages while extracting the same (or greater) amount of power. The lower speeds of the fan may allow for the fan to increase in diameter, which leads to a higher bypass ratio and lowered specific fuel consumption.

However, reduction of L1 may impose additional stress on high-pressure components (e.g., the high-pressure compressor and a high-pressure turbine). In particular, increases in initial compression length ratio (ICLR) may generally require the overall compressor ratio to be increased, which generally results in higher temperatures and pressures at an exit of the high-pressure compressor and at an inlet to the high-pressure turbine. Accordingly, increasing the initial compression length ratio (ICLR) too much may create an undesirable amount of stress (and premature wear) on the gas turbine engine.

In addition to yielding an improved turbofan engine, as explained in detail above, utilizing this relationship, the inventors found that the number of suitable or feasible turbofan engine designs capable of meeting both the propulsive efficiency requirements and limited stress and wear requirements could be greatly diminished, thereby facilitating a more rapid down selection of designs to consider as a turbofan engine is being developed. Such a benefit provides more insight to the requirements for a given turbofan engine well before specific technologies, integration and system requirements are developed fully. Such a benefit avoids late-stage redesign.

The desired relationships providing for the improved turbofan engine, discovered by the inventors, are expressed as:

$$ICLR = L2/L1 \qquad (3)$$

where ICLR is a ratio of the initial compression axial length (L2) to the under-core cowl axial length (L1).

Figure 16:
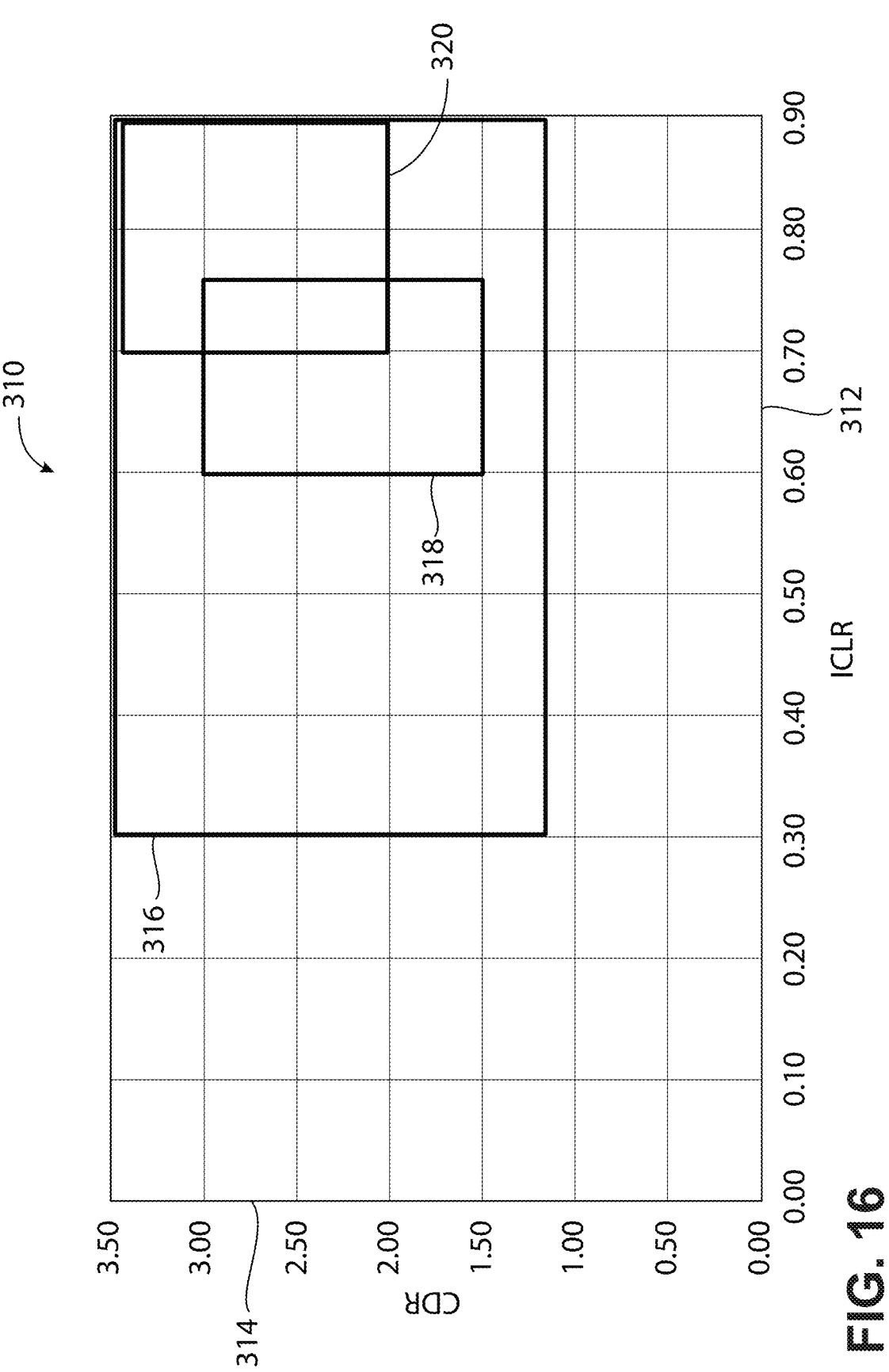
FIG. 16 is a graphical representation illustrating initial compression length ratio (ICLR) values for gas turbine engines in accordance with various exemplary embodiments of the present disclosure.

FIG. 16 is a plot 310 illustrating ICLR values, and more specifically, illustrating ICLR values along an X-axis 312 and CDR (Core Cowl Diameter Ratio) along the Y-axis 314. The plot 310 depicts an area 316 of ICLR values of a gas turbine engine in accordance with one or more aspects of the present disclosure where the gas turbine engine would provide desirable propulsive efficiency without overly stressing and wearing the gas turbine engine. The area 316 reflects ICLR values greater than or equal to 0.3 and less than or equal to 0.9, with CDR values greater than or equal to 1.24 and less than or equal to 3.5.

Referring still to the plot 310 of FIG. 16, the plot 310 further defines an area 318 of ICLR values of a gas turbine engine in accordance with one or more additional aspects of the present disclosure. The area 318 reflects ICLR values greater than or equal to 0.60 and less than or equal to 0.75, with CDR values greater than or equal to 1.5 and less than or equal to 3.0. The gas turbine engines of the present disclosure falling within the area 318 may be two stream turbofan engines (i.e., turbofan engines without a third stream), ducted turbofan engines, or both. As will be appreciated, two stream turbofan engines may not require as large of an initial compression axial length L2, and similarly ducted turbofan engines may be limited in maximum fan diameter (which as will be appreciated from the discussion above may similarly limit the ICLR). The exemplary gas turbine engine of FIG. 15 defines an ICLR and CDR within the area 318.

Referring still to the plot 310 of FIG. 16, the plot 310 further defines an area 320 of ICLR values of a gas turbine engine in accordance with one or more further aspects of the present disclosure. The area 320 reflects ICLR values greater than or equal to 0.70 and less than or equal to 0.89, with CDR values greater than or equal to 2.0 and less than or equal to 3.4. The gas turbine engines of the present disclosure falling within the area 320 may be three-stream turbofan engines (i.e., turbofan engines including a third stream, such as the turbofan engines of FIGS. 4, 6, 8 and 9 having fan ducts 172), unducted turbofan engines, or both. As will be appreciated, three-stream turbofan engines may include a larger initial compression axial length L2 (e.g., by virtue of the mid-fan), and similarly unducted turbofan engines may include a fan with a larger fan diameter (which as will be appreciated from the discussion above may allow for an increase in the ICLR). The exemplary gas turbine engine of FIG. 4 defines an ICLR and CDR within the area 320.

Notably, the above areas 316, 318, 320 may more specifically be directed to narrow-body engines. In such a manner, the gas turbine engines within these ranges may be configured to generate at least 18,000 pounds of thrust and less than 80,000 pounds of thrust during operation at a rated speed during standard day operating conditions, such as between 25,000 and 60,000 pounds of thrust during operation at a rated speed during standard day operating conditions, such as between 25,000 and 50,000 pounds of thrust during operation at a rated speed during standard day operating conditions. As will be appreciated, as an engine extends outside of this thrust class, a relationship of fan diameter, fan speed, high-pressure compressor size, and/or low-pressure turbine size may interact differently, such that the areas of ICLR values may not as readily capture desired gas turbine engines.

Another example of an unducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot ($hp/ft^2$) or greater at cruise altitude during a cruise operating mode. In particular embodiments of the engine, structures and methods provided herein generate power loading between 80 $hp/ft^2$ and 160 $hp/ft^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may be configured to generate at least 25,000 pounds and less than 80,000 of thrust during operation at a rated speed, such as between 25,000 and 50,000 pounds of thrust during operation at a rated speed, such as between 25,000 and 40,000 pounds of thrust during operation at a rated speed. Alternatively, in other exemplary aspects, an engine of the present disclosure may be configured to generate much less power, such as at least 2,000 pounds of thrust during operation at a rated speed.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio R1/R2 may be between 1 and 10, or 2 and 7, or at least 3.3, at least 3.5, at least 4 and less than or equal to 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. A fan pressure ratio (FPR) for the primary fan of the fan assembly can be 1.04 to 2.20, or in some embodiments 1.05 to 1.2, or in some embodiments less than 1.08, as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low-pressure shaft coupled to a low-pressure turbine). In some embodiments, a gear ratio of the input rotational speed to the output rotational speed is between 3.0 and 4.0, between 3.2 and 3.5, or between 3.5 and 4.5 (inclusive of the endpoints). In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low-pressure compressor may include 1 to 8 stages, a high-pressure compressor may include 4 to 15 stages, a high-pressure turbine may include 1 to 2 stages, and/or a low-pressure turbine (LPT) may include 1 to 7 stages. In particular, the LPT may have 4 stages, or between 4 and 7 stages. For example, in certain embodiments, an engine may include a one stage low-pressure compressor, an 11-stage high-pressure compressor, a two-stage high-pressure turbine, and 4 stages, or between 4 and 7 stages for the LPT. As another example, an engine can include a three-stage low-pressure compressor, a 10-stage high-pressure compressor, a two stage high-pressure turbine, and a 7 stage low-pressure turbine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (D) of the engine, L/D of the engine, desired cruise altitude, and/or desired operating cruise speed, or combinations thereof.

Also provided herein are exemplary embodiments of accessory gearboxes for versatile mounting of engine components such accessories that can include aircraft accessory devices and engine accessory devices. For open rotor engines, removing the outer nacelle significantly reduces storage space for accessories. The diameter of a core cowl can be increased to make room for the accessories between an engine casing and an inner surface of the core cowl, however, the core cowl diameter cannot be too large due to potential performance penalties such as excessive drag and installation difficulties. Similarly, the diameter of the fan cowl of the open rotor engine, which can also house accessories, cannot be too thick in a radial direction due to potential performance penalties. Exemplary accessory gearboxes described herein provide adaptive spacing and compact packaging of a variety of accessories within the core cowl or the fan cowl. These meet constraints as required above and further save a significant amount of space, cost, and weight. Additionally, while meeting the constraints as required above, the exemplary accessory gearboxes described herein can provide a maintenance benefit. That is, the accessory gearbox can allow for location of the gearbox and accessories coupled to the gearbox to be located in easy to access locations throughout the engine. One exemplary accessory gearbox includes a first portion located under the core cowl and a second portion located in a strut connecting the core cowl and the fan cowl. By extending a portion of the accessory gearbox into the strut, the wrap the accessory gearbox about the engine core is minimized and additional room is available for components in the core cowl space. Additional components can include, but are not limited to, one or more portions of an environmental control system.

The exemplary accessory gearboxes provided herein allow for unique placement of the accessories within one or both of the core cowl or the fan cowl, opening up doors to placements for accessories that allow a smaller overall axial length of the engine core in the engine, including, by way of example, an open rotor engine.

Figure 17:
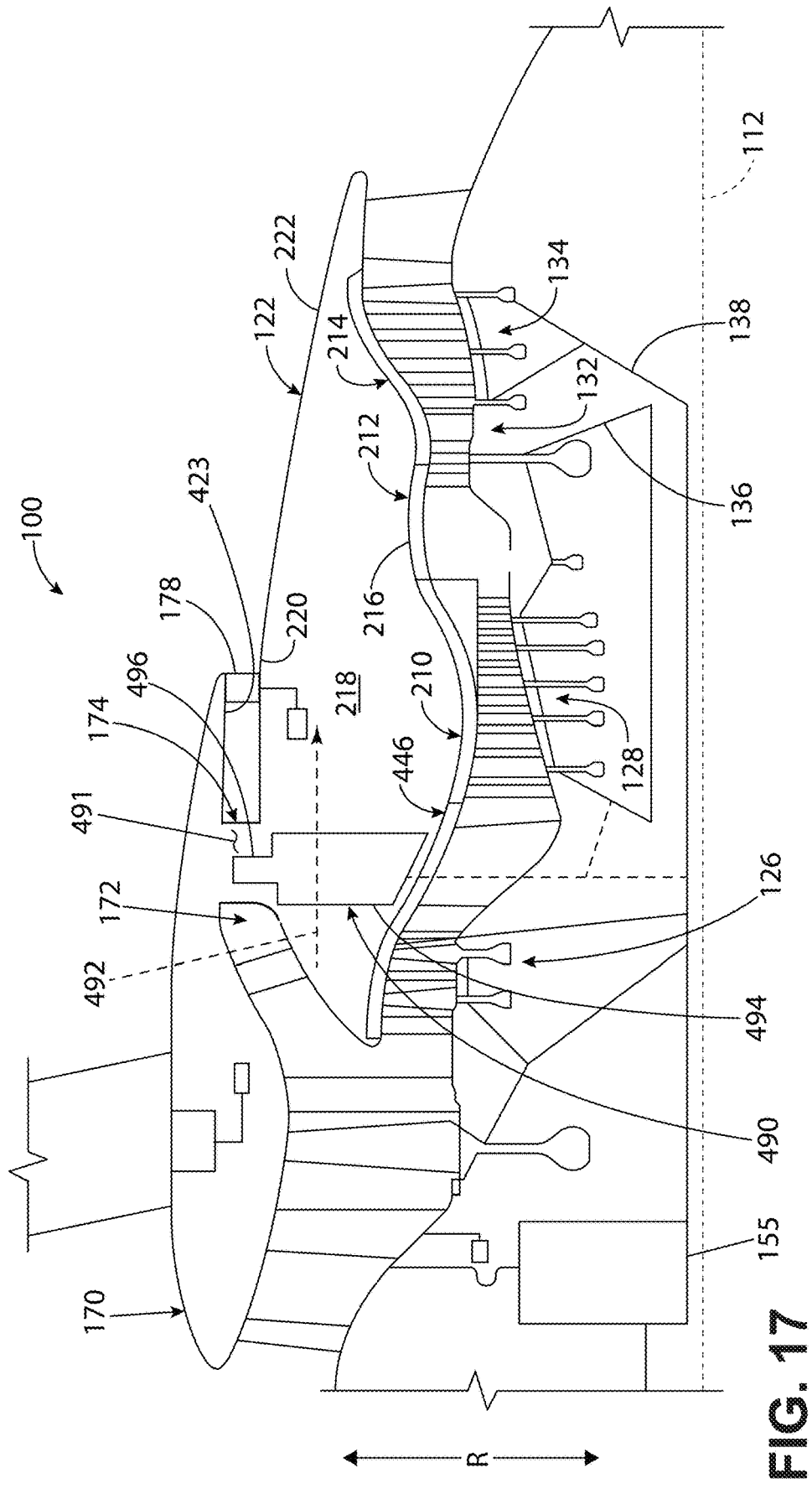
FIG. 17 is a schematic cross-sectional view of a portion of a core engine of the gas turbine engine as shown in FIG. 4 having an accessory gearbox, according to an exemplary embodiment of the present disclosure.

FIG. 17 is a schematic partial section view of the gas turbine engine 100. The high-pressure shaft 136 can be disposed coaxially about a turbine engine axis of rotation illustrated as the axial centerline 112 of the gas turbine engine 100 and drivingly connect the high-pressure turbine 132 to the high-pressure compressor 128. The low-pressure shaft 138, which is disposed coaxially about the axial centerline 112 of the gas turbine engine 100 drivingly connects the low-pressure turbine 134 to the low-pressure compressor 126 and/or portions of the fan section 150 (FIG. 4) via the speed reduction gearbox 155.

An accessory gearbox (AGB) 490 can be provided within the core cowl 122. That is, the AGB 490 is located at least partially located in the space 218. It is contemplated that the AGB 490 is mounted or operably coupled to an engine casing 446 or other portion of the gas turbine engine 100 with a hinge mount. That is, when one or more clasps or fasteners is removed, the AGB 490 can swing away from the engine casing 446 or at least part of the outer surface 216.

An accessory gearbox axis 492 can be defined by the AGB 490. In the illustrated example, the accessory gearbox axis 492 is parallel to the axial centerline 112 when the AGB 490 is fully installed and in use within the gas turbine engine 100. It is contemplated, however, that the accessory gearbox axis 492 and the axial centerline 112 can be at any suitable angle and need not be parallel. While illustrated as having a single axis of rotation, it is contemplated that the AGB 490 can include several axes of rotation.

The AGB 490 includes a first portion 494 and a second portion 496. The first portion 494 is located within the core cowl 122. That is, the first portion 494 is located between the inner surface 220 of the core cowl 122 and the outer surface 216 of the engine casing 446, where the engine casing 446 includes the compressor casing 210, the combustor casing 212, and the turbine casing 214. The first portion 494 of the AGB 490 can straddle or curve around portions of the engine casing 446.

The second portion 496 of the AGB 490 is located between the core cowl 122 and the fan cowl 170. That is, the second portion 496 of the AGB 490 is located between outer surface 222 of the core cowl 122 and a radially inner surface 423 of the fan cowl 170, where the radially inner surface 423 defines a portion of the fan duct 172. Optionally, the second portion 496 of the AGB 490 can operably couple to one or more components located in the fan cowl 170. However, it is contemplated that a part of the second portion 496 of the AGB 490 can extend past the radial inner surface 423 of the fan cowl 170, as further illustrated in FIG. 24.

While illustrated as having two portions, it is contemplated that the AGB 490 can include just a first portion located in the space 218.

At least one strut, illustrated as the strut 174, can extend radially from the core cowl 122 to the fan cowl 170. The strut 174 can operably couple the core cowl 122 and the fan cowl 170. It is contemplated that at least a part of the second portion 496 of the AGB 490 is located in a hollow portion 491 of the strut 174.

The second portion 496 of the AGB 490 is illustrated as being perpendicular to the accessory gearbox axis 492. However, this need not be the case and it is further contemplated that the second portion 496 and the accessory gearbox axis 492 can be at any relative angle.

While illustrated as extending into the strut 174, it is contemplated that the AGB 490 can extend into any strut or component that connects the core cowl 122 to the fan cowl 170. That is, for example, a portion or portions of the AGB 490 can extend through the strut 174, the fan exhaust nozzle 178, a strut 498 (FIG. 18) or any combination thereof.

Figure 18:
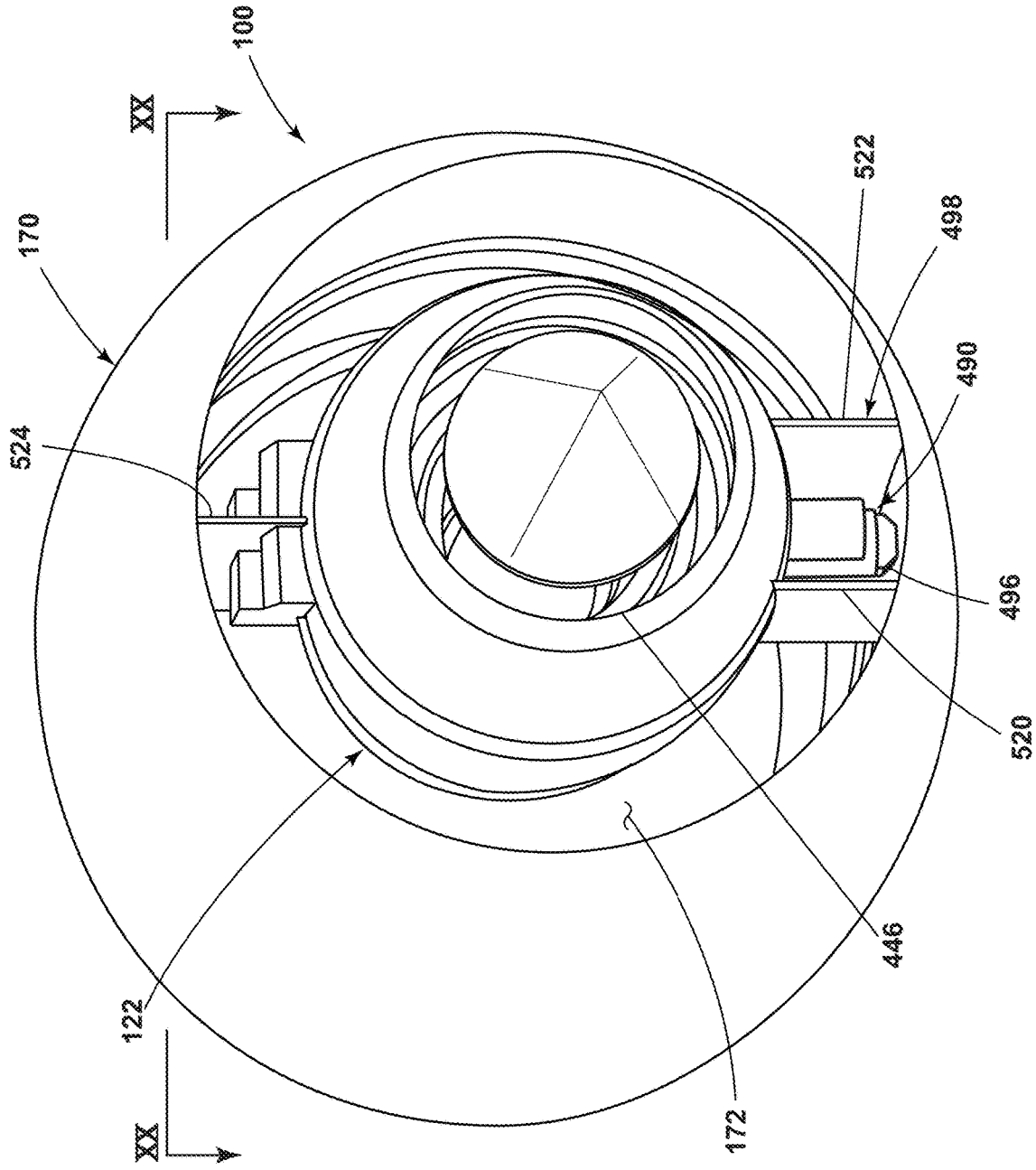
FIG. 18 is a rear perspective view of selected components of the gas turbine engine of FIG. 17, according to aspects of the present disclosure.

FIG. 18 further illustrates static support structures of the gas turbine engine 100 and the location of the second portion 496 of the AGB 490 with respect thereto. That is, while illustrated in FIG. 17 as located in the strut 174, the AGB 490 can extend through any strut, including lower strut 498 as illustrated by way of further non-limiting example in FIG. 18. It is also contemplated that the AGB 490 can extend through a side strut or any combination of multiple struts. For clarity, FIG. 18 only includes the fan cowl 170, the core cowl 122, the engine casing 446, support struts including the strut 498, and the second portion 496 of the AGB 490. The strut 498 that extends through the fan duct 172 includes a first wall 520 and a second wall 522 spaced from the first wall 520, although any number of walls is contemplated. While illustrated as open, it is contemplated that the first wall 520 and second wall 522 can be coupled or otherwise connected aft of the second portion 496 of the AGB 490. It is further contemplated that the first wall 520 and the second wall 522 can join at a point forward of the second portion 496 of the AGB 490. It will be understood that the strut 498 can form an aerodynamic housing for at least part of the second portion 496.

An upper strut 524, is illustrated as having a single wall. However, it is contemplated that the upper strut 524 can have different structure, such as, for example, structure similar to the strut 174 (FIG. 17). That is, the upper strut 524 can be reconfigured to house or partially surround the second portion 496 of the AGB 490 or another portion of the AGB 490. It will be understood that the second portion 496 of the AGB 490 can be located in any part of the fan duct 172. This includes but is not limited to within a strut located anywhere about the gas turbine engine 100.

Figure 19:
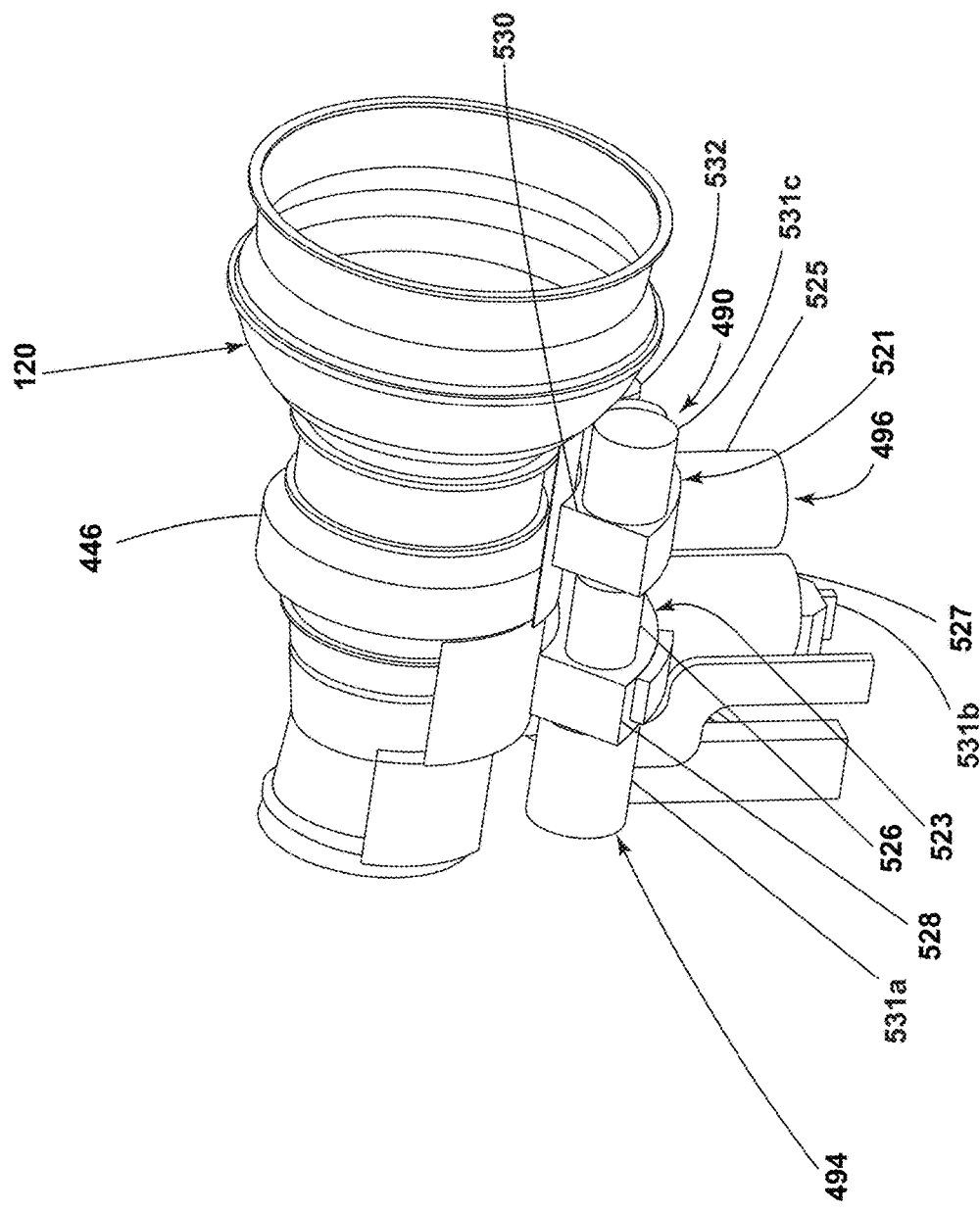
FIG. 19 is a side perspective view of the selected components of the gas turbine engine of FIG. 17, further illustrating the accessory gearbox according to aspects of the present disclosure.

FIG. 19 further illustrates the AGB 490 provided with the engine casing 446 about the turbomachine 120. The core cowl 122, fan cowl 170, and internal portions of the turbomachine 120 have not been illustrated for clarity. A set of forks illustrated as a first fork 521 and a second fork 523 can be included in the AGB 490. As used herein, the term "fork" is a Y-shaped object having an upright or base from which two arms branch off in different directions.

In the illustrated example, the first fork 521 includes a first base portion 525 defined by a part of the second portion 496 of the AGB 490. A first arm 530 and a second arm 532 extend from the first base portion 525. The first arm 530 and the second arm 532 are part of the first portion 494 of the AGB 490 that can straddle the turbomachine 120 or the engine casing 446. That is, the as the base portion 525 extends, forks, splits, branches, or otherwise couples to the first arm 530 and the second arm 532, where the first arm 530 and the second arm 532 form a V-shape, U-shape, or the like, in order to cradle, straddle, or otherwise partially circumscribe the turbomachine 120 or the engine casing 446.

Similarly, the second fork 523 can be defined by a second base portion 527 that forks, splits, or otherwise couples to a first arm 528 and a second arm (not shown as it wraps behind the engine casing 446) that straddle the turbomachine 120 or the engine casing 446. It is contemplated that any number of one or more forks can be included in the AGB 490.

The first fork 521 and the second fork 523 are illustrated as being spaced along the accessory gearbox axis 492 (FIG. 17). The first fork 521 and the second fork 523 can be coupled via one or more of a drive shaft, gearbox, hydraulic drive, or the like. The drive shaft or a hydraulic drive can include one or more casings 526 positioned between the first fork 521 and the second fork 523. It is contemplated that only a single fork can be included or that additional sections, casing, drive shafts, or the like, can be included to increase the number of interfaces or forks.

The AGB 490 can couple to any number of interfaces, illustrated, by way of non-limiting example as interfaces 531a, 531b, 531c. Systems powered by the AGB 490 can be located at axially or radially spaced locations relative to the AGB 490. By way of example, engine accessories or interfaces can include, but are not limited to, any one or more of an output shaft, bevel gear interface, fuel pump, transfer gearbox, lubrication pump, air compressor, scavenge pump, electrical generator, fuel control, fuel pump, permanent magnet alternator, lubrication pump, or hydraulic pump.

Figure 20:
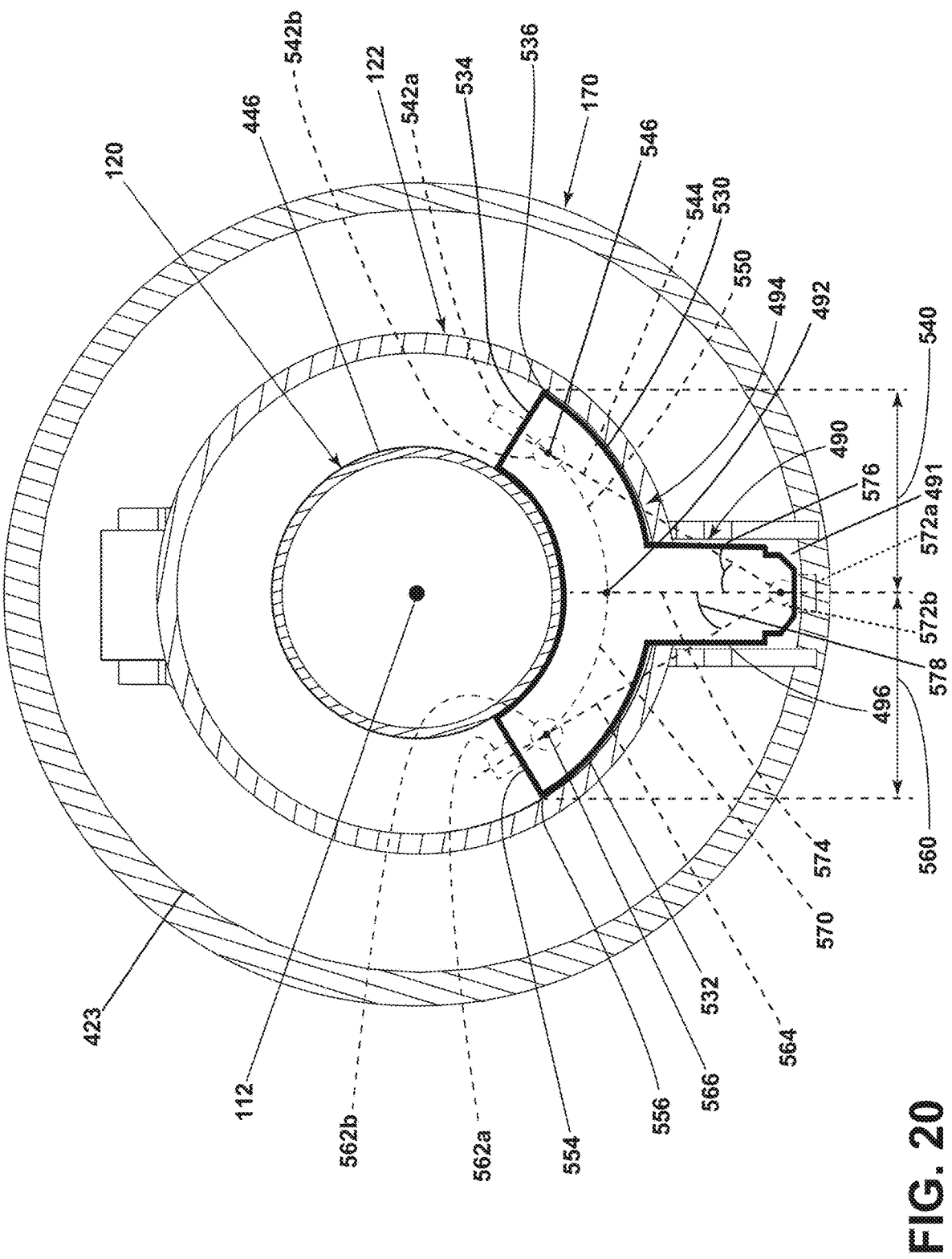
FIG. 20 illustrates a schematic cross section of the accessory gearbox of FIG. 18 in the context of selected support structures, according to aspects of the present disclosure.

FIG. 20 is a cross section further illustrating the AGB 490, the cross section is a schematic cross section generally taken at the axial location of the first fork 521 further illustrated as a cross-section line in FIG. 18. The turbomachine 120 and the engine casing 446 are schematically illustrated along with the axial centerline 112. A C-shaped or arc cross-section can be defined by the first arm 530 and the second arm 532 that straddle the turbomachine 120 or the engine casing 446. While no spacing or coupling components are illustrated between the engine casing 446 and the AGB 490 it will be understood that any suitable spacing and mounting components can be included. The first arm 530 extends from the accessory gearbox axis 492 to a first terminating point or first distal surface 534. The first distal surface 534 can have a first end point 536 defined as the point on the first distal surface 534 that is radially farthest from the axial centerline 112. A first distance 540 can be measured radially from the accessory gearbox axis 492 to the first end point 536.

The first arm 530 can include a first plane 544. The two dimensions defining the first plane 544 are illustrated by way of example as a first dimension that is generally perpendicular to the first distal surface 534 and a second dimension is into/out of the page. As used herein, the term "generally perpendicular" defines an angle between two objects that is between 80 degrees and 100 degrees. Additionally, or alternatively, the first plane 544 can be defined by a plane defined by at least an obtuse angle extending from the yaw or pitch axis (i.e. from into/out of page, or top to bottom respectively in FIG. 17). In FIG. 20 example the obtuse is formed with yaw-roll plane. In other examples the first plane 544 can be defined by rotation around more than one of these three mutually orthogonal axes. It is further contemplated that the first plane 544 can form any angle in either dimension with the first distal surface 534.

A primary set of interfaces 542a, 542b can be operably coupled to or defined by a portion of the first arm 530. The primary set of interfaces 542a, 542b can extend along or be defined by the first plane 544. While illustrated as two interfaces 542a, 542b that lie on the plane 544, any number of interfaces in the first plane 544, including one, are contemplated.

The first arm 530 can define a first arm axis of rotation 546. It is contemplated that the rotation of an output shaft or other portion of the first arm 530 about the first arm axis of rotation 546 can be considered an interface of the AGB 490. An interface as defined herein can be an input to the AGB 490 or an output from the AGB 490. It is further contemplated that the first arm 530 can define any number of axes of rotations.

The first arm 530 can sweep a first arclength 550 from the accessory gearbox axis 492 to the first distal surface 534. The first arm 530 can cover, straddle, or otherwise wrap around between 5% and 50% of the turbomachine 120 or the engine casing 446. It is contemplated that the length of the first arclength 550 is between 1% and 60% the circumference of the turbomachine 120 or the engine casing 446.

The second arm 532 extends from the plane of the accessory gearbox axis 492 to a second terminating point or second distal surface 554. The second distal surface 554 can have a second end point 556 defined as the point on the second distal surface 554 that is radially farthest from the axial centerline 112. A second distance 560 can be measured radially from the accessory gearbox axis 492 to the second end point 556. While illustrated as equal, the first distance 540 can be greater than or less than the second distance 560. That is, the second portion 496 of the AGB 490 is spaced non-equidistant between the first end point 536 and the second end point 556, where the first end point 536 and the second end point 556 are defined by the arc cross-section.

The second arm 532 can include a second plane 564. The two dimensions defining the second plane 564 are illustrated by way of example as a first dimension that is generally perpendicular to the second distal surface 554 and a second dimension is into/out of the page. Similar to the first plane 544, the second plane 564 can be defined by a plane defined by at least an obtuse angle extending from the yaw or pitch axis (i.e. from into/out of page, or top to bottom respectively in FIG. 17). It is further contemplated that the second plane 564 can form any angle in either dimension with the second distal surface 554.

A secondary set of interfaces 562a, 562b can be operably coupled to or defined by a portion of the second arm 532. The secondary set of interfaces 562a, 562b can be defined by the second plane 564. While illustrated as two interfaces 562a, 562b that lie on or extend along the plane 564, any number of interfaces in the second plane 564, including one, are contemplated.

The second arm 532 can define a second arm axis of rotation 566. It is contemplated that the rotation of an output shaft or other portion of the second arm 532 about the second arm axis of rotation 566 can be considered an interface of the AGB 490. It is further contemplated that the second arm 532 can define any number of axes of rotations.

The second arm 532 can sweep a second arclength 570 from the accessory gearbox axis 492 to the second distal surface 554. The second arm 532 can cover or otherwise wrap around between 5% and 50% of the turbomachine 120 or the engine casing 446. It is contemplated that the length of the second arclength 570 is between 1% and 60% the circumference of the turbomachine 120 or the engine casing 446. While illustrated as equal, the second arclength 570 can be less than or greater than the first arclength 550.

A third plane 574 can define a tertiary set of interfaces 572a, 572b included in the second portion 496 of the AGB 490. As illustrated, by way of non-limiting example, the second portion 496 of the AGB 490 can be generally perpendicular to the accessory gearbox axis 492. The tertiary set of interfaces 572a, 572b can extend along the third plane 574. It is contemplated that one or more of the tertiary set of interfaces 572a, 572b can be located in the hollow portion 491, extends past the radial inner surface 423 of the fan cowl 170, or any combination thereof. That is, the AGB 490 can include the primary set of interfaces 542a, 542b defined by the first plane 544, the secondary set of interfaces 562a, 562b defined by the second plane 564, and the tertiary set of interfaces 572a, 572b defined by the third plane 574. Interfaces can include, but are not limited to systems, components, or other engine elements that receive energy from the rotation of the AGB 490 about the accessory gearbox axis 492. It is contemplated that the interfaces 572a, 572b, 542a, 542b, 562a, 562b can correspond to an interface to service one or more of, or any of an output shaft, fuel pump, transfer gearbox, lubrication pump, air compressor, scavenge pump, electrical generator, fuel control, fuel pump, permanent magnet alternator, lubrication pump, or hydraulic pump. It is further contemplated that the second portion 496 of the AGB 490 can define any number of axes of rotations.

The third plane 574, similar to the first plane 544 and the second plane 564, includes two dimensions illustrated by way of example as a first dimension that is generally perpendicular to the accessory gearbox axis 492, extending radially outward from the axial centerline 112, and a second dimension is into/out of the page. Similar to the first plane 544 and the second plane 564, the third plane 574 can be defined by a plane defined by at least an obtuse angle extending from the yaw or pitch axis (i.e. from into/out of page, or top to bottom respectively in FIG. 17). It is further contemplated that the second plane 574 can form any angle in either dimension with the accessory gearbox axis 492.

As shown, by way of example, each of the respective pair of interfaces 542a, 542b, 562a and 562b, 572a, 572b or axes of rotations 546, 566 associated with the respective planes 544, 564, 574 are generally perpendicular to each other. However, it is contemplated that the angles between the interfaces 542a, 542b, 562a and 562b, 572a, 572b or the axes of rotations 546, 566 associated with the respective planes 544, 564, 574 can be any angle, including between 50 degrees to 100 degrees.

A first angle 576 can be defined from the third plane 574 to the first plane 544 by a clockwise rotation. As illustrated, the first angle 576 can be an acute angle, however any angle between, but not including, zero degrees and 180 degrees is contemplated. A second angle 578 can be from the third plane 574 to the second plane 564 by a counterclockwise rotation. As illustrated, the first angle 578 can be an acute angle, however any angle between, but not including, zero degrees and 180 degrees is contemplated. While illustrated as equal, it is contemplated that the first angle 576 can be greater than or less than the second angle 578.

It is contemplated that any number of additional planes defining interfaces or axes of rotation can extend from or be defined by the first portion 494 or the second portion 496. It is also contemplated that the additional planes of interfaces or axes of rotation can extend from or be defined by one or more portions of the first plane 544, second plane 564, the third plane 574, the first arm axis of rotation 546, the second arm axis of rotation 566, the accessory gearbox axis 492, the first arclength 550, or the second arclength 570.

In operation, the AGB 490 is operably coupled to one or more components of the turbomachine 120. That is, one or more components of the turbomachine 120 provides or otherwise communicates energy to the AGB 490. By way of non-limiting example, the AGB 490 can be powered by energy provided by a drive shaft located in the turbomachine 120 along the axial centerline 112, such as, for example, the low-pressure shaft 138 or the high-pressure shaft 136 as illustrated in FIG. 17. Additionally, or alternatively, the AGB 490 can be electrically driven using electrical power generated by the rotation of the turbomachine 120 or a storage device for electrical energy.

The AGB 490, when powered, rotates one or more components about the accessory gearbox axis 492. The rotation about the accessory gearbox axis 492 can then provide energy in the form of rotational energy or electromagnetic energy to at least one of interfaces from the first set of interfaces 542a, 542b, the secondary set of interfaces 562a, 562b, or the tertiary set of interfaces 572a, 572b. The first set of interfaces 542a, 542b, the secondary set of interfaces 562a, 562b, and the tertiary set of interfaces 572a, 572b are located in the first plane 544, the second plane 564, and the third plane 574, respectively. The first plane 544, the second plane 564, and the third plane 574 are three distinct planes that can be parallel or intersect.

The transfer of energy from the AGB 490 to the first set of interfaces 542a, 542b, the secondary set of interfaces 562a, 562b, and the tertiary set of interfaces 572a, 572b can be from the rotation of a bevel gear arrangement. That is, one or more of the first set of interfaces 542a, 542b, the secondary set of interfaces 562a, 562b, or the tertiary set of interfaces 572a, 572b can be driven using a system of bevel gears having a shared drive shaft. It is further contemplated that the AGB 490 can include multiple motors to provide power to hydraulic or electrically driven interfaces.

The tertiary set of interfaces 572a, 572b coupled to or defined by the second portion 496 of the AGB 490 allow the first portion 494 of the AGB 490 to be smaller. That is, having the second portion 496 of the AGB 490 allows the distance between the core cowl 122 and the engine casing 446 to decrease or for the opportunity for more components to be housed in the core cowl 122, allowing the axial length to be reduced. Additionally, or alternatively, the smaller first portion 494 of the AGB 490 can provide room for additional components, such as, but not limited to, reverse thruster components.

While providing significant benefit to the open rotor engine, the AGB 490, as disclosed, can be used for smaller applications, such as, but not limited to, regional aircrafts. The AGB 490 having the first portion 494 between the engine casing 446 and the core cowl 122 and the second portion 496 between the core cowl 122 and the fan cowl 170 allows for the gas turbine engine 100 to include, for example, a reduced overall axial length by compact packaging of the AGB 490 and the attached engine accessories.

Figure 21:
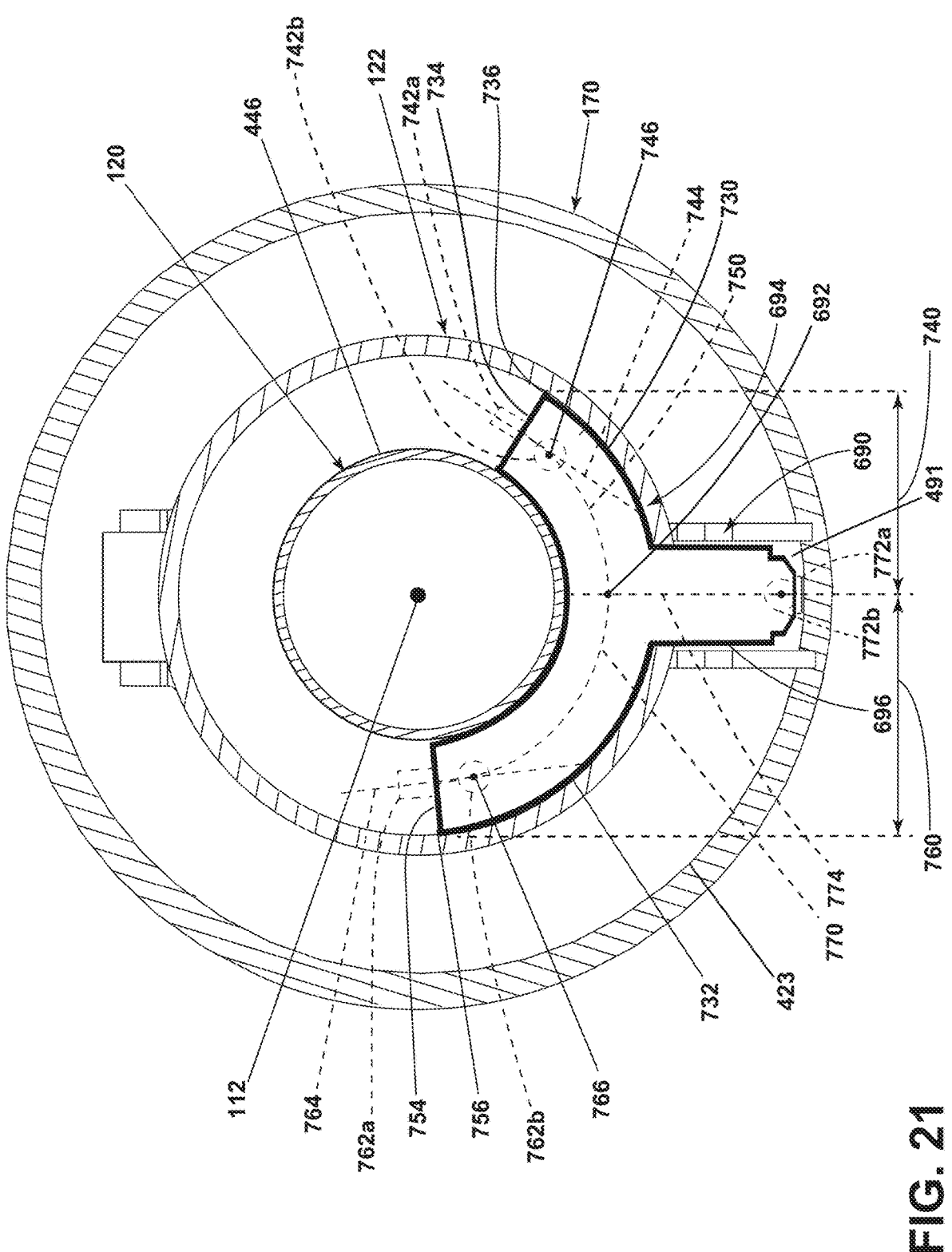
FIG. 21 illustrates a schematic cross section of an alternative accessory gearbox that can be utilized in the gas turbine engine of FIG. 17, according to aspects of the present disclosure.

FIG. 21 illustrates an AGB 690, the AGB 690 is similar to the AGB 490 previously described. Therefore, like parts will be identified with like numerals increased by 200, and it is understood that the description of like parts of the AGB 490 applies to the AGB 690, unless otherwise noted. As with FIG. 20 it will be understood that FIG. 21 schematically illustrates the turbomachine 120 and engine casing 446 along with the axial centerline 112 and that while no spacing or coupling components are illustrated between the engine casing 446 and the AGB 690 it will be understood that any suitable spacing and components can be included.

A C-shaped or arc cross-section can be defined by a first arm 730 and a second arm 732. However, unlike the previously described AGB 490, the first arm 730 and the second arm 732 of the AGB 690 are not equidistant in length. The first arm 730 extends from an accessory gearbox axis 692 to a first terminating point or first distal surface 734. The first distal surface 734 can have a first end point 736 defined as the point on the first distal surface 734 that is radially farthest from the axial centerline 112. A first distance 740 can be measured radially from the accessory gearbox axis 692 to the first end point 736.

The first arm 730 can include a first plane 744. The two dimensions defining the first plane 744 are illustrated by way of example as a first dimension that is generally perpendicular to the first distal surface 734 and a second dimension is into/out of the page. Additionally, or alternatively, the plane 744 can be defined by a plane defined by at least an obtuse angle extending from the yaw or pitch axis (i.e. from into/out of page, or top to bottom respectively in FIG. 17). In FIG. 21 an example the obtuse angle is formed with yaw-roll plane. In other examples the plane 744 can be defined by rotation around more than one of these three mutually orthogonal axes. It is further contemplated that the first plane 744 can form any angle in either dimension with the first distal surface 734.

A primary set of interfaces 742a, 742b can be operably coupled to or defined by a portion of the first arm 730. The primary set of interfaces 742a, 742b can extend along or be defined by the first plane 744. While illustrated as two interfaces 742a, 742b that lie on the plane 744, any number of interfaces in the first plane 744, including one, are contemplated.

The first arm 730 can define a first arm axis of rotation 746. It is contemplated that the rotation of an output shaft or other portion of the first arm 730 about the first arm axis of rotation 746 can be considered an interface. It is further contemplated that the first arm 730 can define any number of axes of rotations.

The first arm 730 can sweep a first arclength 750 from the accessory gearbox axis 692 to the first distal surface 734. The first arm 730 can cover or otherwise wrap around between 5% and 50% of the turbomachine 120 or the engine casing 446. It is contemplated that the length of the first arclength 750 is between 1% and 60% the circumference of the turbomachine 120 or the engine casing 446.

The second arm 732 extends from the plane of the accessory gearbox axis 692 to a second terminating point or second distal surface 754. The second distal surface 754 can have a second end point 756 defined as the point on the second distal surface 754 that is radially farthest from the axial centerline 112. A second distance 760 can be measured radially from the accessory gearbox axis 692 to the second end point 756. While illustrated as greater than the first distance 740, the second distance 760 can be less than or equal to the first distance 740. That is, the second portion 696 of the AGB 690 is spaced non-equidistant between the first end point 736 and the second end point 756, where the first end point 736 and the second end point 756 are defined by the arc cross-section.

The second arm 732 can include a second plane 764. The two dimensions defining the second plane 764 are illustrated by way of example as a first dimension that is generally perpendicular to the second distal surface 754 and a second dimension is into/out of the page. Similar to the first plane 744, the second plane 764 can be defined by a plane defined by at least an obtuse angle extending from the yaw or pitch axis (i.e. from into/out of page, or top to bottom respectively in FIG. 17). It is further contemplated that the second plane 764 can form any angle in either dimension with the second distal surface 754.

A secondary set of interfaces 762a, 762b can be operably coupled to or defined by a portion of the second arm 732. The secondary set of interfaces 762a, 762b can be defined by the second plane 764. While illustrated as two interfaces 762a, 762b that lie on the plane 764, any number of interfaces in the second plane 764, including one, are contemplated.

The second arm 732 can define a second arm axis of rotation 766. It is contemplated that the rotation of an output shaft or other portion of the second arm 732 about the second arm axis of rotation 766 can be considered an interface. It is further contemplated that the second arm 732 can define any number of axes of rotations.

The second arm 732 can sweep a second arclength 770 from the accessory gearbox axis 692 to the second distal surface 754. The second arm 732 can cover or otherwise wrap around between 5% and 50% of the turbomachine 120 or the engine casing 446. It is contemplated that the length of the second arclength 770 is between 1% and 60% the circumference of the turbomachine 120 or the engine casing 446. While illustrated as greater, the second arclength 770 can be less than or equal to the first arclength 750.

A third plane 774 can define a tertiary set of interfaces 772a, 772b that can be included in a second portion 696 of the AGB 690. As illustrated, by way of non-limiting example, the second portion 696 of the AGB 690 can be generally perpendicular to the accessory gearbox axis 692. The tertiary set of interfaces 772a, 772b can extend along the third plane 774. It is contemplated that one or more of the tertiary set of interfaces 772a, 772b is located in the extends past the radial inner surface 423 of the fan cowl 170. That is, the AGB 690 can include the primary set of interfaces 742a, 742b defined by the first plane 744, the secondary set of interfaces 762a, 762b defined by the second plane 764, and the tertiary set of interfaces 772a, 772b defined by the third plane 774. Interfaces can include, but are not limited to systems, components, or other engine elements that receive energy from the rotation of the AGB 690 about the accessory gearbox axis 692. It is contemplated that the interfaces can include or couple to one or more of an output shaft, fuel pump, transfer gearbox, lubrication pump, air compressor, scavenge pump, electrical generator, fuel control, fuel pump, permanent magnet alternator, lubrication pump, or hydraulic pump. It is further contemplated that the second portion 696 of the AGB 690 can define any number of axes of rotations.

The third plane 774, similar to the first plane 744 and the second plane 764, includes two dimensions illustrated by way of example as a first dimension that is generally perpendicular to the accessory gearbox axis 692, extending radially outward from the axial centerline 112, and a second dimension is into/out of the page. Similar to the first plane 744 and the second plane 764, the third plane 774 can be defined by a plane defined by at least an obtuse angle extending from the yaw or pitch axis (i.e. from into/out of page, or top to bottom respectively in FIG. 17). It is further contemplated that the second plane 774 can form any angle in either dimension with the accessory gearbox axis 692.

As shown, by way of example, each of the respective pair of interfaces 742a, 742b, 762a and 762b, 772a, 772b or axes of rotations 746, 766 associated with the respective planes 744, 764, 774 are generally perpendicular to each other. However, it is contemplated that the angles between the interfaces 742a, 742b, 762a and 762b, 772a, 772b or the axes of rotations 746, 766 associated with the respective planes 744, 764, 774 can be any angle, including between 50 degrees to 100 degrees.

It is contemplated that any number of additional planes defining interfaces or axes of rotation can extend from or be defined by a first portion 694 or the second portion 696. It is also contemplated that the additional planes defining interfaces or axes of rotation can extend from or be defined by one or more portions of the first plane 744, second plane 764, the third plane 774, the first arm axis of rotation 746, the second arm axis of rotation 766, the accessory gearbox axis 692, the first arclength 750, or the second arclength 770.

Figure 22:
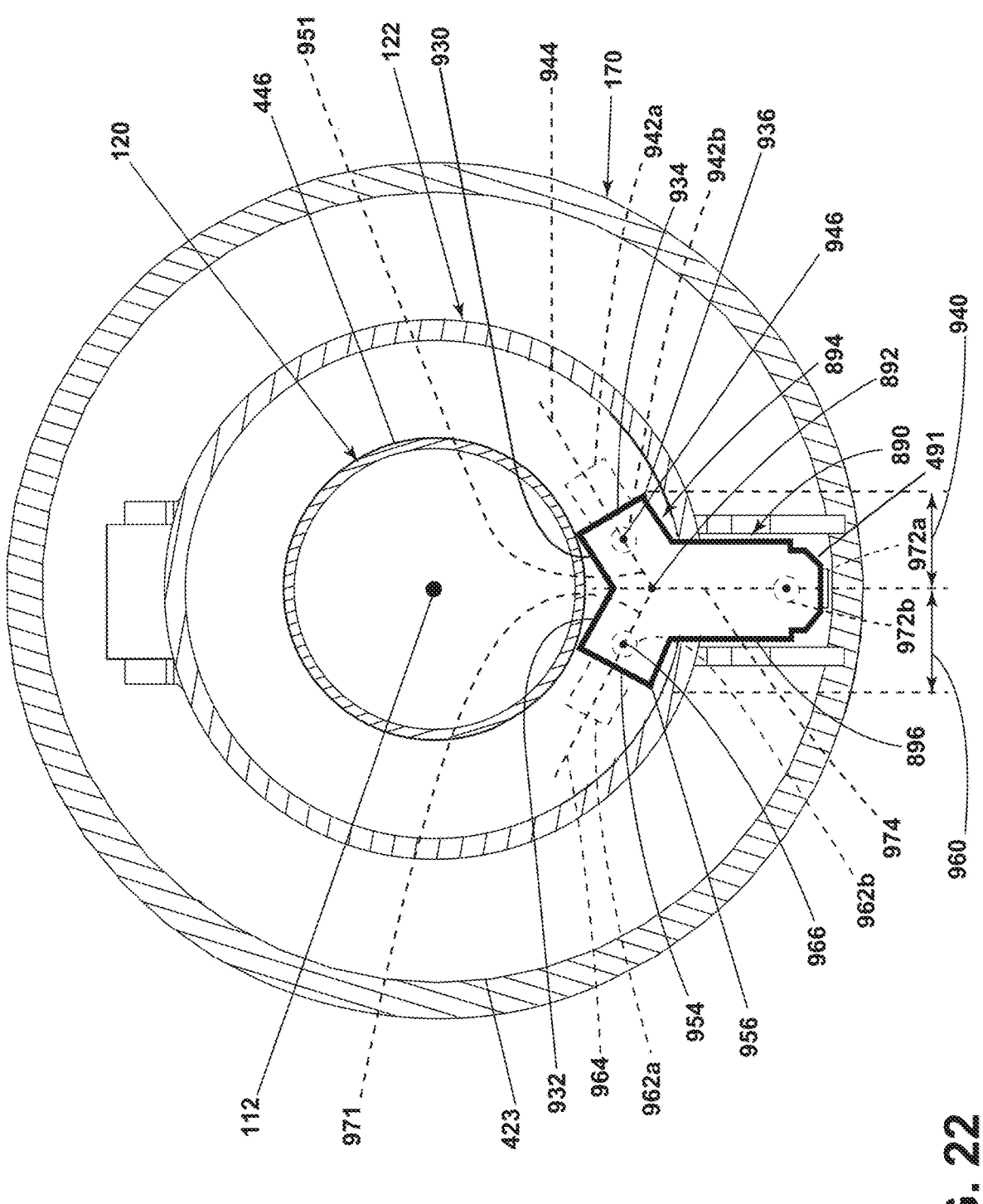
FIG. 22 illustrates a schematic cross section of an alternative accessory gearbox that can be utilized in the gas turbine engine of FIG. 17, according to aspects of the present disclosure.

FIG. 22 illustrates an AGB 890 that is similar to the AGB 490 and the AGB 690 previously described. Therefore, like parts will be identified with like numerals further increased by 200, and it is understood that the description of like parts of the AGB 490 and AGB 690 applies to the AGB 890, unless otherwise noted. As with FIG. 20 it will be understood that FIG. 22 schematically illustrates the turbomachine 120 and the engine casing 446 along with the axial centerline 112 and while no spacing or coupling components are illustrated between the engine casing 446 and the AGB 890 it will be understood that any suitable spacing and components can be included.

One difference is that the AGB 890 includes a V-shaped cross-section defined by a first arm 930 and a second arm 932. The first arm 930 extends from an accessory gearbox axis 892 to a first terminating point or first distal surface 934. The first distal surface 934 can have a first end point 936 defined as the point on the first distal surface 934 that is radially farthest from the axial centerline 112. A first distance 940 is measured radially from the accessory gearbox axis 892 to the first end point 936.

The first arm 930 can include a first plane 944. The two dimensions defining the first plane 944 are illustrated by way of example as a first dimension that is generally perpendicular to the first distal surface 934 and a second dimension is into/out of the page. It is further contemplated that the first plane 944 can form any angle in either dimension with the first distal surface 934.

A primary set of interfaces 942a, 942b can be operably coupled to or defined by a portion of the first arm 930. The primary set of interfaces 942a, 942b can extend along or be defined by the first plane 944. While illustrated as two interfaces 942a, 942b that lie on the plane 944, any number of interfaces in the first plane 944, including one, are contemplated.

The first arm 930 can define a first arm axis of rotation 946. It is contemplated that the rotation of an output shaft or other portion of the first arm 930 about the first arm axis of rotation 946 can be considered an interface. It is further contemplated that the first arm 930 can define any number of axes of rotations.

The first arm 930 can sweep a first arm length 951 from the accessory gearbox axis 892 to the first distal surface 934. The first arm 930 can cover between 5% and 50% of the turbomachine 120 or the engine casing 446. It is contemplated that the first arm length 951 is between 1% and 60% the circumference of the turbomachine 120 or the engine casing 446.

The second arm 932 extends from the plane of the accessory gearbox axis 892 to a second terminating point or second distal surface 954. The second distal surface 954 can have a second end point 956 defined as the point on the second distal surface 954 that is radially farthest from the axial centerline 112. A second distance 960 can be measured radially from the accessory gearbox axis 892 to the second end point 956. While illustrated as greater than the first distance 940, the second distance 960 can be less than or equal to the first distance 940. That is, the second portion 896 of the AGB 890 is spaced non-equidistant between the first end point 936 and the second end point 956, where the first end point 936 and the second end point 956 are defined by the arc cross-section.

The second arm 932 can include a second plane 964. The two dimensions defining the second plane 964 are illustrated by way of example as a first dimension that is generally perpendicular to the second distal surface 954 and a second dimension is into/out of the page. It is further contemplated that the second plane 964 can form any angle in either dimension with the second distal surface 954.

A secondary set of interfaces 962a, 962b can be operably coupled to or defined by a portion of the second arm 932. The secondary set of interfaces 962a, 962b can be defined by the second plane 964. While illustrated as two interfaces 962a, 962b that lie on or extend along the plane 964, any number of interfaces in the second plane 964, including one, are contemplated.

The second arm 932 can define a second arm axis of rotation 966. It is contemplated that the rotation of an output shaft or other portion of the second arm 932 about the second arm axis of rotation 966 can be considered an interface. It is further contemplated that the second arm 932 can define any number of axes of rotations.

The second arm 932 can have a second arm length 971 from the accessory gearbox axis 892 to the second distal surface 954. The second arm 932 can cover between 5% and 50% of the turbomachine 120 or the engine casing 446. It is contemplated that the second arm length 971 is between 1% and 60% the circumference of the turbomachine 120 or the engine casing 446. While illustrated as equal, the second arm length 971 can be greater than or less than the first arm length 951.

A third plane 974 can define a tertiary set of interfaces 972a, 972b can be included in a second portion 896 of the AGB 890. As illustrated, by way of non-limiting example, the second portion 896 of the AGB 890 can be perpendicular to the accessory gearbox axis 892. The tertiary set of interfaces 972a, 972b can extend along the third plane 974. It is contemplated that one or more of the tertiary set of interfaces 972a, 972b are located in the hollow portion 491, extends past the radial inner surface 423 of the fan cowl 170, or a combination thereof. That is, the AGB 890 can include the primary set of interfaces 942a, 942b defined by the first plane 944, the secondary set of interfaces 962a, 962b defined by the second plane 964, and the tertiary set of interfaces 972a, 972b defined by the third plane 974. Interfaces can include, but are not limited to systems, components, or other engine elements that receive energy from the rotation of the AGB 890 about the accessory gearbox axis 892. It is contemplated that the interfaces can include, but are not limited to, any one or more of an output shaft, fuel pump, transfer gearbox, lubrication pump, air compressor, scavenge pump, electrical generator, fuel control, fuel pump, permanent magnet alternator, lubrication pump, or hydraulic pump. It is further contemplated that the second portion 896 of the AGB 890 can define any number of axes of rotations.

The third plane 974, similar to the first plane 944 and the second plane 964, includes two dimensions illustrated by way of example as a first dimension that is generally perpendicular to the accessory gearbox axis 892, extending radially outward from the axial centerline 112, and a second dimension is into/out of the page. Similar to the first plane 944 and the second plane 964, the third plane 974 can be defined by a plane defined by at least an obtuse angle extending from the yaw or pitch axis (i.e. from into/out of page, or top to bottom respectively in FIG. 17). It is further contemplated that the second plane 974 can form any angle in either dimension with the accessory gearbox axis 892.

As shown, by way of example, each of the respective pair of interfaces 942a, 942b, 962a and 962b, 972a, 972b or axes of rotations 946, 966 associated with the respective planes 944, 964, 974 are generally perpendicular to each other. However, it is contemplated that the angles between the interfaces 942a, 942b, 962a and 962b, 972a, 972b or the axes of rotations 946, 966 associated with the respective planes 944, 964, 974 can be any angle, including between 50 degrees to 100 degrees.

It is contemplated that any number of additional planes defining interfaces or axes of rotation can extend from or be defined by a first portion 894 or the second portion 896. It is also contemplated that the additional planes defining interfaces or axes of rotation can extend from or be defined by one or more portions of the first plane 944, second plane 964, the third plane 974, the first arm axis of rotation 946, the second arm axis of rotation 966, the accessory gearbox axis 892, the first arm length 951, or the second arm length 971.

Figure 23:
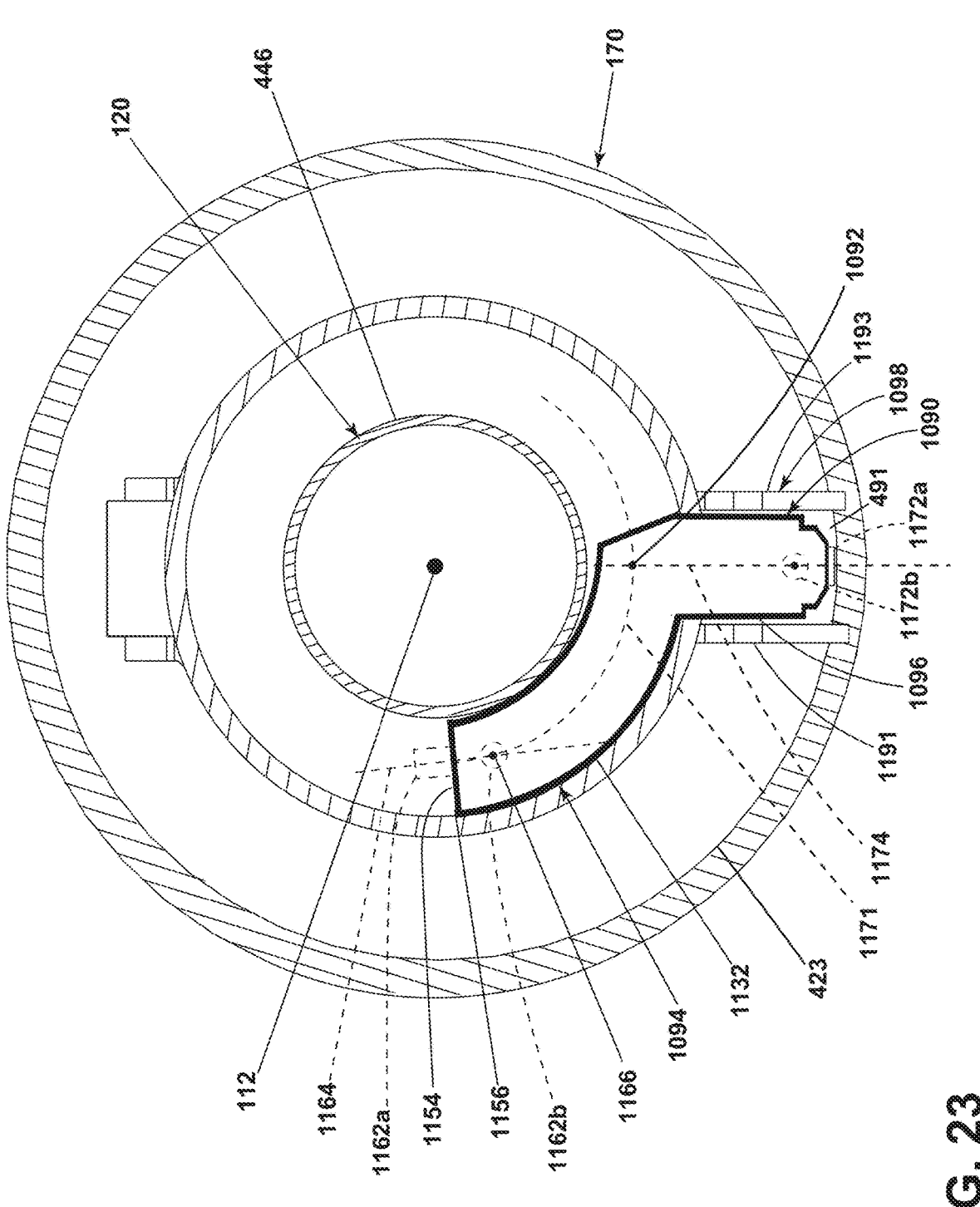
FIG. 23 illustrates a schematic cross section of an alternative accessory gearbox that can be utilized in the gas turbine engine of FIG. 17, according to aspects of the present disclosure.

FIG. 23 illustrates an AGB 1090 that is similar to the AGB 490, the AGB 690, and the AGB 890 previously described. Therefore, like parts will be identified with like numerals further increased by 200, and it is understood that the description of like parts of the AGB 490, the AGB 690, and the AGB 890 applies to the AGB 1090, unless otherwise noted. As with FIG. 20 it will be understood that FIG. 23 schematically illustrates the turbomachine 120 and the engine casing 446 along with the axial centerline 112 and that while no spacing or coupling components are illustrated between the engine casing 446 and the AGB 1090 it will be understood that any suitable spacing and components can be included.

One difference is that the AGB 1090 includes a single arm 1132. That is, the first portion 1094 of the AGB 1090 includes only one arm; the single arm 1132. The single arm 1132 extends from the plane of an accessory gearbox axis 1092 to an arc terminating point or arc distal surface 1154. The distal surface 1154 can have an end point 1156 defined as the point on the arc distal surface 1154 that is radially farthest from the axial centerline 112.

The single arm 1132 can include a plane 1164. The two dimensions defining the second plane 1164 are illustrated by way of example as a first dimension that is generally perpendicular to the arc distal surface 1154 and a second dimension is into/out of the page. It is further contemplated that the plane 1164 can form any angle in either dimension with the arc distal surface 1154.

A primary set of interfaces 1162a, 1162b can be operably coupled to or defined by a portion of the single arm 1132. The primary set of interfaces 1162a, 1162b can be defined by the plane 1164. While illustrated as two interfaces 1162a, 1162b that lie on or extend along the plane 1164, any number of interfaces in the plane 1164, including one, are contemplated.

The single arm 1132 can define an arm axis of rotation 1166. It is contemplated that the rotation of an output shaft or other portion of the single arm 1132 about the arm axis of rotation 1166 can be considered an interface. It is further contemplated that the single arm 1132 can define any number of axes of rotations.

The second arm 1132 can have an arm length 1171 from the accessory gearbox axis 1092 to the arc distal surface 1154. The single arm 1132 can cover between 5% and 50% of the turbomachine 120 or the engine casing 446. It is contemplated that the single arm length 1171 is between 1% and 60% the circumference of the turbomachine 120 or the engine casing 446.

The single arm 1132 extends in only one direction from a strut 1098. That is, the strut 1098 has a first circumferential surface 1191 and a second circumferential surface 1193 and the AGB 1090, being a single arm gearbox and unlike AGB 490, AGB 690, and AGB 890, only extends circumferentially past one of the first circumferential surface 1191 or the second circumferential surface 1193 or a plane defined by the first circumferential surface 1191 or the second circumferential surface 1193.

A second plane 1174 can define a secondary set of interfaces 1172a, 1172b in a second portion 1096 of the AGB 1090. As illustrated, by way of non-limiting example, the second portion 1096 of the AGB 1090 can be perpendicular to the accessory gearbox axis 1092. The secondary set of interfaces 1172a, 1172b can extend along the second plane 1174. It is contemplated that one or more of the secondary set of interfaces 1172a, 1172b is located in the hollow portion 491, extends past the radial inner surface 423 of the fan cowl 170, or a combination thereof. That is, the AGB 1090 can include the primary set of interfaces 1162a, 1162b defined by the plane 1164 and the secondary set of interfaces 1172a, 1172b defined by the second plane 1174. Any number of interfaces are contemplated and can include or couple to one or more systems components, or other engine elements that receive energy from the rotation of the AGB 1090 about the accessory gearbox axis 1092. It is contemplated that the interfaces can include, but are not limited to, any one or more of an output shaft, fuel pump, transfer gearbox, lubrication pump, air compressor, scavenge pump, electrical generator, fuel control, fuel pump, permanent magnet alternator, lubrication pump, or hydraulic pump. It is further contemplated that the second portion 1096 of the AGB 1090 can define any number of axes of rotations.

Figure 24:
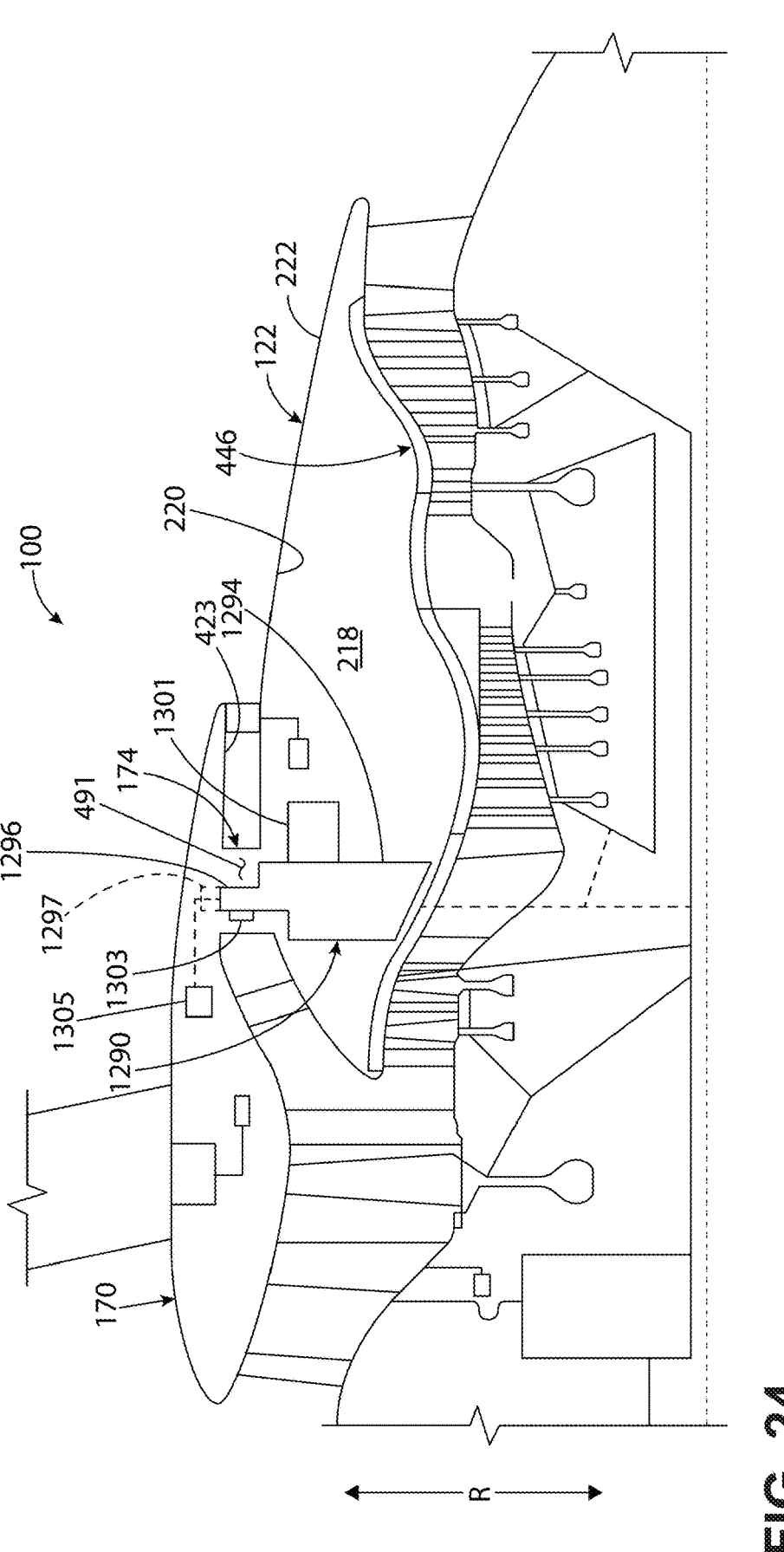
FIG. 24 is a variation of the schematic cross-sectional view of a portion of a core engine of the gas turbine engine as shown in FIG. 4 having an accessory gearbox, according to an exemplary embodiment of the present disclosure.

FIG. 24 is a variation of the schematic partial section view of the gas turbine engine 100 of FIG. 17, illustrating an AGB 1290 in the gas turbine engine 100. The AGB 1290 is similar to the AGB 490, the AGB 690, the AGB 890, and the AGB 1090 previously described. Therefore, like parts will be identified with like numerals further increased by 200, and it is understood that the description of like parts of the AGB 490, the AGB 690, the AGB 890, and the AGB 1090 applies to the AGB 1290, unless otherwise noted.

The AGB 1290 has a first portion 1294 located in the space 218 between inner surface 220 of the core cowl 122 and the engine casing 446. A second portion 1296 of the AGB 1290 extends from the first portion 1294 into the hollow portion 491 of the strut 174. Optionally, the second portion 1296 can have a terminal end 1297 located in the fan cowl 170. That is, the AGB 1290 can extend past the radially inner surface 423 of the fan cowl 170.

The first portion 1294 of the AGB 1290 can be operably coupled to a first accessory device 1301. The first accessory device 1301 is located in the space 218. While illustrated as a single device, the first accessory device 1301 can be any number of devices.

The second portion 1296 of the AGB 1290 can be operably coupled to a second accessory device 1303. The second accessory device 1303 is at least partially located in the hollow portion 491 of the strut 174. That is, a portion of the second accessory device 1303 is located between the outer surface 222 of the core cowl 122 and the radially inner surface 423 of the fan cowl 170. While illustrated as a single device, the second accessory device 1303 can be any number of devices.

Optionally, the AGB 1290 can be operably coupled to a third accessory device 1305. The third accessory device 1305 is located in the fan cowl 170. While illustrated as a single device, the third accessory device 1305 can be any number of devices. The third accessory device 1305 can be directly coupled to an interface of the AGB 1290 or coupled to the AGB 1290 by shafts and/or additional gearing.

As used hereinafter, the term "accessory gearbox (AGB)" refers to a gearbox that receives rotational input from a rotating shaft in the turbomachine of an engine or another gearbox. The AGB provides an output to accessories such as, but not limited to, engine accessories or aircraft accessories. In other words, an AGB provides output to at least one accessory and can optionally provide a rotational output to a second AGB.

A used hereinafter, the term "transfer gearbox (TGB)" is a gearbox that provides rotational output to at least another gearbox.

As used hereinafter, the term "aircraft accessory" refers to an accessory that can interface with components outside of the gas turbine engine 100, once the gas turbine engine 100 is self-sustaining. Optionally, aircraft accessory can contribute to the operation of the gas turbine engine 100 in addition to interfacing with one or more components outside of the gas turbine engine 100. Non-limiting examples of aircraft accessories include an electrical generator, a hydraulic pump, an aircraft permanent magnet alternator, or an air turbine starter. Further non-limiting examples can include a primary lubrication pump, secondary lubrication pump, main fuel pump, fuel boost pump, or rotisserie.

As used hereinafter, the term "engine accessory" refers to an accessory that contributes to the operation of the gas turbine engine 100. Non-limiting examples of engine accessories include a fuel pump, main fuel pump, fuel boost pump, lubrication pump, primary lubrication pump, secondary lubrication pump, air compressor, starter, air turbine starter, scavenge pump, fuel control, rotisserie, or permanent magnet alternator.

Figure 25:
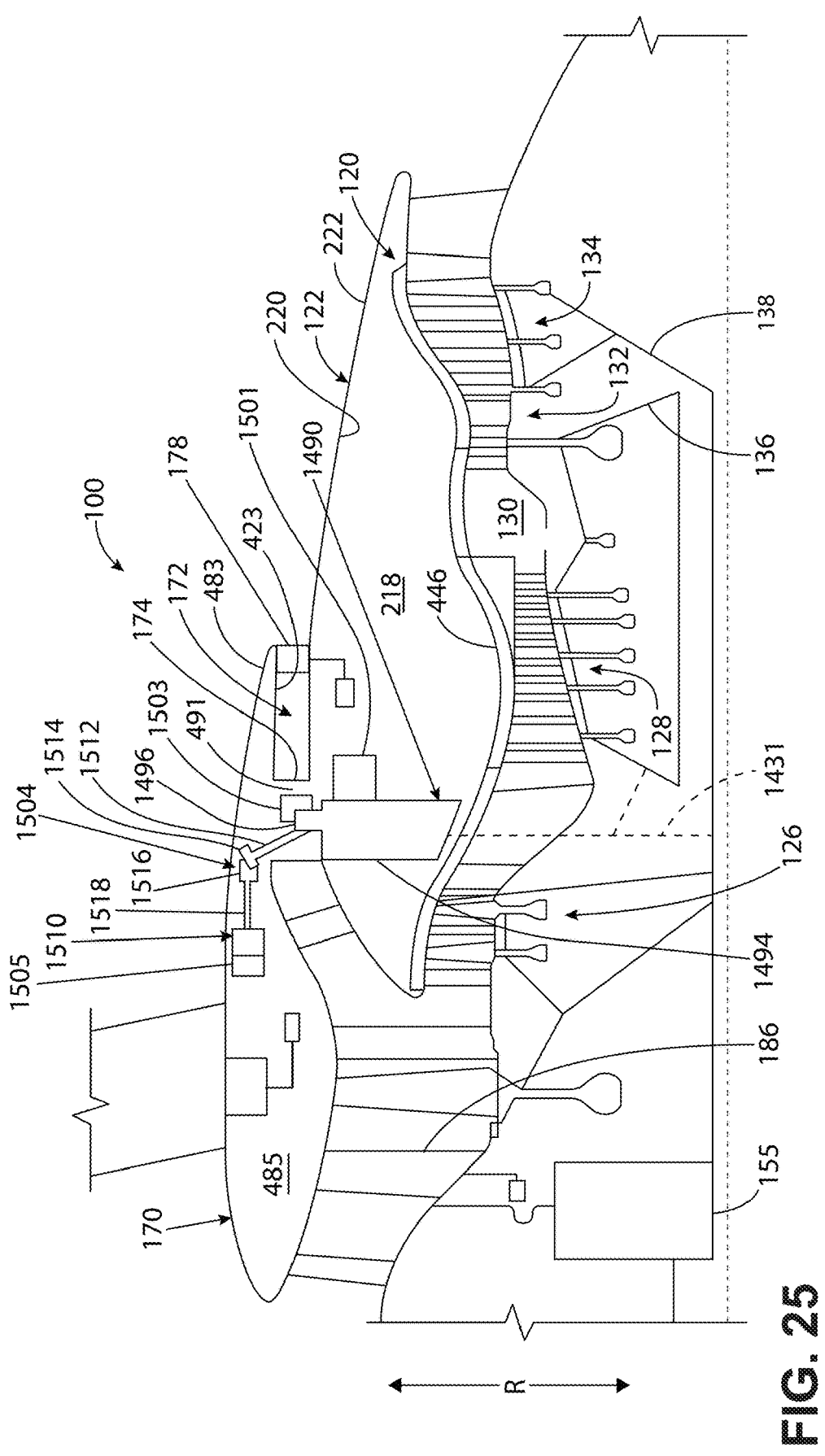
FIG. 25 is a variation of the schematic cross-sectional view of a portion of a core engine of the gas turbine engine as shown in FIG. 4 having an accessory gearbox, according to an exemplary embodiment of the present disclosure.

FIG. 25 is another variation of the schematic partial section view of the gas turbine engine 100 of FIG. 17. The gas turbine engine 100 includes the engine axis of rotation illustrated as the axial centerline 112. The gas turbine engine 100 includes the turbomachine 120. The turbomachine 120 includes at least the high-pressure compressor 128, the combustor 130, the high-pressure turbine 132, and the low-pressure turbine 134.

The high-pressure shaft 136 can be disposed coaxially about the axial centerline 112 of the gas turbine engine 100 and drivingly connect the high-pressure turbine 132 to the high-pressure compressor 128. The low-pressure shaft 138 can be disposed coaxially about the axial centerline 112 of the gas turbine engine 100 and drivingly connect the low-pressure turbine 134 to one or more portions of the low-pressure compressor 126 and/or the fan section 150 (FIG. 4) via the speed reduction gearbox 155.

The core cowl 122 is radially spaced from and circumscribes at least a portion of the turbomachine 120 or the engine casing 446.

The inner cowl space is illustrated as the space 218 and is defined between at least a portion of the engine casing 446 and the inner surface 220 of the core cowl 122.

A fan cowl 170 is radially spaced from the core cowl 122 and can circumscribe at least a portion of the core cowl 122. The fan cowl 170 has a radially outer surface 483 and the radially inner surface 423, where the radially inner surface 423 confronts the outer surface 222 of the core cowl 122. The radially outer surface 483 and the radially inner surface 423 define a fan cowl space 485.

The strut 174 extends radially from the core cowl 122 to the fan cowl 170. That is, the strut 174 radially extends or spans the fan duct 172 defined between the core cowl 122 and the fan cowl 170. More specifically, the strut 174 can couple the space 218 and the fan cowl space 485. In other words, the strut 174 can include the hollow portion 491 extending between the core cowl 122 and the fan cowl 170.

A first accessory gearbox (AGB1) 1490 extends from the space 218 into the hollow portion 491 of the strut 174. The AGB1 1490 includes a first portion 1494 and second portion 1496. Optionally, the AGB1 1490 can extend from the space 218, through the hollow portion 491 of the strut 174, and into the fan cowl space 485. The AGB1 1490 can be axially located upstream of the high-pressure turbine section 132 and downstream of the fan section 150 (FIG. 4). One or more shafts and one or more gears, illustrated as communication line 1431 can operably couple the AGB1 1490 to the high-pressure shaft 136 or the low-pressure shaft 138.

A first accessory device 1501 is coupled to the AGB1 1490. The first accessory device 1501 is located radially between the engine casing 446 and the inner surface 220 of the core cowl 122. The first accessory device 1501 can be located upstream of the combustor 130 or the high-pressure turbine 132. Locating both the first accessory device 1501 and the AGB1 1490 upstream of the combustor 130 or the high-pressure turbine 132 provides temperature benefits.

As illustrated, by way of example, the first accessory device 1501 is axially downstream of the AGB1 1490. Alternatively, it is contemplated that the first accessory device 1501 can be radially offset and axially align with at least a portion of the AGB1 1490. In yet another different and non-limiting example, the first accessory device 1501 can extend or be located upstream of the AGB1 1490.

Alternatively, it is further contemplated in a differing and non-limiting example, that the first accessory device 1501 can be a set of first accessory devices that can include aircraft accessories, engine accessories, or a combination therein. The set of first accessory devices are located upstream of the combustor 130 and can be located downstream, upstream, or at least partially axially align with the AGB1 1490. For example, the set of first accessory devices can include two accessory devices where one accessory device is located downstream of the AGB1 1490 and the other accessory device is axially aligned with the AGB1 1490 or is located circumferentially on either side of the AGB1 1490.

The first accessory device 1501 can be an aircraft accessory or an engine accessory. The first accessory device 1501 or the set of first accessory devices located within the space 218 can be, by way of non-limiting example, one or more of a starter, a hydraulic pump, or an electric generator. The electrical generator can be, by way of non-limiting example, a variable frequency generator. The starter, by way of example, can be a pneumatic starter or air turbine starter.

A second accessory device 1503 is coupled to the AGB1 1490. The second accessory device 1503 is located in the hollow portion 491 of the strut 174. The second accessory device 1503 is located upstream of the combustor 130 and the high-pressure turbine 132. Locating both the second accessory device 1503 and the AGB1 1490 upstream of the combustor 130 and the high-pressure turbine 132 provides temperature benefits.

While illustrated as located in the hollow portion 491 of the strut 174, it is contemplated that the second accessory device 1503 can be partially located or otherwise extend from the space 218 into the hollow portion 491 or from the hollow portion 491 to the fan cowl space 485.

As illustrated, by way of example, the second accessory device 1503 axially overlaps and is partially downstream of the AGB1 1490. However, any location relative to the AGB1 1490 is contemplated.

It is further contemplated that the second accessory device 1503 can be a set of second accessory devices that can include aircraft accessories, engine accessories, or a combination therein. The set of second accessory devices are located upstream of the combustor 130 and can be located downstream, upstream, or at least partially axially align with the AGB1 1490. For example, the set of second accessory devices can include two accessory devices where one accessory device is located downstream of the AGB1 1490 and the other accessory device is axially aligned with the AGB1 1490 or is located circumferentially on either side of the AGB1 1490.

The second accessory device 1503 or the set of secondary accessory devices can be an aircraft accessory, an engine accessory, or any combination therein. The second accessory device 1503 can be by way of non-limiting example, a lubrication pump.

A connection assembly 1504 or a transfer gearbox (TGB) operably couples the AGB1 1490 to a second accessory gearbox (AGB2) 1510. The connection assembly 1504 can include a first transfer shaft 1512, a first interface 1514, a second interface 1516, and a second transfer shaft 1518. The first transfer shaft 1512 can extend radially from the AGB1 1490 toward the fan cowl 170. The first transfer shaft 1512 can pass through the hollow portion 491 of the strut 174. In a different and non-limiting example, the connection assembly 1504 that operably couples the AGB1 1490 to the AGB2 1510 can include a series of interlocking gears (not shown). Further, it is contemplated that any number of shafts, gears, or other elements can couple the AGB1 1490 to the AGB2 1510 to provide a rotational output from the AGB1 1490 received as rotational input at the AGB2 1510.

Alternatively, in a different and non-limiting example, the AGB1 1490 can extend into the fan cowl space 485 and provide a rotational output to the second transfer shaft 1518 to drive the AGB2 1510.

The AGB2 1510 is coupled to the second transfer shaft 1518 and receives rotational energy from the second transfer shaft 1518. The AGB2 1510 is located upstream of the combustor 130. However, as illustrated by way of example, the AGB2 1510 can be located upstream of the high-pressure compressor 128. That is, the AGB2 11510 can be located in axially adjacent or upstream a portion of the low-pressure compressor 126.

As illustrated, the first transfer shaft 1512 extending from the AGB1 1490 operably couples to the second transfer shaft 1518. Optionally, a portion of the second transfer shaft 1518 can couple to a portion of the AGB1 1490. That is, the AGB1 1490 can directly drive the second transfer shaft 1518.

While the AGB1 1490 and the AGB2 1510 are illustrated as coupled by the first transfer shaft 1512, the connection assembly 1504, and the second transfer shaft 1518, any number of gears or shafts are contemplated to operably couple the AGB2 1510 and the AGB1 1490. That is, it is contemplated that a series of gears can extend from the AGB1 1490 to the AGB2 1510 to provide the AGB2 1510 with rotation energy.

A third accessory device 1505 is coupled to the AGB2 1510. The third accessory device 1505 is located upstream of the combustor 130. The third accessory device 1505 can also be upstream of the strut 174. That is, one or more portions of the third accessory device 1505 can axially overlap a portion of the low-pressure compressor 126. Having the AGB2 1510 or the third accessory device 1505 upstream of the combustor 130 and radially spaced from the turbomachine 120 provides a cooler environment than a radially or axially closer location to the combustor 130.

The third accessory device 1505 is located in the fan cowl space 485. As illustrated, by way of example, the third accessory device 1505 is axially upstream of the AGB2 1510. Alternatively, it is contemplated that the third accessory device 1505 can be radially offset and axially align with at least a portion of the AGB2 1510. In yet another different and non-limiting example, the third accessory device 1505 can extend or be located downstream of the AGB2 1510. That is, the third accessory device 1505 can extend from any one or more portions of the AGB2 1510 in any radial, axial, or circumferential arrangement such that the AGB2 1510 provides an output to the third accessory device 1505 in the fan cowl 170. It is also contemplated that the third accessory device 1505 can axially overlap at least a portion of the inlet guide vanes 186.

Alternatively, it is further contemplated in a differing and non-limiting example, that the third accessory device 1505 an be a set of third accessory devices that can include aircraft accessories, engine accessories, or a combination therein. The set of third accessory devices 1505 are located in the fan cowl space 485 upstream of the high-pressure compressor 128 or the combustor 130 and can be located downstream, upstream, or at least partially axially align with the AGB2 1510.

The third accessory device 1505 or the set of third accessory devices can include one or more of a fuel pump, scavenge pump, fuel metering device, fuel boost pump, permanent magnet alternator, engine turning motor, or rotisserie.

Rotation of the low-pressure shaft 138 or the high-pressure shaft 136 provides or communicates rotational energy to the AGB1 1490 by the one or more shafts and gears illustrated as the communication line 1431. The AGB1 1490 provides rotational output to the first accessory device 1501, the second accessory device 1503, and the connection assembly 1504 or the second transfer shaft 1518. The connection assembly 1504 or the second transfer shaft 1518 then rotates one or more portions of the AGB2 1510, which is operably coupled to the third accessory device 1505.

Benefits of aspects of the disclosure include improved fuel efficiency. The accessory gearbox with components that tangentially extend beyond the core cowl into the fan duct allows for a more aerodynamic core cowl. That is, because a portion of the AGB is between the core cowl and fan cowl the core or fan cowls can be smaller and/or more streamlined or aerodynamic. The smaller core and/or fan cowl can also provide a cost and weight savings.

The accessory gearbox, as disclosed herein, improves maintainability and accessibility, as the accessory gearbox can be located adjacent a point of entry to the gas turbine engine.

The accessory gearbox having the first portion between the engine casing and the core cowl and the second portion between the core cowl and the fan cowl allows the accessory gearbox to have a smaller first portion. The accessory gearbox with the smaller first portion allows for the gas turbine engine to have room for components while minimizing axial length. The first accessory device 1501, the second accessory device 1503, or both the first accessory device 1501 and the second accessory device 1503 can be larger than at least one device of the set of third accessory devices, illustrated as the third accessory device 1505. It is contemplated that a volume of the third accessory device 1505 is in a range of 2% to 66% of a volume of the first accessory device 1501, a volume of the second accessory device 1503, or a volume of the first accessory device 1501 and a volume of the second accessory device 1503. More specially, the third accessory device 1505 is in a range of 2% to 45% of the volume of the first accessory device 1501, the volume of the second accessory device 1503, or the volume of the first accessory device 1501 and the volume of the second accessory device 1503.

It is further contemplated that every device of the set of third accessory devices is in a range of 1% to 90% of the volume of the first accessory device 1501, the volume of the second accessory device 1503, or the volume of the first accessory device 1501 and the volume of the second accessory device 1503.

The AGB1 1490 is larger than the AGB2 1510. It is contemplated that a volume of the AGB2 1510 is in a range from 10% to 80% of a volume of the AGB1 1490. More specifically, the AGB2 1510 is in a range from 15% to 66% of the volume of the AGB1 1490.

The AGB2 1510 is a mini accessory gearbox. As used herein "mini" means that the component referenced with the term mini is smaller than the corresponding like component without the term mini (i.e., the mini accessory gearbox 1510 is smaller than the AGB1 1490).

While illustrated as extending into the strut 174, it is contemplated that the AGB1 1490 can extend into any strut or component that connects the core cowl 122 to the fan cowl 170. That is, for example, a portion or portions of the AGB 1490 can extend through the strut 174, the fan exhaust nozzle 178, a strut 1488 (FIG. 26) or any combination thereof.

Figure 26:
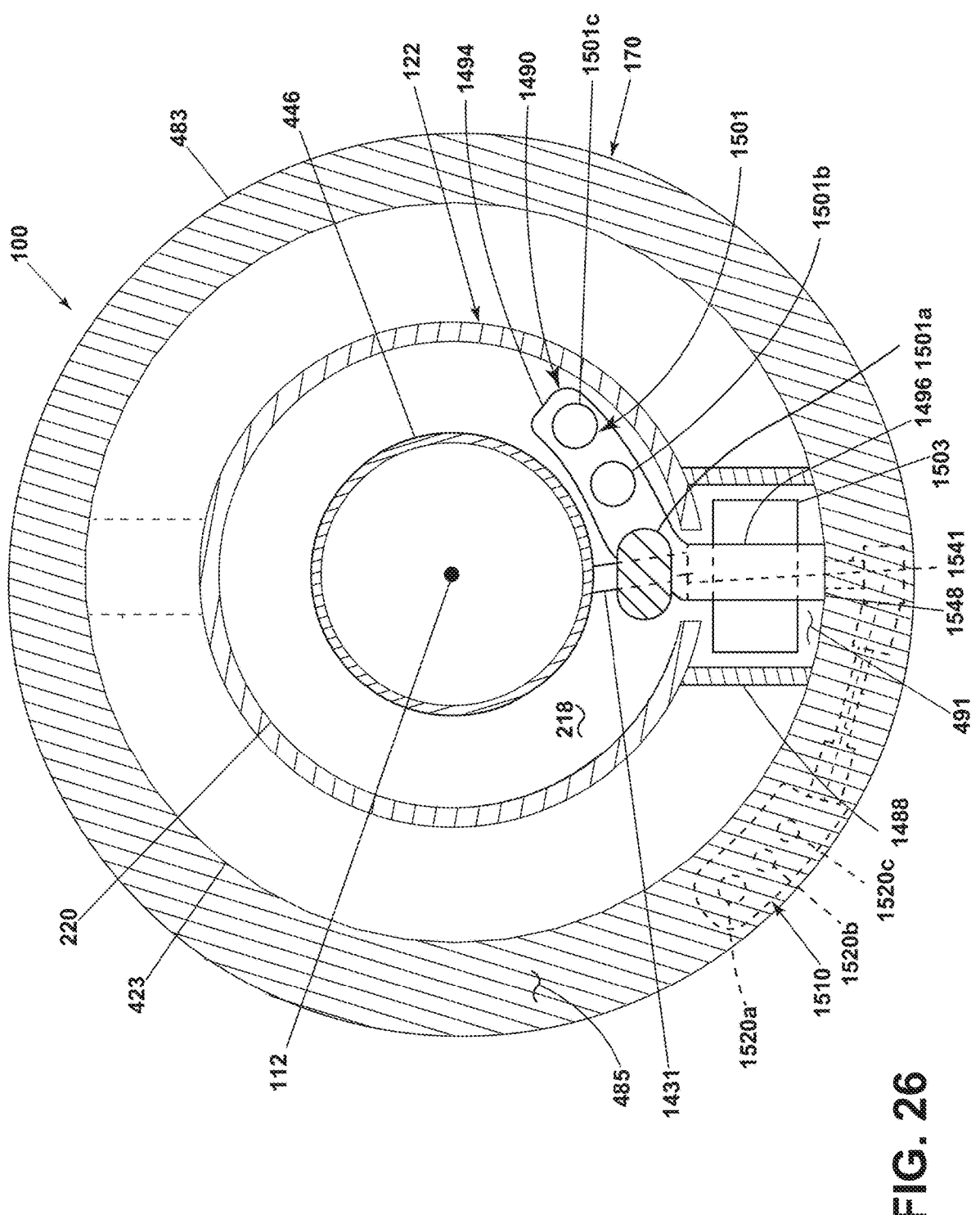
FIG. 26 is a variation of a schematic cross-sectional view of a portion of the gas turbine engine of FIG. 25, according to aspects of the present disclosure.

FIG. 26 is a schematic cross-section of the gas turbine engine 100. The AGB1 1490 is illustrated, by way of example, as extending through a lower strut illustrated as the strut 1488. The AGB1 1490 includes a first portion 1494 and a second portion 1496. The first portion 1494 of the AGB1 1490 is located between the engine casing 446 and the inner surface 220 of the core cowl 122. The first portion 1494 curves or arcs about the axial centerline 112 or the turbomachine 120 (FIG. 25) radially outside of the engine casing 446. The AGB1 1490 is a single arm gearbox, where the first portion 1494 extends circumferentially from the strut 1488 into the space 218 in a single direction (e.g., one of clockwise or counterclockwise).

The second portion 1496 of the AGB1 1490 extends from the first portion 1494 into the strut 1488. While illustrated as having an end 1548 located in the hollow portion 491 of the strut 1488, it is contemplated that the end 1548 can extend past the radially inner surface 423 of the fan cowl 170.

An intersection 1541 or transition can be defined where the second portion 1496 extends from the first portion 1494. The one or more shafts illustrated as communication 1431 can couple to the AGB1 1490 at or adjacent the intersection 1541. The rotational energy provided by the one or more shafts to the AGB1 1490 can be used to drive or operate the first accessory device 1501 and the second accessory device 1503 by a series of gears. Alternatively, the rotational energy can be provided from the AGB1 1490 to operate the first accessory device 1501 and the second accessory device 1503 by a combination of gears and shafts.

The first accessory device 1501 is illustrated as a set of first accessory devices 1501a, 1501b, 1501c. The set of first accessory devices 1501a, 1501b, 1501c are located radially between the engine casing 446 and the inner surface 220 of the core cowl 122. The set of first accessory devices 1501a, 1501b, 1501c are operably coupled to the first portion 1494 of the AGB1 1490.

The set of first accessory devices 1501a, 1501b, 1501c are illustrated, by way of example, as having an oval or circular cross section, however any cross-sectional shape is contemplated. By way of non-limiting example, the first accessory device 1501 cross-sectional shape can be rectangular, trapezoidal, regular polygon, irregular polygon, or any combination thereof.

By way of example, the set of first accessory devices 1501a, 1501b, 1501c can include at least one or more of a variable frequency generator, a hydraulic pump, and a starter.

Locating a variable frequency generator in the space 218 instead of between the radially outer surface 483 and the radially inner surface 423 of the fan cowl 170, provides the benefit of decreasing drag and improving the aerodynamics of the fan cowl 170. The variable frequency generator is generally a larger accessory and by locating it in the space 218 instead of the fan cowl space 485, the core cowl 122 and the fan cowl 170 can be more streamlined or aerodynamic when the variable frequency generator is within the fan cowl space 485. This can result in an overall shorter axial length or a leaner or more aerodynamic core cowl 122 and fan cowl 170, which can reduce the overall diameter of the gas turbine engine 100.

Locating the hydraulic pump in the space 218 instead of the fan cowl space 485 decreases drag, improves the aerodynamics of the fan cowl 170, and reduces overall weight.

While illustrated as located completely within the hollow portion 491, it is contemplated that the second accessory device 1503 can be partially located in the space 218 and partially located in the hollow portion 491 or in the hollow portion 491 and the fan cowl space 485. It is further contemplated that the second accessory device 1503 can be located between the inner surface 220 and the radially inner surface 423. That is, the second accessory device 1503 can radially overlap a portion of the core cowl 122.

The second accessory device 1503 operably couples to the second portion 1496 of the AGB1 1490. The second accessory device 1503 can be a lubrication pump. Locating the lubrication pump in the hollow portion 491 of the strut 1488 instead of the fan cowl space 485 or the space 218 of the core cowl 122 can decrease drag, improve the aerodynamics of the fan cowl 170 or the core cowl 122, help reduce axial length, and can reduce overall weight by reducing the length of lubrication lines. Further, locating the lubrication pump in the strut 1488 is a cooler environment than the space 218. Additional benefits to locating the lubrication pump in the strut 1488 include providing a more compact configuration to support the overall decrease of axial length of the gas turbine engine 100.

The set of third accessory devices 1520a, 1520b, 1520c are operably coupled to the mini accessory gearbox (AGB2 1510). The set of third accessory devices 1520a, 1520b, 1520c, are smaller than the set of first accessory devices 1501a, 1501b, 1501c and the second accessory device 1503. The set of third accessory devices 1520a, 1520b, 1520c can include one or more of a fuel pump, a permanent magnet alternator, or an engine turning motor.

Locating the fuel pump in the fan cowl space 485 provides a cooler environment.

Locating the permanent magnet alternator in the fan cowl space 485 provides the permanent magnet alternator closer to the full authority digital engine control reducing harness weight. Locating the permanent magnet alternator in the fan cowl space 485 places the permanent magnet alternator in an environment that requires less shielding when compared to the space 218. It is also contemplated that the coating on the wires could be thinner when located in the fan cowl space 485 as compared with the space 218.

Locating the engine turning motor in the fan cowl space 485 provides the engine turning motor closer to the full authority digital engine control. Locating the engine turning motor closer to the full authority digital engine control reduces harness weight.

Figure 27:
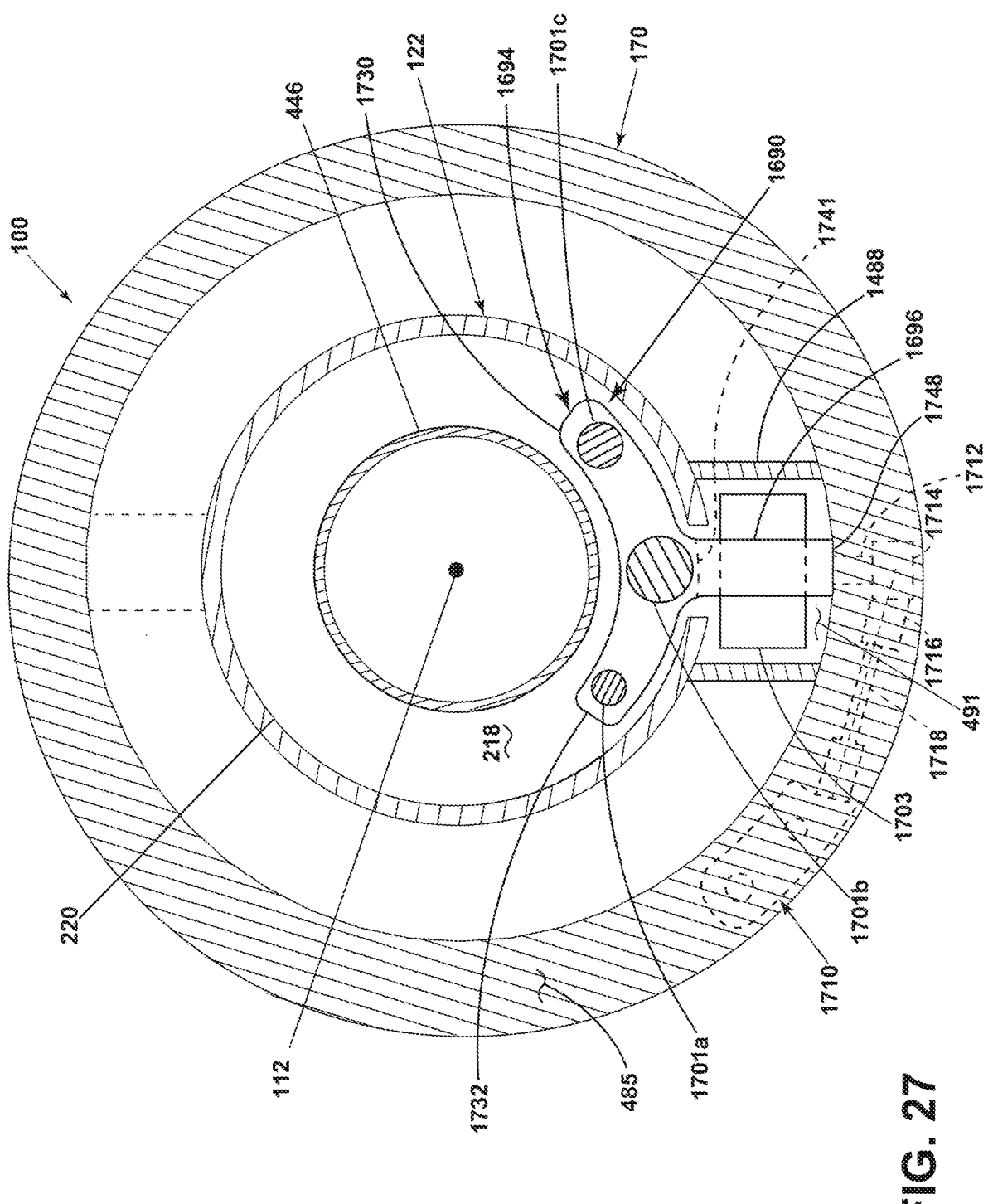
FIG. 27 is a variation of the schematic cross-sectional view of FIG. 26, according to aspects of the present disclosure.

FIG. 27 is a variation of the schematic cross-section of the gas turbine engine 100 of FIG. 26, illustrating a first accessory gearbox (AGB1) 1690. The AGB1 1690 is similar to the AGB1 1490 (FIG. 26), therefore, like parts of the AGB1 1690 will be identified with like numerals increased by 200, with it being understood that the description of the like parts of the AGB1 1490 applies to the AGB1 1690, except where noted.

The AGB1 1690 includes a first portion 1694 and a second portion 1696. The first portion 1694 is located in the space 218 that is the region or space between the engine casing 446 and the inner surface 220 of the core cowl 122. The first portion 1694 includes a first arm 1730 and a second arm 1732. The first arm 1730 and the second arm 1732 can straddle or wrap around different portions of the axial centerline 112 or the engine casing 446. The first arm 1730 and the second arm 1732 can form a U-shape, as illustrated. However, it is contemplated that the first arm 1730 and the second arm 1732 can form a V-shape. It is contemplated that the first arm 1730 and the second arm 1732 straddle the engine core.

While illustrated as symmetric, it is contemplated that the first arm 1730 and the second arm 1732 extend different arc-lengths about the engine casing 446.

The second portion 1696 extends from the first portion 1694 at an intersection 1741. While illustrated as in the space 218, it is contemplated that the intersection 1741 can be in the hollow portion 491 of the strut 1488.

A set of first accessory devices 1701a, 1701b, 1701c can couple to one or more portions of the first arm 1730 or the second arm 1732. As illustrated, by way of example, the set of first accessory devices 1701a, 1701b, 1701c can include at least one device 1701b located at the intersection of the first arm 1730 and the second arm 1732. While illustrated as coupling to the first portion 1694 at the space 218, it is contemplated that one or more portions of one of more of the set of first accessory devices 1701a, 1701b, 1701c can extend into the hollow portion 491 of the strut 1488.

A second accessory device 1703 operably couples to the second portion 1696 of the AGB1 1690. While illustrated as coupling to the second portion 1696 at the hollow portion 491 of the strut 1488, it is contemplated that one or more portions of one of more of the second accessory device 1703 can extend into the space 218 or the fan cowl space 485.

An end 1748 of the second portion 1696 can couple to a first transfer shaft 1712 which transfers rotational energy from the AGB1 1690 to a AGB2 1710 by way of the first interface 1714, the second interface 1716, and the second transfer shaft 1718. However, it is contemplated, in a different and non-limiting example, that the end 1748 of the AGB1 1690 can extend into the fan cowl space 485. Further, it is contemplated in another different and non-limiting example that the transfer of energy from the AGB1 1690 to the AGB2 1710 can be completed using any number of shafts, transfer gearboxes, connecting interfaces, or gears.

Figure 28:
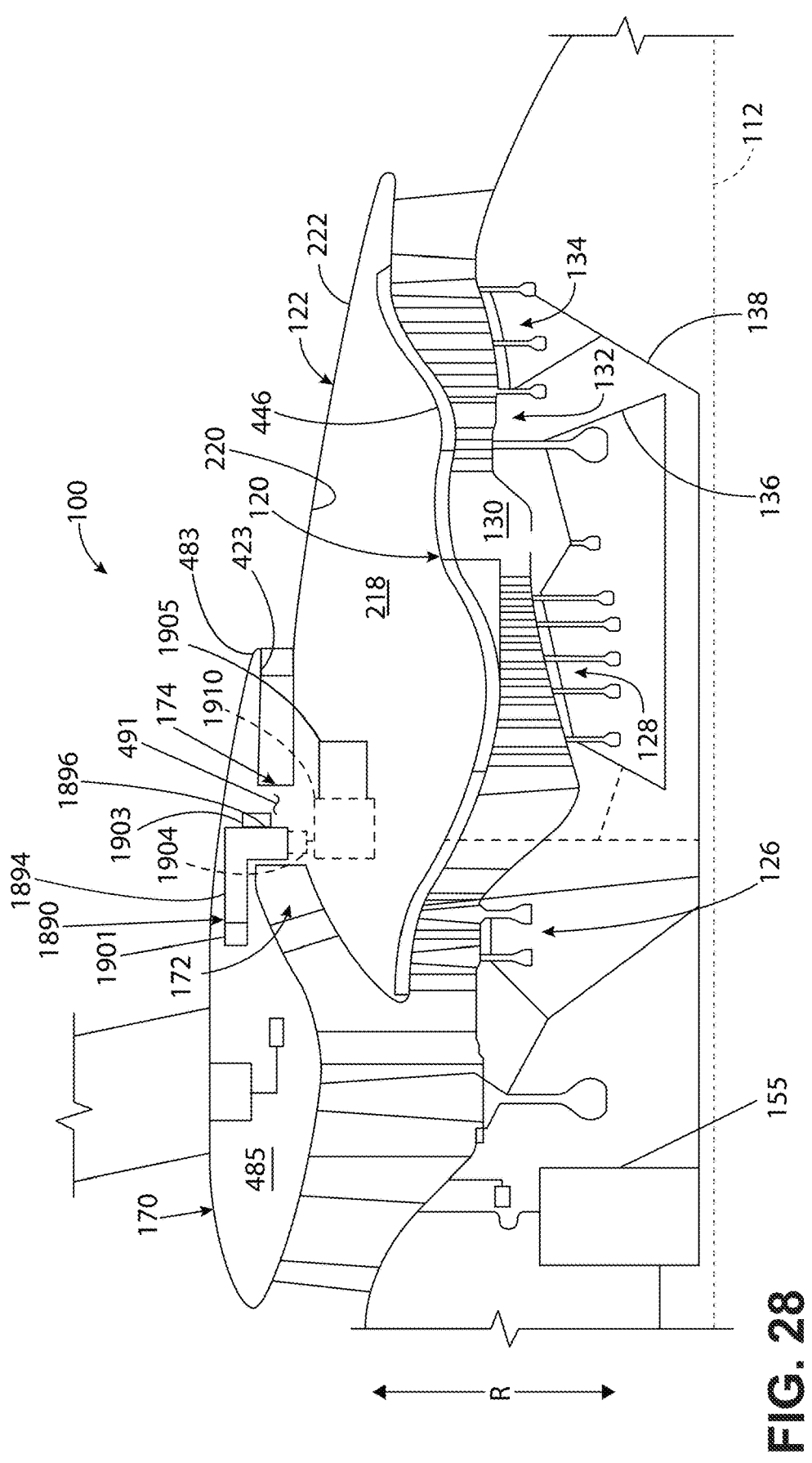
FIG. 28 is a variation of the schematic partial section view of the gas turbine engine of FIG. 17.

FIG. 28 is a variation of the schematic partial section view of the gas turbine engine 100 of FIG. 17. The gas turbine engine 100 includes the engine axis of rotation illustrated as the axial centerline 112. The gas turbine engine 100 includes the turbomachine 120. The turbomachine 120 includes at least the high-pressure compressor 128, the combustor 130, the high-pressure turbine 132, and the low-pressure turbine 134.

The high-pressure shaft 136 can be disposed coaxially about the axial centerline 112 of the gas turbine engine 100 and drivingly connect the high-pressure turbine 132 to the high-pressure compressor 128. The low-pressure shaft 138 can be disposed coaxially about the axial centerline 112 of the gas turbine engine 100 and drivingly connect the low-pressure turbine 134 to one or more portions of the low-pressure compressor 126 and/or the fan section 150 (FIG. 4) via the speed reduction gearbox 155.

The core cowl 122 is radially spaced from and circumscribes at least a portion of the turbomachine 120 or the engine casing 446.

The inner cowl space is illustrated as the space 218 and is defined between at least a portion of the engine casing 446 and the inner surface 220 of the core cowl 122.

The fan cowl 170 is radially spaced from the core cowl 122 and can circumscribe at least a portion of the core cowl 122. The fan cowl 170 has the radially outer surface 483 and the radially inner surface 423, where the radially inner surface 423 is spaced from and confronts the outer surface 222 of the core cowl 122. The radially outer surface 483 and the radially inner surface 423 of the fan cowl 170 define the fan cowl space 485.

The strut 174 extends radially from the core cowl 122 to the fan cowl 170. That is, the strut 174 radially extends or spans the fan duct 172 defined between the core cowl 122 and the fan cowl 170. More specifically, the strut 174 can couple the space 218 and the fan cowl space 485. The strut 174 includes the hollow portion 491 extending between the core cowl 122 and the fan cowl 170.

An accessory gearbox (AGB) 1890 is at least partially located in the fan cowl space 485. The AGB 1890 can extend from the fan cowl space 485 into the hollow portion 491 of the strut 174. That is, the AGB 1890 can include a first portion 1894 and second portion 1896. While illustrated as having two portions, it is contemplated that the AGB 1890 is located in the fan cowl space 485 and does not extend into the hollow portion 491. It is further contemplated that for the AGB located in the fan cowl space and only having a first portion that one or more shafts can extend from the AGB into the hollow portion 491.

Optionally, the AGB 1890 can extend from the fan cowl space 485, through the hollow portion 491 of the strut 174, and into the space 218 of the core cowl 122. A connection assembly 1904 can be an extension of the second portion 1896 or additional components such as, but not limited to, one or more of a transfer gearbox, shafts, gears, or other coupling devices.

The AGB 1890 can be axially located upstream of the high-pressure turbine section 132 and downstream of the fan section 150 (FIG. 4). One or more shafts and one or more gears can operably couple the AGB 1890 to the high-pressure shaft 136 or the low-pressure shaft 138. It is further contemplated that the AGB 1890 can receive rotational energy from the fan section 150 (FIG. 4), an energy storage device, or any other rotating component of the gas turbine engine 100.

A first accessory device 1901 is coupled to the AGB 1890. The first accessory device 1901 is located radially between the radially outer surface 483 and the radially inner surface 423 of the fan cowl 170. That is, the first accessory device 1901 is located in the fan cowl space 485.

The first accessory device 1901 can be an engine accessory or an aircraft accessory. By way of non-limiting example, the first accessory device 1901 can include one or more of a fuel pump, scavenge pump, fuel metering device, fuel boost pump, permanent magnet alternator, engine turning motor, or rotisserie.

A second accessory device 1903 is coupled to the AGB 1890. The second accessory device 1903 is located in the hollow portion 491 of the strut 174. The second accessory device 1503 is located upstream of the combustor 130 or the high-pressure turbine 132. Locating both the second accessory device 1903 and the AGB 1890 upstream of the combustor 130 or the high-pressure turbine 132 provides temperature benefits.

While illustrated as located in the hollow portion 491 of the strut 174, it is contemplated that the second accessory device 1903 can be partially located or otherwise extend from the fan cowl space 485 into the hollow portion 491 or from the hollow portion 491 into the space 218.

As illustrated, by way of example, the second accessory device 1903 axially overlaps and is partially downstream of the AGB 1890. However, any location relative to the AGB 1890 is contemplated.

It is further contemplated that the second accessory device 1903 can be a set of second accessory devices that can include aircraft accessories, engine accessories, or a combination therein. The set of second accessory devices are located upstream of the combustor 130 and can be located downstream, upstream, or at least partially axially align with the AGB1 1890. For example, the set of second accessory devices can include two accessory devices where one accessory device is located downstream of the AGB 1890 and the other accessory device is axially aligned with the AGB 1890 or is located circumferentially on either side of the AGB 1890.

The second accessory device 1903 or the set of secondary accessory devices can be an aircraft accessory, an engine accessory, or any combination therein. The second accessory device 1903 can be by way of non-limiting example, a lubrication pump, although any one or more aircraft accessory or engine accessory is contemplated.

Optionally, the AGB 1890 is a first accessory gearbox (AGB1). The connection assembly 1904 or a transfer gearbox (TGB) can operably couple the AGB1 1890 to a second accessory gearbox (AGB2) 1910. The connection assembly 1904 can include any number of shafts, gears, or other elements can couple the AGB1 1890 to the AGB2 1910. The connection assembly 1904 communicates a rotational output from the AGB1 1890 as a rotational input for the AGB2

1910. Additionally, or alternatively, the connection assembly 1904 can include any number of shafts, gears, or other elements to couple the AGB2 1910 to the AGB1 1890 such that the connection assembly 1904 communicates a rotational output from the AGB2 1910 as a rotational input for the AGB1 1890.

A third accessory device 1905 is located in the space 218. The third accessory device 1905 can be coupled to the AGB2 1910, the connection assembly 1904, or the AGB1 1890. The third accessory device 1905 is located upstream of the combustor 130. The third accessory device 1905 can also be upstream of the strut 174. That is, one or more portions of the third accessory device 1905 can axially overlap a portion of the low-pressure compressor 126. Having the AGB2 1910 or the third accessory device 1905 provides a cooler environment.

Alternatively, it is further contemplated in a differing and non-limiting example, that the third accessory device 1905 can be a set of third accessory devices that can include aircraft accessories, engine accessories, or a combination therein. The set of third accessory devices 1905 are located in the space 218 upstream of the high-pressure compressor 128 or the combustor 130 and can be located downstream, upstream, or at least partially axially align with the AGB2 1910 or portions of AGB1 1890.

The third accessory device 1905 or the set of third accessory devices can include one or more of a starter, a hydraulic pump, or an electric generator. The electrical generator can be, by way of non-limiting example, a variable frequency generator. The starter, by way of example, can be a pneumatic starter or air turbine starter.

Any combination of one or more AGBs are contemplated as located at the space 218 in the core cowl 122 or the space 485 in the fan cowl 170 and can extend into the hollow portion 491 of any one or more struts that extend between the core cowl 122 and the fan cowl 170.

Benefits of aspects of the disclosure include improved overall fuel efficiency. The unique design reflects a desirable trade between the benefit of overall fuel efficiency verses the penalties of electing to use two gearboxes. That is, using two gearboxes, where the primary gearbox is located in the core cowl space and the hollow portion of the strut and the mini gearbox is located in the fan cowl space, along with placing larger accessories in the core cowl space or the hollow portion of the strut with smaller accessories located in the fan cowl provides the unexpected solution of improved overall fuel efficiency.

Benefits of locating the first accessory device (or the set of first accessory devices) and the second accessory device within the core cowl and strut (instead of in the outer cowl) reduces the length of the communication lines, fluid lines, or other connecting components to aircraft systems or the engine core. Shortening the communication lines, fluid lines, or other connecting components can reduce weight carried by the aircraft. Further, shortening the communication lines, fluid lines, or other connecting components will have a material savings.

Benefits of locating the first accessory device (or the set of first accessory devices) and the second accessory device within the core cowl space and strut (instead of in the fan cowl space) improves aerodynamics and weight of the core cowl and the fan cowl.

Further, the unique location of the first, second, and third accessories can provide for a compact configuration required by engines with overall decreased axial lengths.

The split configuration of the accessories provides a maintenance advantage. That is, not placing the first, second, and third accessories all in the core cowl space makes it easier to access each accessory. As compared to a fully core AGB with accessories, the split configuration reduces the number (or density) of accessories in the core cowl space; which can make it easier to provide maintenance to the first accessory or set of first accessories. Further, the hollow portion of the strut as well as the fan cowl space are known to be accessible spaces to provide maintenance. Therefore, maintenance to the second accessory and the third accessory or third set of accessories is improved when compared to a fully core AGB with accessories.

The configuration of the mini AGB with select accessories in the outer cowl provides a cooler environment for the operation of the mini AGB and attached accessories. While the core cowl and strut are a warmer environment, a temperature benefit can still be had by locating the AGB1 and attached accessories upstream of the combustion section.

Therefore, aspects of the disclosure simultaneously improve fuel burn by facilitating a tight aerodynamic cowl line package around the engine core while balancing environment temperature and maintenance access.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine defining an axial direction and a radial direction, the gas turbine engine comprising a turbomachine having an unducted primary fan, a core engine including a combustor and a combustor casing enclosing the combustor and defining an outer surface, and a core cowl surrounding at least a portion of the core engine and defining an inner surface and an outer surface. Wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), and wherein the CDR is between 2.7 and 3.5 and wherein the CLR is between 0.25 and 0.50.

The gas turbine engine of the preceding clause, wherein the CDR is between 2.8 and 3.3.

The gas turbine engine of any preceding clause, wherein the CLR is between 0.3 and 0.45.

The gas turbine engine of any preceding clause, wherein the CLR is between 0.40 and 0.45.

The gas turbine engine of any preceding clause, wherein a void is defined between the outer surface of the combustor casing and the inner surface of the core cowl.

The gas turbine engine of any preceding clause, further comprising at least one engine accessory coupled to the inner surface of the core cowl.

The gas turbine engine of any preceding clause, further comprising a rear frame including a strut having a trailing edge, wherein the primary fan includes a primary fan blade having a leading edge, and wherein the overall core axial length (L) along the axial direction is measured from the leading edge of the primary fan blade to the trailing edge of the strut.

The gas turbine engine of any preceding clause, further comprising a high-pressure compressor inlet guide vane having a leading edge, and a rear frame including a strut having a trailing edge, wherein the under-core cowl axial length (L1) along the axial direction is measured from the leading edge of the inlet guide vane to the trailing edge of the strut.

The gas turbine engine of any preceding clause, further comprising a ducted secondary fan disposed downstream from the primary fan.

The gas turbine engine of any preceding clause, wherein the ducted secondary fan is a single stage secondary fan.

The gas turbine engine of any preceding clause, wherein the gas turbine engine is a three-stream gas turbine engine.

An aircraft, comprising a wing and a gas turbine engine mounted to the wing, the gas turbine engine defining an axial direction and a radial direction, the gas turbine engine comprising: a turbomachine having an unducted primary fan, a core engine including a combustor and a combustor casing enclosing the combustor and defining an outer surface, a core cowl surrounding at least a portion of the core engine and defining an inner surface and an outer surface. Wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction. Wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L). Wherein the CDR is between 2.7 and 3.5 and wherein the CLR is between 0.25 and 0.50.

The aircraft as in the preceding clause, wherein the CDR is between 2.8 and 3.3.

The aircraft of any preceding clause, wherein the CLR is between 0.3 and 0.45.

The aircraft of any preceding clause, wherein the CLR is between 0.40 and 0.45.

The aircraft of any preceding clause, wherein a void is defined between the outer surface of the combustor casing and the inner surface of the core cowl of the gas turbine engine, and wherein at least one engine accessory is coupled to the inner surface of the core cowl.

The aircraft of any preceding clause, wherein the gas turbine engine further comprises a rear frame including a strut having a trailing edge, wherein the primary fan includes a plurality of primary fan blades where each primary fan blade has a leading edge, and wherein the overall core axial length (L) along the axial direction is measured from a leading edge of a respective primary fan blade of the plurality of primary fan blades to the trailing edge of the strut.

The aircraft of any preceding clause, wherein the gas turbine engine further comprises a high-pressure compressor inlet guide vane having a leading edge, and a rear frame including a strut having a trailing edge, wherein the under-core cowl axial length (L1) along the axial direction is measured from the leading edge of the inlet guide vane to the trailing edge of the strut.

The aircraft of any preceding clause, the gas turbine engine further comprising a ducted secondary fan disposed downstream from the unducted primary fan.

A gas turbine engine, comprising: a core engine; a core cowl at least partially encasing a portion of the core engine, the core cowl having an inner surface and defining in part a void is between the inner surface and the core engine, the core cowl moveable relative to the core engine; and an engine component selectively coupled to the core engine or the core cowl.

The gas turbine engine of the preceding clause, wherein the core cowl is pivotable relative to the core engine.

A gas turbine engine, comprising a turbomachine and a housing at least partially encasing a portion of the turbomachine, the housing having an inner surface and defining in part a void between the inner surface and the portion of the turbomachine, the housing moveable relative to the portion of the turbomachine; and an engine component selectively coupled to the portion of the turbomachine or to the housing.

The gas turbine engine of the preceding clause, wherein the turbomachinery comprises a core engine, the housing comprises a core cowl at least partially encasing a portion of the core engine, the core cowl having an inner surface and defining in part a void between the inner surface and the core engine, wherein the core cowl is moveable relative to the core engine, and an engine component selectively coupled to the core engine or the core cowl, and wherein the core cowl is pivotable relative to the core engine.

The gas turbine engine of any preceding clause, wherein when the engine component is selectively coupled to the core cowl, the engine component travels with the core cowl when the core cowl is moved away from the core engine.

The gas turbine engine of any preceding clause, wherein the engine component is one of a heat exchanger, a sensor, a controller, a pump, a duct, a fire and overheat component, a generator, or a valve.

The gas turbine engine of any preceding clause, further comprising: a fastener, wherein the engine component is selectively connected to the core engine or the core cowl via the fastener.

The gas turbine engine of any preceding clause, wherein the core cowl defines an access opening, wherein the fastener is accessible through the access opening.

The gas turbine engine of any preceding clause, wherein the fastener includes a plurality of articulating tabs, wherein in a first position the plurality of articulating tabs engages with the core engine and the engine component and in a second position the plurality of tabs engages with the core cowl and the engine component.

The gas turbine engine of any preceding clause, further comprising a push-pull mechanism including a first pin, wherein the engine component is selectively coupled to the core engine or the core cowl via the push-pull mechanism, wherein the first pin engages with the core engine and the engine component when the push-pull mechanism is in a first position, and the first pin engages with the engine component and the core cowl when the push-pull mechanism is in a second position.

The gas turbine engine of any preceding clause, wherein the push-pull mechanism is manually actuated between the first position and the second position.

The gas turbine engine of any preceding clause, wherein the push-pull mechanism is electrically actuated between the first position and the second position.

The gas turbine engine of any preceding clause, wherein the push-pull mechanism includes a second pin, wherein the second pin engages with a door counterbalance mechanism when the first pin is engaged with the engine component and the core cowl.

The gas turbine engine of any preceding clause, wherein the gas turbine engine includes an unducted primary fan.

The gas turbine engine of any preceding clause, further comprising a ducted secondary fan disposed downstream from the primary fan, wherein the ducted secondary fan is a single stage secondary fan or a multi-stage secondary fan.

An aircraft, comprising a core engine and a core cowl at least partially encasing a portion of the core engine. The core cowl having an inner surface, wherein a void is defined between the inner surface and the core engine, wherein the core cowl is pivotally mounted to the gas turbine engine, and an engine component selectively coupled to the core engine or the core cowl.

The aircraft as in the preceding clause, wherein the engine component is selectively coupled to the core cowl, and wherein the engine component travels with the core cowl when the core cowl is pivoted away from the core engine.

The aircraft of any preceding clause, wherein the engine component is one of a heat exchanger, a sensor, a controller, a pump, a duct, a fire and overheat component, a generator, or a valve.

The aircraft of any preceding clause, wherein the engine component is selectively coupled to the core engine or the core cowl via a fastener, wherein the fastener is accessible from outside of the core cowl, wherein the fastener includes a plurality of articulating tabs, and wherein in a first position the plurality of articulating tabs engages with the core engine and the engine component, and in a second position the plurality of articulating tabs engages with the core cowl and the engine component.

The aircraft of any preceding clause, wherein the engine component is selectively coupled to the core engine or the core cowl via a push-pull mechanism including a first pin, wherein the first pin engages with the core engine and the engine component when the push-pull mechanism is in a first position, and the first pin engages with the engine component and the core cowl when the push-pull mechanism is in a second position.

The aircraft of any preceding clause, wherein the push-pull mechanism is manually actuated between the first position and the second position.

The aircraft of any preceding clause, wherein the push-pull mechanism includes a second pin, wherein the second pin engages with a door counterbalance mechanism when the first pin is engaged with the core cowl and the engine component.

The aircraft of any preceding clause, wherein the engine component is selectively connected to the core engine or the core cowl via a push-pull mechanism including a first pin, wherein the first pin engages with the core engine and the engine component when the push-pull mechanism is in a first position, and the first pin engages with the engine component and the core cowl when the push-pull mechanism is in a second position, wherein the push-pull mechanism is manually actuatable between the first position and the second position.

The aircraft of any preceding clause, wherein the gas turbine engine includes a ducted primary fan.

The gas turbine engine of any preceding clause, wherein the engine component is positioned within the core cowl.

The gas turbine engine of any preceding clause, wherein the engine component is one of a heat exchanger, a sensor, a controller, a pump, a duct, a fire and overheat component, a generator, or a valve.

The gas turbine engine of any preceding clause, wherein the engine component is an engine controller.

The gas turbine engine of any preceding clause, wherein the engine component is power electronics, a lubrication oil tank, a lubrication oil pump, an electric machine, or a combination thereof.

The gas turbine engine of any preceding clause, wherein the gas turbine engine is incorporated into an aircraft configured to cruise at an altitude between 28,000 feet and 65,000 feet.

The gas turbine engine of any preceding clause, wherein the gas turbine engine is configured to generate at least 18,000 pounds of thrust and less than 80,000 pounds of thrust when operated at a rated speed during standard day operating conditions.

A gas turbine engine defining an axial direction, the gas turbine engine comprising: a turbomachine having a primary fan, a core engine, and a core cowl surrounding at least a portion of the core engine, the turbomachine defining an under-core cowl axial length (L1) along the axial direction and an initial compression axial length (L2), the core engine comprising a gearbox, the primary fan being drivingly coupled to the core engine across the gearbox; wherein the gas turbine engine is configured to generate at least 18,000 pounds of thrust and less than 80,000 pounds of thrust when operated at a rated speed during standard day operating conditions, wherein the turbomachine defines an initial compression length ratio (ICLR) equal to the initial compression axial length (L2) divided by the under-core cowl axial length (L1), wherein the ICLR is greater than or equal to 0.55 and less than or equal to 0.9.

A gas turbine engine defining an axial direction, the gas turbine engine comprising: a turbomachine having a primary fan, a core engine, and a core cowl surrounding at least a portion of the core engine, the turbomachine defining an under-core cowl axial length (L1) along the axial direction and an initial compression axial length (L2), the core engine comprising a gearbox and a turbine section having a low-pressure turbine, the primary fan being drivingly coupled to the low-pressure turbine across the gearbox; wherein the low-pressure turbine comprises at least a total of four stages of low-pressure turbine rotor blades and up to six stages of low-pressure turbine rotor blades; wherein the turbomachine defines an initial compression length ratio (ICLR) equal to the initial compression axial length (L2) divided by the under-core cowl axial length (L1), wherein the ICLR is greater than or equal to 0.3 and less than or equal to 0.9.

A gas turbine engine defining an axial direction, the gas turbine engine comprising: a turbomachine having a primary fan, a core engine, and a core cowl surrounding at least a portion of the core engine, the turbomachine defining an under-core cowl axial length (L1) along the axial direction and an initial compression axial length (L2), the core engine comprising a gearbox having a gear ratio greater than or equal to 3.2:1 and less than or equal to 14:1, the primary fan being drivingly coupled to the core engine across the gearbox; wherein the turbomachine defines an initial compression length ratio (ICLR) equal to the initial compression axial length (L2) divided by the under-core cowl axial length (L1), wherein the ICLR is greater than or equal to 0.3 and less than or equal to 0.9.

A gas turbine engine defining an axial direction, the gas turbine engine comprising: a turbomachine having a primary fan, a core engine, and a core cowl surrounding at least a portion of the core engine, the core engine comprising a high-pressure compressor comprising at least a total of eight stages of high-pressure compressor rotor blades and up to a total of 11 stages of high-pressure compressor rotor blades, the core engine further comprising a gearbox, the primary fan being drivingly coupled to the core engine across the gearbox; wherein the turbomachine defines an under-core cowl axial length (L1) along the axial direction and an initial compression axial length (L2), wherein the turbomachine defines an initial compression length ratio (ICLR) equal to the initial compression axial length (L2) divided by the under-core cowl axial length (L1), wherein the ICLR is greater than or equal to 0.3 and less than or equal to 0.9.

The gas turbine engine of any preceding clause, wherein the ICLR is greater than or equal to 0.55 and less than or equal to 0.9.

The gas turbine engine of any preceding clause, wherein the ICLR is greater than or equal to 0.6 and less than or equal to 0.89.

The gas turbine engine of any preceding clause, wherein the primary fan is an unducted primary fan, and wherein the ICLR is greater than or equal to 0.7.

The gas turbine engine of any preceding clause, wherein the turbomachine further includes a fan cowl and defines a fan duct between the fan cowl and the core cowl configured as a third stream, and wherein the ICLR is greater than or equal to 0.7.

The gas turbine engine of any preceding clause, further comprising a nacelle surrounding at least in part the primary fan, and wherein the ICLR is greater than or equal to 0.6 and less than or equal to 0.75.

The gas turbine engine of any preceding clause, wherein the gas turbine engine is a two stream engine, and wherein the ICLR is greater than or equal to 0.6 and less than or equal to 0.75.

The gas turbine engine of any preceding clause, wherein the core engine comprises a compressor section and a turbine section, wherein the compressor section has a high-pressure compressor comprising a total of eight to ten stages of high-pressure compressor rotor blades, and wherein the turbine section has a low-pressure turbine comprising a total of three to five stages of low-pressure turbine rotor blades.

The gas turbine engine of any preceding clause, wherein the gas turbine engine is configured to generate at least 18,000 pounds of thrust and less than 80,000 pounds of thrust when operated at a rated speed during standard day operating conditions.

The gas turbine engine of any preceding clause, wherein the gas turbine engine is configured to generate between 25,000 and 60,000 pounds of thrust during operation at the rated speed during standard day operating conditions.

The gas turbine engine of any preceding clause, wherein the high-pressure compressor comprises a total of nine stages.

The gas turbine engine of any preceding clause, wherein the low-pressure turbine comprises a total of four stages.

A gas turbine engine defining an axial direction and a radial direction, the gas turbine engine comprising a turbomachine having an unducted primary fan, a core engine including a combustor and a combustor casing enclosing the combustor and defining an outer surface, a core cowl surrounding at least a portion of the core engine and defining an inner surface and an outer surface, and an accessory gearbox, wherein at least a portion of the accessory gearbox is located between the core cowl and the core engine, wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), wherein the CDR is between 2.7 and 3.5 and wherein the CLR is between 0.25 and 0.50.

The gas turbine engine of any preceding clause, further comprising at least one strut that couples the core cowl to a fan cowl, wherein the strut includes a hollow portion.

The gas turbine engine of any preceding clause, wherein the accessory gearbox includes a first portion located between the core cowl and the core engine, and a second portion, extending from the first portion, located in the hollow portion of the strut.

The gas turbine engine of any preceding clause, wherein the second portion defines a base from which a first arm and a second arm of the first portion extend to define a Y-shaped object.

The gas turbine engine of any preceding clause, wherein the first portion includes a single arm.

The gas turbine engine of any preceding clause, further comprising a first accessory device located between the core cowl and the core engine.

The gas turbine engine of any preceding clause, further comprising a second accessory device located in the hollow portion of the strut and operably coupled to the second portion of the accessory gearbox.

The gas turbine engine of any preceding clause, wherein the accessory gearbox is a first accessory gearbox, and the gas turbine engine further comprising a second accessory gearbox located in the fan cowl and operably coupled to the first accessory gearbox.

The gas turbine engine of any preceding clause, further comprising a third accessory device operably coupled to the second accessory gearbox and located in the fan cowl.

The gas turbine engine of any preceding clause, wherein the accessory gearbox is located between the core cowl and the outer surface of the combustor casing.

The gas turbine engine of any preceding clause, wherein the CDR is between 2.8 and 3.3.

The gas turbine engine of any preceding clause, wherein the CLR is between 0.3 and 0.45.

The gas turbine engine of any preceding clause, further comprising a ducted secondary fan disposed downstream from a primary fan.

The gas turbine engine of any preceding clause, wherein the ducted secondary fan is a single stage secondary fan.

The gas turbine engine of any preceding clause, wherein the gas turbine engine is a three-stream gas turbine engine.

The gas turbine engine of any preceding clause, wherein the CLR is between 0.40 and 0.45.

The gas turbine engine of any preceding clause, wherein a void is defined between the outer surface of the combustor casing and the inner surface of the core cowl.

The gas turbine engine of any preceding clause, further comprising at least one engine accessory coupled to the inner surface of the core cowl.

The gas turbine engine of any preceding clause, further comprising a rear frame including a strut having a trailing edge, wherein the primary fan includes a primary fan blade having a leading edge, and wherein the overall core axial length (L) along the axial direction is measured from the leading edge of the primary fan blade to the trailing edge of the strut.

The gas turbine engine of any preceding clause, further comprising a high-pressure compressor inlet guide vane having a leading edge, and a rear frame including a strut having a trailing edge, wherein the under-core cowl axial length (L1) along the axial direction is measured from the leading edge of the inlet guide vane to the trailing edge of the strut.

The gas turbine engine of the preceding clause, wherein the core cowl is pivotable relative to the core engine.

A gas turbine engine, comprising a turbomachine and a housing at least partially encasing a portion of the turbomachine, the housing having an inner surface and defining in part a void between the inner surface and the portion of the turbomachine, the housing moveable relative to the portion of the turbomachine; and an engine component selectively coupled to the portion of the turbomachine or to the housing.

The gas turbine engine of the preceding clause, wherein the turbomachinery comprises a core engine, the housing comprises a core cowl at least partially encasing a portion of the core engine, the core cowl having an inner surface and defining in part a void between the inner surface and the core engine, wherein the core cowl is moveable relative to the core engine, and an engine component selectively coupled to the core engine or the core cowl, and wherein the core cowl is pivotable relative to the core engine.

The gas turbine engine of any preceding clause, wherein when the engine component is selectively coupled to the core cowl, the engine component travels with the core cowl when the core cowl is moved away from the core engine.

The gas turbine engine of any preceding clause, wherein the engine component is one of a heat exchanger, a sensor, a controller, a pump, a duct, a fire and overheat component, a generator, or a valve.

The gas turbine engine of any preceding clause, further comprising: a fastener, wherein the engine component is selectively connected to the core engine or the core cowl via the fastener.

The gas turbine engine of any preceding clause, wherein the core cowl defines an access opening, wherein the fastener is accessible through the access opening.

The gas turbine engine of any preceding clause, wherein the fastener includes a plurality of articulating tabs, wherein in a first position the plurality of articulating tabs engages with the core engine and the engine component and in a second position the plurality of tabs engages with the core cowl and the engine component.

The gas turbine engine of any preceding clause, further comprising a push-pull mechanism including a first pin, wherein the engine component is selectively coupled to the core engine or the core cowl via the push-pull mechanism, wherein the first pin engages with the core engine and the engine component when the push-pull mechanism is in a first position, and the first pin engages with the engine component and the core cowl when the push-pull mechanism is in a second position.

The gas turbine engine of any preceding clause, wherein the push-pull mechanism is manually actuated between the first position and the second position.

The gas turbine engine of any preceding clause, wherein the push-pull mechanism is electrically actuated between first position and the second position.

The gas turbine engine of any preceding clause, wherein the push-pull mechanism includes a second pin, wherein the second pin engages with a door counterbalance mechanism when the first pin is engaged with the engine component and the core cowl.

The gas turbine engine of any preceding clause, wherein the gas turbine engine includes an unducted primary fan.

The gas turbine engine of any preceding clause, further comprising a ducted secondary fan disposed downstream from the primary fan, wherein the ducted secondary fan is a single stage secondary fan or a multi-stage secondary fan.

The gas turbine engine of any preceding clause, wherein the engine component is positioned within the core cowl.

The gas turbine engine of any preceding clause, wherein the engine component is one of a heat exchanger, a sensor, a controller, a pump, a duct, a fire and overheat component, a generator, or a valve.

The gas turbine engine of any preceding clause, wherein the engine component is an engine controller.

The gas turbine engine of any preceding clause, wherein the engine component is power electronics, a lubrication oil tank, a lubrication oil pump, an electric machine, or a combination thereof.

The gas turbine engine of any preceding clause, wherein the gas turbine engine is incorporated into an aircraft configured to cruise at an altitude between 28,000 feet and 65,000 feet.

The gas turbine engine of any preceding clause, wherein the gas turbine engine is configured to generate at least 18,000 pounds of thrust and less than 80,000 pounds of thrust when operated at a rated speed during standard day operating conditions.

The gas turbine engine of any preceding clause defining an axial direction, the gas turbine engine comprising: a turbomachine having a primary fan, a core engine, and a core cowl surrounding at least a portion of the core engine, the core engine comprising a high-pressure compressor comprising at least a total of eight stages of high-pressure compressor rotor blades and up to a total of 11 stages of high-pressure compressor rotor blades, the core engine further comprising a gearbox, the primary fan being drivingly coupled to the core engine across the gearbox; wherein the turbomachine defines an under-core cowl axial length (L1) along the axial direction and an initial compression axial length (L2), wherein the turbomachine defines an initial compression length ratio (ICLR) equal to the initial compression axial length (L2) divided by the under-core cowl axial length (L1), wherein the ICLR is greater than or equal to 0.3 and less than or equal to 0.9.

The gas turbine engine of any preceding clause, wherein the ICLR is greater than or equal to 0.55 and less than or equal to 0.9.

The gas turbine engine of any preceding clause, wherein the ICLR is greater than or equal to 0.6 and less than or equal to 0.89.

The gas turbine engine of any preceding clause, wherein the primary fan is an unducted primary fan, and wherein the ICLR is greater than or equal to 0.7.

The gas turbine engine of any preceding clause, wherein the turbomachine further includes a fan cowl and defines a fan duct between the fan cowl and the core cowl configured as a third stream, and wherein the ICLR is greater than or equal to 0.7.

The gas turbine engine of any preceding clause, further comprising a nacelle surrounding at least in part the primary fan, and wherein the ICLR is greater than or equal to 0.6 and less than or equal to 0.75.

The gas turbine engine of any preceding clause, wherein the gas turbine engine is a two stream engine, and wherein the ICLR is greater than or equal to 0.6 and less than or equal to 0.75.

The gas turbine engine of any preceding clause, wherein the core engine comprises a compressor section and a turbine section, wherein the compressor section has a high-pressure compressor comprising a total of eight to ten stages of high-pressure compressor rotor blades, and wherein the turbine section has a low-pressure turbine comprising a total of three to five stages of low-pressure turbine rotor blades.

The gas turbine engine of any preceding clause, wherein the gas turbine engine is configured to generate at least 18,000 pounds of thrust and less than 80,000 pounds of thrust when operated at a rated speed during standard day operating conditions.

The gas turbine engine of any preceding clause, wherein the gas turbine engine is configured to generate between 25,000 and 60,000 pounds of thrust during operation at the rated speed during standard day operating conditions.

The gas turbine engine of any preceding clause, wherein the high-pressure compressor comprises a total of nine stages.

The gas turbine engine of any preceding clause, wherein the low-pressure turbine comprises a total of four stages.

The gas turbine engine of any preceding clause, wherein the accessory gearbox defines an accessory gearbox axis that is parallel to an axial centerline of the gas turbine engine.

The gas turbine engine of any preceding clause, wherein the accessory gearbox comprises a first portion located between the core engine and the core cowl that straddles the core engine and a second portion located between the core cowl and a fan cowl.

The gas turbine engine of any preceding clause, wherein the second portion of the accessory gearbox is perpendicular to the accessory gearbox axis.

The gas turbine engine of any preceding clause, wherein the accessory gearbox includes a primary set of interfaces defined by a first plane, a secondary set of interfaces defined by a second plane, and a tertiary set of interfaces defined by a third plane.

The gas turbine engine of any preceding clause, wherein the first portion of the accessory gearbox comprises a V-shaped cross-section.

The gas turbine engine of any preceding clause, wherein the V-shaped cross-section defines a first surface perpendicular the first plane and a second surface perpendicular to the second plane.

The gas turbine engine of any preceding clause, wherein the first portion of the accessory gearbox comprises a C-shaped or arc cross-section.

The gas turbine engine of any preceding clause, wherein the arc cross-section defines a first end point and a second end point and the second portion of the accessory gearbox is spaced non-equidistant between the first end point and the second end point.

The gas turbine engine of any preceding clause, wherein at least a part of the second portion of the accessory gearbox extends past a radially inner surface of a fan cowl.

The gas turbine engine of any preceding clause, further comprising a strut that extends radially from the core cowl and operably couples the core cowl and the fan cowl.

The gas turbine engine of any preceding clause, wherein at least a part of the second portion of the accessory gearbox is located in the strut.

The gas turbine engine of any preceding clause, wherein the engine core comprises at least a compressor section, a combustion section, and a turbine section in axial flow arrangement.

The gas turbine engine of any preceding clause, the gas turbine engine comprising the core cowl radially spaced from the core engine, a fan cowl radially spaced from the core cowl and circumscribing at least a portion of the core cowl, a bifurcated airflow path comprising a first portion extending from an engine inlet through the engine core and a second portion extending from the engine inlet through a fan duct defined between the core cowl and the fan cowl, and an accessory gearbox having a first portion located within the core cowl and a second portion, located in the fan duct.

The gas turbine engine of any preceding clause, further comprising a strut that extends radially through the fan duct and coupling the core cowl and the fan cowl, wherein the second portion of the accessory gearbox is located in the strut.

The gas turbine engine of any preceding clause, wherein the accessory gearbox defines an accessory gearbox axis that is parallel to an axial centerline of the gas turbine engine.

The gas turbine engine of any preceding clause, wherein the accessory gearbox includes a primary set of interfaces defined by a first plane, a secondary set of interfaces defined by a second plane, and a tertiary set of interfaces defined by a third plane.

The gas turbine engine of any preceding clause, clause wherein the second portion of the accessory gearbox is perpendicular to the accessory gearbox axis.

The gas turbine engine of any preceding clause, wherein the arc cross-section defines a first end point and a second end point and the second portion of the accessory gearbox is spaced non-equidistant between the first end point and the second end point.

The gas turbine engine of any preceding clause, wherein the first portion located within the core cowl and straddling the engine core, the first portion comprising: a first arm, wherein a primary set of interfaces is defined by a portion of the first arm; and a second arm, wherein a secondary set of interfaces is defined by a portion of the second arm.

The gas turbine engine of any preceding clause, wherein the second portion located between the core cowl and the radially inner surface of the fan cowl, wherein the second portion extends from the first arm and the second arm of the first portion to define at least one fork, and wherein a tertiary set of interfaces is defined by the second portion of the accessory gearbox.

The gas turbine engine of any preceding clause, wherein the tertiary set of interfaces including one or more of fuel pump, transfer gearbox, lubrication pump, air compressor, scavenge pump, electrical generator, fuel control, fuel pump, permanent magnet alternator, or hydraulic pump.

The gas turbine engine of any preceding clause, wherein the accessory gearbox includes a primary set of interfaces defined by a first plane, a secondary set of interfaces defined by a second plane, and a tertiary set of interfaces defined by a third plane.

The gas turbine engine of any preceding clause, wherein a first angle is defined from the third plane to the first plane when rotating in a clockwise direction, wherein the first angle is greater than zero degrees and less than 180 degrees.

The gas turbine engine of any preceding clause, wherein a second angle is defined from the third plane to the second plane when rotating in a counterclockwise direction, wherein the second angle is greater than zero degrees and less than 180 degrees.

The gas turbine engine of any preceding clause, wherein the first angle or the second angle are greater than zero degrees and less than 90 degrees.

The gas turbine engine of any preceding clause, wherein the first portion of the accessory gearbox comprises a V-shaped cross-section, wherein the V-shaped cross-section defines a first surface perpendicular the first plane and a second surface perpendicular to the second plane.

The gas turbine engine of any preceding clause, wherein the first portion of the accessory gearbox comprises a C-shaped or arc cross-section.

The gas turbine engine of any preceding clause, wherein the arc cross-section defines a first end point and a second end point and the second portion of the accessory gearbox is spaced non-equidistant between the first end point and the second end point.

The gas turbine engine of any preceding clause, wherein the first arm includes a first arm distance measured from the accessory gearbox axis to a first distal surface or the first end point, wherein the first arm distance is between 5% and 50% of a circumference of the core engine or an engine casing.

The gas turbine engine of any preceding clause, wherein the second arm includes a second arm distance measured from the accessory gearbox axis to a second distal surface or the second end point, wherein the second arm distance is between 5% and 50% of a circumference of the core engine or the engine casing.

The gas turbine engine of any preceding clause, further comprising a strut that extends radially from the core cowl and operably couples the core cowl and the fan cowl.

The gas turbine engine of any preceding clause, wherein at least a part of the second portion of the accessory gearbox is located in the strut.

The gas turbine engine of any preceding clause, further comprising an upper strut spaced from the struct, wherein the upper strut couples the core cowl and the fan cowl.

The gas turbine engine of any preceding clause, wherein the accessory gearbox is mounted to the core engine or engine casing with a hinge mount.

The gas turbine engine of any preceding clause, wherein the at least one fork a first fork and a second fork, spaced along the along an accessory gearbox axis.

The gas turbine engine of any preceding clause, the first fork and the second fork are coupled by one or more of a drive shaft, a gearbox, or a hydraulic drive.

The gas turbine engine of any preceding clause, wherein the one or more of a drive shaft, a gearbox, or a hydraulic drive further comprises one or more casings positioned between the first fork and the second fork.

The gas turbine engine of any preceding clause, wherein the second portion located between the core cowl and the radially inner surface of the fan cowl, wherein the second portion defines a base from which the first arm and the second arm of the first portion extend to define a Y-shaped object, and wherein a tertiary set of interfaces is defined by the second portion of the accessory gearbox.

The gas turbine engine of any preceding clause, wherein the second portion defines a base from which the first arm and the second arm of the first portion extend to define a Y-shaped object.

The gas turbine engine of any preceding clause, wherein the Y-shaped object operably coupled to the primary set of interfaces, the secondary set of interfaces, and the tertiary set of interfaces is a first fork, wherein the gas turbine engine further comprises a set of forks including, at least, the first fork and a second fork.

The gas turbine engine of any preceding clause, wherein the second portion extends from the first arm and the second arm of the first portion to define a single fork.

The gas turbine engine of any preceding clause, wherein a tertiary set of interfaces is defined by the second portion of the accessory gearbox, wherein the accessory gearbox housing includes the single fork and is located partially in the inner cowl and partially in the strut.

The gas turbine engine of any preceding clause, wherein one or more of a fuel pump, transfer gearbox, lubrication pump, air compressor, scavenge pump, electrical generator, fuel control, permanent magnet alternator, or hydraulic pump operably coupled to the tertiary set of interfaces.

The gas turbine engine of any preceding clause, wherein the accessory gearbox is a first accessory device located in the core cowl space and operably coupled to a first portion of the first accessory gearbox, a second accessory device located in the hollow portion of the strut and operably coupled to a second portion of the first accessory gearbox, a second accessory gearbox located in a fan cowl space of the fan cowl and operably coupled to the first accessory gearbox.

The gas turbine engine of any preceding clause, further comprising a third accessory device operably coupled to the second accessory gearbox and located in the fan cowl space.

The gas turbine engine of any preceding clause, wherein the first accessory device includes at least one of a variable frequency generator, a hydraulic pump, and a starter.

The gas turbine engine of any preceding clause, wherein the second accessory device is a lubrication pump.

The gas turbine engine of any preceding clause, wherein the third accessory device is one or more of a fuel pump, a permanent magnet alternator, or an engine turning motor.

The gas turbine engine of any preceding clause, wherein the second accessory device is a lubrication pump and the third accessory device is a fuel pump, a permanent magnet alternator, or an engine turning motor.

The gas turbine engine of any preceding clause, wherein the second accessory gearbox is a mini accessory gearbox.

The gas turbine engine of any preceding clause, wherein the mini accessory gearbox is located forward of the first accessory gearbox.

The gas turbine engine of any preceding clause, wherein the third accessory device coupled to the mini accessory gearbox is a fuel pump, a permanent magnet alternator, or an engine turning motor.

The gas turbine engine of any preceding clause, wherein a volume of the mini accessory gearbox is in a range from 10% to 80% of a volume of the first accessory gearbox.

The gas turbine engine of any preceding clause, wherein a volume of the mini accessory gearbox is in a range from 15% to 66% of a volume of the first accessory gearbox.

The gas turbine engine of any preceding clause, wherein a volume of the third accessory device is in a range of 2% to 66% of a volume of the first accessory device or the second accessory device.

The gas turbine engine of any preceding clause, wherein a volume of the third accessory device is in a range of 2% to 45% of a volume of the first accessory device or the second accessory device.

The gas turbine engine of any preceding clause, wherein the third accessory device is a set of third accessory devices, where each device of the set of third accessory devices has a volume in a range of 2% to 66% of a volume of the first accessory device or the second accessory device.

The gas turbine engine of any preceding clause, further comprising at least one shaft operably coupling the first accessory gearbox to the second accessory gearbox.

The gas turbine engine of any preceding clause, further comprising one or more shafts coupling the core engine to the first accessory gearbox.

The gas turbine engine of any preceding clause, wherein the one or more shafts couple the core engine to the first accessory gearbox at an intersection of the first portion and the second portion.

The gas turbine engine of any preceding clause, wherein the second portion of the first accessory gearbox extends from the first portion in a space in the core cowl, through the hollow portion of the strut, and into the fan cowl space.

The gas turbine engine of any preceding clause, further comprising at least one shaft located at least partially in the fan cowl operably coupling the first accessory gearbox to the second accessory gearbox.

The gas turbine engine of any preceding clause, wherein the first portion of the first accessory gearbox includes a first arm and a second arm that straddle the core engine or an engine casing.

The gas turbine engine of any preceding clause, wherein the second accessory gearbox is radially outward of the low-pressure compressor.

The gas turbine engine of any preceding clause, wherein the first accessory device is located forward of the combustion section.

The gas turbine engine of any preceding clause, wherein the second accessory device is located forward of the combustion section.

A gas turbine engine defining an axial direction and a radial direction, the gas turbine engine comprising: a turbomachine having an unducted primary fan, a core engine including a combustor and a combustor casing enclosing the combustor and defining an outer surface, a core cowl surrounding at least a portion of the core engine and defining an inner surface and an outer surface; and an accessory gearbox, wherein at least a portion of the accessory gearbox is located within the fan cowl, wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), wherein the CDR is between 2.7 and 3.5 and wherein the CLR is between 0.25 and 0.50.

The gas turbine engine of any preceding clause, further comprising at least one strut that couples the core cowl to the fan cowl, wherein the strut includes a hollow portion.

The gas turbine engine of any preceding clause, wherein the accessory gearbox includes a first portion located within the fan cowl, and a second portion, extending from the first portion, located in the hollow portion of the strut.

The gas turbine engine of any preceding clause, wherein the second portion defines a base from which a first arm and a second arm of the first portion extend to define a Y-shaped object.

The gas turbine engine of any preceding clause, wherein the first portion includes a single arm.

The gas turbine engine of any preceding clause, further comprising a first accessory device located between in the fan cowl or the core cowl.

The gas turbine engine of any preceding clause, further comprising a second accessory device located in the hollow portion of the strut and operably coupled to the second portion of the accessory gearbox.

The gas turbine engine of any preceding clause, wherein the accessory gearbox is a first accessory gearbox, and the gas turbine engine further comprising a second accessory gearbox located in the core cowl and operably coupled to the first accessory gearbox.

The gas turbine engine of any preceding clause, further comprising a third accessory device operably coupled to the second accessory gearbox and located in the core cowl.

An aircraft, comprising a wing; and a gas turbine engine mounted to the wing, the gas turbine engine defining an axial direction and a radial direction, the gas turbine engine comprising a turbomachine having an unducted primary fan, a core engine including a combustor and a combustor casing enclosing the combustor and defining an outer surface, a core cowl surrounding at least a portion of the core engine and defining an inner surface and an outer surface; and an accessory gearbox, wherein at least a portion of the accessory gearbox is located between the core cowl and the core engine, wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), wherein the CDR is between 2.7 and 3.5 and wherein the CLR is between 0.25 and 0.50.

The aircraft of any preceding clause, wherein a void is defined between the outer surface of the combustor casing and the inner surface of the core cowl of the gas turbine engine.

The aircraft of any preceding clause, further comprising a first accessory device operably coupled to the accessory gearbox and located in the void.

The aircraft of any preceding clause, further comprising at least one strut that couples the core cowl to a fan cowl, wherein the strut includes a hollow portion.

The aircraft of any preceding clause, wherein the accessory gearbox includes a first portion located in the void, and a second portion, extending from the first portion, at least partially located in the hollow portion of the strut.

The aircraft of any preceding clause, further comprising an accessory device at least partially located in the hollow portion of the strut and operably coupled to the accessory gearbox.

The aircraft of any preceding clause, further comprising at least one strut that couples the core cowl to a fan cowl, wherein the strut includes a hollow portion.

The aircraft of any preceding clause, wherein the accessory gearbox includes a first portion located between the core cowl and the core engine, and a second portion, extending from the first portion, located in the hollow portion of the strut.

The aircraft of any preceding clause, wherein the second portion defines a base from which a first arm and a second arm of the first portion extend to define a Y-shaped object.

The aircraft of any preceding clause, wherein the first portion includes a single arm.

The aircraft of any preceding clause, further comprising a first accessory device located between the core cowl and the core engine.

The aircraft of any preceding clause, further comprising a second accessory device located in the hollow portion of the strut and operably coupled to the second portion of the accessory gearbox.

The aircraft of any preceding clause, wherein the accessory gearbox is a first accessory gearbox, and the gas turbine engine further comprising a second accessory gearbox located in the fan cowl and operably coupled to the first accessory gearbox.

The aircraft of any preceding clause, further comprising a third accessory device operably coupled to the second accessory gearbox and located in the fan cowl.

The aircraft of any preceding clause, wherein the accessory gearbox is located between the core cowl and the outer surface of the combustor casing.

The aircraft of any preceding clause, wherein the CDR is between 2.8 and 3.3.

The aircraft of any preceding clause, wherein the CLR is between 0.3 and 0.45.

The aircraft of any preceding clause, further comprising a ducted secondary fan disposed downstream from a primary fan.

The aircraft of any preceding clause, wherein the ducted secondary fan is a single stage secondary fan.

The aircraft of any preceding clause, wherein the gas turbine engine is a three-stream gas turbine engine.

The aircraft of any preceding clause, wherein the CLR is between 0.40 and 0.45.

The aircraft of any preceding clause, wherein a void is defined between the outer surface of the combustor casing and the inner surface of the core cowl.

The aircraft of any preceding clause, further comprising at least one engine accessory coupled to the inner surface of the core cowl.

The aircraft of any preceding clause, further comprising a rear frame including a strut having a trailing edge, wherein the primary fan includes a primary fan blade having a leading edge, and wherein the overall core axial length (L) along the axial direction is measured from the leading edge of the primary fan blade to the trailing edge of the strut.

The aircraft of any preceding clause, further comprising a high-pressure compressor inlet guide vane having a leading edge, and a rear frame including a strut having a trailing edge, wherein the under-core cowl axial length (L1) along the axial direction is measured from the leading edge of the inlet guide vane to the trailing edge of the strut.

The aircraft of the preceding clause, wherein the core cowl is pivotable relative to the core engine.

An aircraft, comprising a turbomachine and a housing at least partially encasing a portion of the turbomachine, the housing having an inner surface and defining in part a void between the inner surface and the portion of the turbomachine, the housing moveable relative to the portion of the turbomachine; and an engine component selectively coupled to the portion of the turbomachine or to the housing.

The aircraft of the preceding clause, wherein the turbomachinery comprises a core engine, the housing comprises a core cowl at least partially encasing a portion of the core engine, the core cowl having an inner surface and defining in part a void between the inner surface and the core engine, wherein the core cowl is moveable relative to the core engine, and an engine component selectively coupled to the core engine or the core cowl, and wherein the core cowl is pivotable relative to the core engine.

The aircraft of any preceding clause, wherein when the engine component is selectively coupled to the core cowl, the engine component travels with the core cowl when the core cowl is moved away from the core engine.

The aircraft of any preceding clause, wherein the engine component is one of a heat exchanger, a sensor, a controller, a pump, a duct, a fire and overheat component, a generator, or a valve.

The aircraft of any preceding clause, further comprising: a fastener, wherein the engine component is selectively connected to the core engine or the core cowl via the fastener.

The aircraft of any preceding clause, wherein the core cowl defines an access opening, wherein the fastener is accessible through the access opening.

The aircraft of any preceding clause, wherein the fastener includes a plurality of articulating tabs, wherein in a first position the plurality of articulating tabs engages with the core engine and the engine component and in a second position the plurality of tabs engages with the core cowl and the engine component.

The aircraft of any preceding clause, further comprising a push-pull mechanism including a first pin, wherein the engine component is selectively coupled to the core engine or the core cowl via the push-pull mechanism, wherein the first pin engages with the core engine and the engine component when the push-pull mechanism is in a first position, and the first pin engages with the engine component and the core cowl when the push-pull mechanism is in a second position.

The aircraft of any preceding clause, wherein the push-pull mechanism is manually actuated between the first position and the second position.

The aircraft of any preceding clause, wherein the push-pull mechanism is electrically actuated between the first position and the second position.

The aircraft of any preceding clause, wherein the push-pull mechanism includes a second pin, wherein the second pin engages with a door counterbalance mechanism when the first pin is engaged with the engine component and the core cowl.

The aircraft of any preceding clause, wherein the gas turbine engine includes an unducted primary fan.

The aircraft of any preceding clause, further comprising a ducted secondary fan disposed downstream from the primary fan, wherein the ducted secondary fan is a single stage secondary fan or a multi-stage secondary fan.

The aircraft of any preceding clause, wherein the engine component is positioned within the core cowl.

The aircraft of any preceding clause, wherein the engine component is one of a heat exchanger, a sensor, a controller, a pump, a duct, a fire and overheat component, a generator, or a valve.

The aircraft of any preceding clause, wherein the engine component is an engine controller.

The aircraft of any preceding clause, wherein the engine component is power electronics, a lubrication oil tank, a lubrication oil pump, an electric machine, or a combination thereof.

The aircraft of any preceding clause, wherein the gas turbine engine is incorporated into an aircraft configured to cruise at an altitude between 28,000 feet and 65,000 feet.

The aircraft of any preceding clause, wherein the gas turbine engine is configured to generate at least 18,000 pounds of thrust and less than 80,000 pounds of thrust when operated at a rated speed during standard day operating conditions.

The aircraft of any preceding clause defining an axial direction, the gas turbine engine comprising: a turbomachine having a primary fan, a core engine, and a core cowl surrounding at least a portion of the core engine, the core engine comprising a high-pressure compressor comprising at least a total of eight stages of high-pressure compressor rotor blades and up to a total of 11 stages of high-pressure compressor rotor blades, the core engine further comprising a gearbox, the primary fan being drivingly coupled to the core engine across the gearbox; wherein the turbomachine defines an under-core cowl axial length (L1) along the axial direction and an initial compression axial length (L2), wherein the turbomachine defines an initial compression length ratio (ICLR) equal to the initial compression axial length (L2) divided by the under-core cowl axial length (L1), wherein the ICLR is greater than or equal to 0.3 and less than or equal to 0.9.

The aircraft of any preceding clause, wherein the ICLR is greater than or equal to 0.55 and less than or equal to 0.9.

The aircraft of any preceding clause, wherein the ICLR is greater than or equal to 0.6 and less than or equal to 0.89.

The aircraft of any preceding clause, wherein the primary fan is an unducted primary fan, and wherein the ICLR is greater than or equal to 0.7.

The aircraft of any preceding clause, wherein the turbomachine further includes a fan cowl and defines a fan duct between the fan cowl and the core cowl configured as a third stream, and wherein the ICLR is greater than or equal to 0.7.

The aircraft of any preceding clause, further comprising a nacelle surrounding at least in part the primary fan, and wherein the ICLR is greater than or equal to 0.6 and less than or equal to 0.75.

The aircraft of any preceding clause, wherein the gas turbine engine is a two stream engine, and wherein the ICLR is greater than or equal to 0.6 and less than or equal to 0.75.

The aircraft of any preceding clause, wherein the core engine comprises a compressor section and a turbine section, wherein the compressor section has a high-pressure compressor comprising a total of eight to ten stages of high-pressure compressor rotor blades, and wherein the turbine section has a low-pressure turbine comprising a total of three to five stages of low-pressure turbine rotor blades.

The aircraft of any preceding clause, wherein the gas turbine engine is configured to generate at least 18,000 pounds of thrust and less than 80,000 pounds of thrust when operated at a rated speed during standard day operating conditions.

The aircraft of any preceding clause, wherein the gas turbine engine is configured to generate between 25,000 and 60,000 pounds of thrust during operation at the rated speed during standard day operating conditions.

The aircraft of any preceding clause, wherein the high-pressure compressor comprises a total of nine stages.

The aircraft of any preceding clause, wherein the low-pressure turbine comprises a total of four stages.

The aircraft of any preceding clause, wherein the accessory gearbox defines an accessory gearbox axis that is parallel to an axial centerline of the gas turbine engine.

The aircraft of any preceding clause, wherein the accessory gearbox comprises a first portion located between the core engine and the core cowl that straddles the core engine and a second portion located between the core cowl and a fan cowl.

The aircraft of any preceding clause, wherein the second portion of the accessory gearbox is perpendicular to the accessory gearbox axis.

The aircraft of any preceding clause, wherein the accessory gearbox includes a primary set of interfaces defined by a first plane, a secondary set of interfaces defined by a second plane, and a tertiary set of interfaces defined by a third plane.

The aircraft of any preceding clause, wherein the first portion of the accessory gearbox comprises a V-shaped cross-section.

The aircraft of any preceding clause, wherein the V-shaped cross-section defines a first surface perpendicular the first plane and a second surface perpendicular to the second plane.

The gas turbine engine of any preceding clause, wherein the first portion of the accessory gearbox comprises a C-shaped or arc cross-section.

The aircraft of any preceding clause, wherein the arc cross-section defines a first end point and a second end point and the second portion of the accessory gearbox is spaced non-equidistant between the first end point and the second end point.

The aircraft of any preceding clause, wherein at least a part of the second portion of the accessory gearbox extends past a radially inner surface of a fan cowl.

The aircraft of any preceding clause, further comprising a strut that extends radially from the core cowl and operably couples the core cowl and the fan cowl.

The aircraft of any preceding clause, wherein at least a part of the second portion of the accessory gearbox is located in the strut.

The aircraft of any preceding clause, wherein the engine core comprises at least a compressor section, a combustion section, and a turbine section in axial flow arrangement.

The aircraft of any preceding clause, the gas turbine engine comprising the core cowl radially spaced from the core engine, a fan cowl radially spaced from the core cowl and circumscribing at least a portion of the core cowl, a bifurcated airflow path comprising a first portion extending from an engine inlet through the engine core and a second portion extending from the engine inlet through a fan duct defined between the core cowl and the fan cowl, and an accessory gearbox having a first portion located within the core cowl and a second portion, located in the fan duct.

The aircraft of any preceding clause, further comprising a strut that extends radially through the fan duct and coupling the core cowl and the fan cowl, wherein the second portion of the accessory gearbox is located in the strut.

The aircraft of any preceding clause, wherein the accessory gearbox defines an accessory gearbox axis that is parallel to an axial centerline of the gas turbine engine.

The aircraft of any preceding clause, wherein the accessory gearbox includes a primary set of interfaces defined by a first plane, a secondary set of interfaces defined by a second plane, and a tertiary set of interfaces defined by a third plane.

The aircraft of any preceding clause, clause wherein the second portion of the accessory gearbox is perpendicular to the accessory gearbox axis.

The aircraft of any preceding clause, wherein the arc cross-section defines a first end point and a second end point and the second portion of the accessory gearbox is spaced non-equidistant between the first end point and the second end point.

The aircraft of any preceding clause, wherein the first portion located within the core cowl and straddling the engine core, the first portion comprising: a first arm, wherein a primary set of interfaces is defined by a portion of the first arm; and a second arm, wherein a secondary set of interfaces is defined by a portion of the second arm.

The aircraft of any preceding clause, wherein the second portion located between the core cowl and the radially inner surface of the fan cowl, wherein the second portion extends from the first arm and the second arm of the first portion to define at least one fork, and wherein a tertiary set of interfaces is defined by the second portion of the accessory gearbox.

The aircraft of any preceding clause, wherein the tertiary set of interfaces including one or more of fuel pump, transfer gearbox, lubrication pump, air compressor, scavenge pump, electrical generator, fuel control, fuel pump, permanent magnet alternator, or hydraulic pump.

The aircraft of any preceding clause, wherein the accessory gearbox includes a primary set of interfaces defined by a first plane, a secondary set of interfaces defined by a second plane, and a tertiary set of interfaces defined by a third plane.

The aircraft of any preceding clause, wherein a first angle is defined from the third plane to the first plane when rotating in a clockwise direction, wherein the first angle is greater than zero degrees and less than 180 degrees.

The aircraft of any preceding clause, wherein a second angle is defined from the third plane to the second plane when rotating in a counterclockwise direction, wherein the second angle is greater than zero degrees and less than 180 degrees.

The aircraft of any preceding clause, wherein the first angle or the second angle are greater than zero degrees and less than 90 degrees.

The aircraft of any preceding clause, wherein the first portion of the accessory gearbox comprises a V-shaped cross-section, wherein the V-shaped cross-section defines a first surface perpendicular the first plane and a second surface perpendicular to the second plane.

The aircraft of any preceding clause, wherein the first portion of the accessory gearbox comprises a C-shaped or arc cross-section.

The aircraft of any preceding clause, wherein the arc cross-section defines a first end point and a second end point and the second portion of the accessory gearbox is spaced non-equidistant between the first end point and the second end point.

The aircraft of any preceding clause, wherein the first arm includes a first arm distance measured from the accessory gearbox axis to a first distal surface or the first end point, wherein the first arm distance is between 5% and 50% of a circumference of the core engine or an engine casing.

The aircraft of any preceding clause, wherein the second arm includes a second arm distance measured from the accessory gearbox axis to a second distal surface or the second end point, wherein the second arm distance is between 5% and 50% of a circumference of the core engine or the engine casing.

The aircraft of any preceding clause, further comprising a strut that extends radially from the core cowl and operably couples the core cowl and the fan cowl.

The aircraft of any preceding clause, wherein at least a part of the second portion of the accessory gearbox is located in the strut.

The aircraft engine of any preceding clause, further comprising an upper strut spaced from the struct, wherein the upper strut couples the core cowl and the fan cowl.

The aircraft of any preceding clause, wherein the accessory gearbox is mounted to the core engine or engine casing with a hinge mount.

The aircraft of any preceding clause, wherein the at least one fork a first fork and a second fork, spaced along the along an accessory gearbox axis.

The aircraft of any preceding clause, the first fork and the second fork are coupled by one or more of a drive shaft, a gearbox, or a hydraulic drive.

The aircraft of any preceding clause, wherein the one or more of a drive shaft, a gearbox, or a hydraulic drive further comprises one or more casings positioned between the first fork and the second fork.

The aircraft of any preceding clause, wherein the second portion located between the core cowl and the radially inner surface of the fan cowl, wherein the second portion defines a base from which the first arm and the second arm of the first portion extend to define a Y-shaped object, and wherein a tertiary set of interfaces is defined by the second portion of the accessory gearbox.

The aircraft of any preceding clause, wherein the second portion defines a base from which the first arm and the second arm of the first portion extend to define a Y-shaped object.

The aircraft of any preceding clause, wherein the Y-shaped object operably coupled to the primary set of interfaces, the secondary set of interfaces, and the tertiary set of interfaces is a first fork, wherein the gas turbine engine further comprises a set of forks including, at least, the first fork and a second fork.

The aircraft of any preceding clause, wherein the second portion extends from the first arm and the second arm of the first portion to define a single fork.

The aircraft of any preceding clause, wherein a tertiary set of interfaces is defined by the second portion of the accessory gearbox, wherein the accessory gearbox housing includes the single fork and is located partially in the inner cowl and partially in the strut.

The aircraft of any preceding clause, wherein one or more of a fuel pump, transfer gearbox, lubrication pump, air compressor, scavenge pump, electrical generator, fuel control, permanent magnet alternator, or hydraulic pump operably coupled to the tertiary set of interfaces.

The aircraft of any preceding clause, wherein the accessory gearbox is a first accessory device located in the core cowl space and operably coupled to a first portion of the first accessory gearbox, a second accessory device located in the hollow portion of the strut and operably coupled to a second portion of the first accessory gearbox, a second accessory gearbox located in a fan cowl space of the fan cowl and operably coupled to the first accessory gearbox.

The aircraft of any preceding clause, further comprising a third accessory device operably coupled to the second accessory gearbox and located in the fan cowl space.

An aircraft having gas turbine engine defining an axial direction and a radial direction, the gas turbine engine comprising: a turbomachine having an unducted primary fan, a core engine including a combustor and a combustor casing enclosing the combustor and defining an outer surface, a core cowl surrounding at least a portion of the core engine and defining an inner surface and an outer surface; and an accessory gearbox, wherein at least a portion of the accessory gearbox is located within the fan cowl, wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), wherein the CDR is between 2.7 and 3.5 and wherein the CLR is between 0.25 and 0.50.

The gas turbine engine of any preceding clause, further comprising at least one strut that couples the core cowl to the fan cowl, wherein the strut includes a hollow portion.

The aircraft of any preceding clause, wherein the accessory gearbox includes a first portion located within the fan cowl, and a second portion, extending from the first portion, located in the hollow portion of the strut.

The aircraft of any preceding clause, wherein the second portion defines a base from which a first arm and a second arm of the first portion extend to define a Y-shaped object.

The aircraft of any preceding clause, wherein the first portion includes a single arm.

The aircraft of any preceding clause, further comprising a first accessory device located between in the fan cowl or the core cowl.

The aircraft of any preceding clause, further comprising a second accessory device located in the hollow portion of the strut and operably coupled to the second portion of the accessory gearbox.

The aircraft of any preceding clause, wherein the accessory gearbox is a first accessory gearbox, and the gas turbine engine further comprising a second accessory gearbox located in the core cowl and operably coupled to the first accessory gearbox.

The aircraft of any preceding clause, further comprising a third accessory device operably coupled to the second accessory gearbox and located in the core cowl.

The aircraft of any preceding clause, wherein the first accessory device includes at least one of a variable frequency generator, a hydraulic pump, and a starter.

The aircraft of any preceding clause, wherein the second accessory device is a lubrication pump.

The aircraft of any preceding clause, wherein the third accessory device is one or more of a fuel pump, a permanent magnet alternator, or an engine turning motor.

The aircraft of any preceding clause, wherein the second accessory device is a lubrication pump and the third accessory device is a fuel pump, a permanent magnet alternator, or an engine turning motor.

The aircraft of any preceding clause, wherein the second accessory gearbox is a mini accessory gearbox.

The aircraft of any preceding clause, wherein the mini accessory gearbox is located forward of the first accessory gearbox.

The aircraft of any preceding clause, wherein the third accessory device coupled to the mini accessory gearbox is a fuel pump, a permanent magnet alternator, or an engine turning motor.

The aircraft of any preceding clause, wherein a volume of the mini accessory gearbox is in a range from 10% to 80% of a volume of the first accessory gearbox.

The aircraft of any preceding clause, wherein a volume of the mini accessory gearbox is in a range from 15% to 66% of a volume of the first accessory gearbox.

The aircraft of any preceding clause, wherein a volume of the third accessory device is in a range of 2% to 66% of a volume of the first accessory device or the second accessory device.

The aircraft of any preceding clause, wherein a volume of the third accessory device is in a range of 2% to 45% of a volume of the first accessory device or the second accessory device.

The aircraft of any preceding clause, wherein the third accessory device is a set of third accessory devices, where each device of the set of third accessory devices has a volume in a range of 2% to 66% of a volume of the first accessory device or the second accessory device.

The aircraft of any preceding clause, further comprising at least one shaft operably coupling the first accessory gearbox to the second accessory gearbox.

The aircraft of any preceding clause, further comprising one or more shafts coupling the core engine to the first accessory gearbox.

The aircraft of any preceding clause, wherein the one or more shafts couple the core engine to the first accessory gearbox at an intersection of the first portion and the second portion.

The aircraft of any preceding clause, wherein the second portion of the first accessory gearbox extends from the first portion in a space in the core cowl, through the hollow portion of the strut, and into the fan cowl space.

The aircraft of any preceding clause, further comprising at least one shaft located at least partially in the fan cowl operably coupling the first accessory gearbox to the second accessory gearbox.

The aircraft of any preceding clause, wherein the first portion of the first accessory gearbox includes a first arm and a second arm that straddle the core engine or an engine casing.

The aircraft of any preceding clause, wherein the second accessory gearbox is radially outward of the low-pressure compressor.

The aircraft of any preceding clause, wherein the first accessory device is located forward of the combustion section.

The aircraft of any preceding clause, wherein the second accessory device is located forward of the combustion section.

What is claimed is:

1. A gas turbine engine defining an axial direction and a radial direction, the gas turbine engine comprising:
   a turbomachine having an unducted primary fan, a core engine including a combustor and a combustor casing enclosing the combustor and defining an outer surface, a core cowl surrounding at least a portion of the core engine and defining an inner surface and an outer surface; and
   an accessory gearbox, wherein at least a portion of the accessory gearbox is located between the core cowl and the core engine,
   wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction,
   wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L),
   wherein the CDR is between 2.7 and 3.5 and wherein the CLR is between 0.25 and 0.50.

2. The gas turbine engine of claim 1, further comprising at least one strut that couples the core cowl to a fan cowl, wherein the strut includes a hollow portion.

3. The gas turbine engine of claim 2, wherein the accessory gearbox includes a first portion located between the core cowl and the core engine, and a second portion, extending from the first portion, located in the hollow portion of the strut.

4. The gas turbine engine of claim 3, wherein the second portion defines a base from which a first arm and a second arm of the first portion extend to define a Y-shaped object.

5. The gas turbine engine of claim 3, wherein the first portion includes a single arm.

6. The gas turbine engine of claim 3, further comprising a first accessory device located between the core cowl and the core engine.

7. The gas turbine engine of claim 6, further comprising a second accessory device located in the hollow portion of the strut and operably coupled to the second portion of the accessory gearbox.

8. The gas turbine engine of claim 3, wherein the accessory gearbox is a first accessory gearbox, and the gas turbine engine further comprising a second accessory gearbox located in the fan cowl and operably coupled to the first accessory gearbox.

9. The gas turbine engine of claim 8, further comprising a third accessory device operably coupled to the second accessory gearbox and located in the fan cowl.

10. The gas turbine engine of claim 3, wherein the accessory gearbox is located between the core cowl and the outer surface of the combustor casing.

11. The gas turbine engine of claim 1, wherein the CDR is between 2.8 and 3.3.

12. The gas turbine engine as in claim 1, wherein the CLR is between 0.3 and 0.45.

13. The gas turbine engine as in claim 1, further comprising a ducted secondary fan disposed downstream from a primary fan.

14. The gas turbine engine as in claim 13, wherein the gas turbine engine is a three-stream gas turbine engine.

15. An aircraft, comprising:
   a wing; and
   a gas turbine engine mounted to the wing, the gas turbine engine defining an axial direction and a radial direction, the gas turbine engine comprising:
   a turbomachine having an unducted primary fan, a core engine including a combustor and a combustor casing enclosing the combustor and defining an outer surface, a core cowl surrounding at least a portion of the core engine and defining an inner surface and an outer surface; and
   an accessory gearbox, wherein at least a portion of the accessory gearbox is located between the core cowl and the core engine,
   wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction,
   wherein the gas turbine engine defines a core cowl diameter ratio (CDR) equal to the peak cowl diameter (D) divided by the maximum combustor casing diameter (d) and a core cowl length ratio (CLR)

equal to the under-core cowl axial length (L1) divided by the overall core axial length (L), wherein the CDR is between 2.7 and 3.5 and wherein the CLR is between 0.25 and 0.50.

16. The aircraft as in claim 15, wherein a void is defined between the outer surface of the combustor casing and the inner surface of the core cowl of the gas turbine engine.

17. The aircraft of claim 16, further comprising a first accessory device operably coupled to the accessory gearbox and located in the void.

18. The aircraft of claim 16, further comprising at least one strut that couples the core cowl to a fan cowl, wherein the strut includes a hollow portion.

19. The aircraft of claim 18, wherein the accessory gearbox includes a first portion located in the void, and a second portion, extending from the first portion, at least partially located in the hollow portion of the strut.

20. The aircraft of claim 19, further comprising an accessory device at least partially located in the hollow portion of the strut and operably coupled to the accessory gearbox.

\* \* \* \* \*